US010976263B2

(12) United States Patent
Efner et al.

(10) Patent No.: US 10,976,263 B2
(45) Date of Patent: Apr. 13, 2021

(54) SYSTEM AND METHOD FOR ALIGNING AN INKER OF A DECORATOR

(71) Applicant: BALL CORPORATION, Broomfield, CO (US)

(72) Inventors: John Efner, Broomfield, CO (US); Kellie Hedberg, Denver, CO (US)

(73) Assignee: BALL CORPORATION, Broomfield, CO (US)

( * ) Notice: Subject to any disclaimer, the term of this patent is extended or adjusted under 35 U.S.C. 154(b) by 0 days.

(21) Appl. No.: 15/654,255

(22) Filed: Jul. 19, 2017

(65) Prior Publication Data

US 2018/0024076 A1 Jan. 25, 2018

Related U.S. Application Data

(60) Provisional application No. 62/364,728, filed on Jul. 20, 2016.

(51) Int. Cl.
*B41F 17/22* (2006.01)
*G01N 21/88* (2006.01)
(Continued)

(52) U.S. Cl.
CPC ..... *G01N 21/8851* (2013.01); *B21D 51/2692* (2013.01); *G01N 21/9036* (2013.01);
(Continued)

(58) Field of Classification Search
CPC ............... B41F 17/22; G01N 21/8851; G01N 21/9036; G01N 21/9045; G01N 21/909; B21D 51/2692; B21D 51/2646
(Continued)

(56) References Cited

U.S. PATENT DOCUMENTS 3,286,302 A   11/1966   Doering
3,313,409 A    4/1967   Johson
(Continued)

FOREIGN PATENT DOCUMENTS

CA   2097619   5/1992
CH    654524   2/1986
(Continued)

OTHER PUBLICATIONS

English language machine translation of JP 11-115159 A, publication date Apr. 1999 (Year: 1999).*
(Continued)

*Primary Examiner* — Leslie J Evanisko
(74) *Attorney, Agent, or Firm* — Sheridan Ross P.C.

(57) ABSTRACT

An apparatus and methods of decorating a metallic container are provided. More specifically, the present invention relates to apparatus and methods used to provide a decoration on a predetermined portion of a metallic container body. The decorator includes a sensor that senses decorations on metallic containers. A control system receives information related to the sensed decorations from the sensor and then determines if the decorations at least meet predetermined color, density, thickness, orientation, and consistency targets. The control system can automatically adjust elements of the decorator to correct a deficient decoration. In one embodiment, the control system can automatically adjust ink blades associated with a plurality of inking assemblies of the decorator to adjust the color, density, orientation, positioning, and consistency of decorations transferred to the metallic containers. In another embodiment, the control system can adjust a position of an inking assembly, an ink roller, a plate cylinder, a printing plate, a blanket cylinder, and a transfer blanket of the decorator.

20 Claims, 18 Drawing Sheets

(51) Int. Cl.
*B21D 51/26* (2006.01)
*G01N 21/90* (2006.01)

(52) U.S. Cl.
CPC ..... *G01N 21/9045* (2013.01); *B21D 51/2646* (2013.01); *B41F 17/22* (2013.01); *G01N 2021/8887* (2013.01)

(58) Field of Classification Search
USPC .......................... 101/38.1, 39, 40, 365, 366
See application file for complete search history.

(56) References Cited

U.S. PATENT DOCUMENTS

| | | |
|---|---|---|
| 3,357,950 A | 12/1967 | La Follette |
| 3,752,073 A | 8/1973 | Lorber |
| 3,766,851 A | 10/1973 | Sirvet et al. |
| 3,782,542 A | 1/1974 | Scribner |
| 3,828,668 A | 8/1974 | Zugcic |
| 3,923,158 A | 12/1975 | Fornaa |
| 3,960,073 A | 6/1976 | Rush |
| 3,983,729 A | 10/1976 | Traczyk et al. |
| 3,991,673 A | 11/1976 | Coale et al. |
| 4,000,695 A | 1/1977 | Perretta |
| 4,008,664 A | 2/1977 | Crum et al. |
| 4,048,917 A | 9/1977 | Skrypek et al. |
| 4,105,122 A | 8/1978 | Flood et al. |
| 4,132,826 A | 1/1979 | Dessauer et al. |
| 4,142,462 A | 3/1979 | Gilgore |
| 4,270,451 A | 6/1981 | Perretta |
| 4,378,493 A | 3/1983 | Dorf et al. |
| 4,384,518 A | 5/1983 | Albin |
| 4,395,946 A | 8/1983 | Price |
| 4,399,357 A | 8/1983 | Dorf et al. |
| 4,442,934 A | 4/1984 | Dorf et al. |
| 4,471,011 A | 9/1984 | Sporing |
| 4,479,429 A | 10/1984 | Haryu |
| 4,492,476 A | 1/1985 | Miyazawa |
| 4,519,232 A | 5/1985 | Traczyk et al. |
| 4,519,310 A | 5/1985 | Shimizu et al. |
| 4,589,339 A | 5/1986 | Fischer |
| 4,620,090 A | 10/1986 | Ducloux |
| 4,729,282 A | 3/1988 | Kasdorf |
| 4,732,027 A | 3/1988 | Traczyk et al. |
| 4,736,446 A | 4/1988 | Reynolds et al. |
| 4,741,266 A | 5/1988 | Stirbis et al. |
| 4,774,839 A | 10/1988 | Caleffi et al. |
| 4,790,662 A | 12/1988 | Bischkopf et al. |
| 4,852,485 A | 8/1989 | Brunner |
| 4,872,024 A | 10/1989 | Nagai et al. |
| 4,882,764 A | 11/1989 | Reynolds et al. |
| 4,884,504 A | 12/1989 | Sillars |
| 4,885,785 A | 12/1989 | Reynolds et al. |
| 4,887,530 A | 12/1989 | Sainio |
| 4,889,560 A | 12/1989 | Jaeger et al. |
| 4,896,807 A | 1/1990 | Mundschau |
| 4,898,752 A | 2/1990 | Cavagna et al. |
| 4,903,599 A | 2/1990 | Kubler et al. |
| 4,913,049 A | 4/1990 | Sainio |
| 4,924,083 A | 5/1990 | Ishikawa et al. |
| 4,924,107 A | 5/1990 | Tucker |
| 4,979,670 A | 12/1990 | Konle |
| 5,010,814 A | 4/1991 | Shishikura |
| 5,013,022 A | 5/1991 | Graushar |
| 5,017,795 A | 5/1991 | Dower et al. |
| 5,025,610 A | 6/1991 | Graushar |
| 5,025,676 A | 6/1991 | Perretta |
| 5,029,830 A | 7/1991 | Quadracci |
| 5,043,904 A | 8/1991 | Sikes et al. |
| 5,049,432 A | 9/1991 | Ooms et al. |
| 5,052,298 A | 10/1991 | Runyan et al. |
| 5,056,431 A | 10/1991 | Sainio |
| 5,065,905 A | 11/1991 | Eddy et al. |
| 5,076,163 A | 12/1991 | Sainio |
| 5,100,116 A | 3/1992 | Graushar |
| 5,102,110 A | 4/1992 | Reynolds |
| 5,120,126 A | 6/1992 | Wertz et al. |
| 5,181,471 A | 1/1993 | Sillars |
| 5,184,555 A | 2/1993 | Quadracci et al. |
| 5,186,100 A | 2/1993 | Turturro et al. |
| 5,187,922 A | 2/1993 | Mast |
| 5,190,201 A | 3/1993 | Briggs |
| 5,213,043 A | 5/1993 | Reimers et al. |
| 5,230,501 A | 7/1993 | Melton |
| 5,232,324 A | 8/1993 | Graushar |
| 5,233,922 A | 8/1993 | Stirbis et al. |
| 5,266,995 A | 11/1993 | Quadracci et al. |
| 5,282,306 A | 2/1994 | Katsuhiro |
| 5,305,392 A | 4/1994 | Longest, Jr. et al. |
| 5,316,425 A | 5/1994 | Graushar et al. |
| 5,318,683 A | 6/1994 | Smith et al. |
| 5,333,069 A | 7/1994 | Spence |
| 5,337,659 A | 8/1994 | Whelan |
| 5,339,731 A | 8/1994 | Howard et al. |
| 5,347,726 A | 9/1994 | Quadracci et al. |
| 5,351,617 A | 10/1994 | Williams et al. |
| 5,353,703 A | 10/1994 | Rieker |
| 5,357,448 A | 10/1994 | Stanford |
| 5,385,092 A | 1/1995 | Lewis et al. |
| 5,412,577 A | 5/1995 | Sainio et al. |
| 5,453,926 A | 9/1995 | Stroschin et al. |
| 5,457,515 A | 10/1995 | Quadracci et al. |
| 5,467,973 A | 11/1995 | Graushar et al. |
| 5,469,787 A | 11/1995 | Turner et al. |
| 5,497,900 A | 3/1996 | Caleffi et al. |
| 5,502,476 A | 3/1996 | Neal et al. |
| 5,532,720 A | 7/1996 | Krueger et al. |
| 5,547,175 A | 8/1996 | Graushar et al. |
| 5,591,255 A | 1/1997 | Small et al. |
| 5,591,462 A | 1/1997 | Darling et al. |
| 5,634,633 A | 6/1997 | Graushar |
| 5,662,448 A | 9/1997 | Graushar et al. |
| 5,689,425 A | 11/1997 | Sainio et al. |
| 5,706,630 A | 1/1998 | Hernke et al. |
| 5,713,288 A | 2/1998 | Frazzitta |
| 5,724,259 A | 3/1998 | Seymour et al. |
| 5,771,798 A | 6/1998 | Shriver |
| 5,788,226 A | 8/1998 | Peglow |
| 5,788,459 A | 8/1998 | Neumann et al. |
| 5,791,249 A | 8/1998 | Quadracci |
| 5,806,427 A | 9/1998 | Niemiro et al. |
| 5,813,337 A | 9/1998 | Peters et al. |
| 5,819,663 A | 10/1998 | Klaas et al. |
| 5,857,063 A | 1/1999 | Poe et al. |
| 5,881,538 A | 3/1999 | Blohm |
| 5,908,505 A | 6/1999 | Bargenquest et al. |
| 5,919,839 A | 7/1999 | Titterington et al. |
| 5,921,069 A | 7/1999 | Hernke et al. |
| 5,950,401 A | 9/1999 | Blohm et al. |
| 5,967,049 A | 10/1999 | Seymour et al. |
| 5,967,050 A | 10/1999 | Seymour |
| 5,970,865 A | 10/1999 | Horth et al. |
| 5,974,974 A | 11/1999 | Agnew et al. |
| 5,987,161 A | 11/1999 | Dowane et al. |
| 5,988,620 A | 11/1999 | Graushar |
| 5,992,318 A | 11/1999 | DiBello et al. |
| 6,018,687 A | 1/2000 | Tabor |
| 6,019,047 A | 2/2000 | Klaas et al. |
| 6,037,101 A | 3/2000 | Telser et al. |
| 6,044,620 A | 4/2000 | Hernke et al. |
| 6,058,839 A | 5/2000 | Frazzitta |
| 6,062,139 A * | 5/2000 | Tomita ................... B41F 31/04 101/351.2 |
| 6,079,326 A | 6/2000 | Strutz et al. |
| 6,116,595 A | 9/2000 | d'Agrella et al. |
| 6,129,015 A | 10/2000 | Dewey |
| 6,131,903 A | 10/2000 | Schaefer et al. |
| 6,139,779 A | 10/2000 | Small et al. |
| 6,142,078 A | 11/2000 | Lachajewski |
| 6,172,748 B1 | 1/2001 | Sones et al. |
| 6,174,937 B1 | 1/2001 | Banning et al. |
| 6,178,254 B1 | 1/2001 | Rappette et al. |
| 6,184,988 B1 | 2/2001 | Ferrari |
| 6,196,675 B1 | 3/2001 | Deily et al. |
| 6,199,860 B1 | 3/2001 | d'Agrella et al. |

(56) References Cited

U.S. PATENT DOCUMENTS

| | | |
|---|---|---|
| 6,231,044 B1 | 5/2001 | Neary et al. |
| 6,238,837 B1 | 5/2001 | Fan |
| 6,244,593 B1 | 6/2001 | Schaefer et al. |
| 6,247,692 B1 | 6/2001 | Schaefer et al. |
| 6,254,093 B1 | 7/2001 | d'Agrella et al. |
| 6,302,392 B1 | 10/2001 | Schaefer et al. |
| 6,309,453 B1 | 10/2001 | Banning et al. |
| 6,312,872 B1 | 11/2001 | Murphy |
| 6,318,260 B1 | 11/2001 | Chu et al. |
| 6,342,957 B1 | 1/2002 | Itoh |
| 6,354,591 B1 | 3/2002 | d'Agrella |
| 6,374,732 B1 | 4/2002 | Perretta |
| 6,377,247 B1 | 4/2002 | Halverson et al. |
| 6,394,445 B1 | 5/2002 | d'Agrella et al. |
| 6,395,123 B1 | 5/2002 | Fromson et al. |
| 6,419,219 B2 | 7/2002 | Schaefer et al. |
| 6,427,999 B1 | 8/2002 | Christofferson |
| 6,464,218 B2 | 10/2002 | Neary et al. |
| 6,473,169 B1 | 10/2002 | Dawley et al. |
| 6,474,159 B1 | 11/2002 | Foxlin et al. |
| 6,494,950 B1 | 12/2002 | Fujita et al. |
| 6,525,333 B1 | 2/2003 | Dawley et al. |
| 6,543,350 B2 | 4/2003 | Gilliam et al. |
| 6,550,389 B1 | 4/2003 | Goto et al. |
| 6,553,907 B2 | 4/2003 | Richards |
| 6,572,097 B2 | 6/2003 | d'Agrella et al. |
| 6,572,098 B2 | 6/2003 | Schaefer et al. |
| 6,584,895 B1 | 7/2003 | Strauch et al. |
| 6,594,927 B2 | 7/2003 | Witkowski |
| 6,621,569 B2 | 9/2003 | Sones |
| 6,640,713 B2 | 11/2003 | Landsman |
| 6,651,559 B1 | 11/2003 | Haraux et al. |
| 6,775,633 B2 | 8/2004 | Edge |
| 6,779,445 B2 | 8/2004 | Schaede |
| 6,779,455 B2 | 8/2004 | Figov et al. |
| 6,796,227 B1 | 9/2004 | Miller |
| 6,796,240 B2 | 9/2004 | Sainio et al. |
| 6,827,019 B1 | 12/2004 | Hieronymus et al. |
| 6,866,135 B2 | 3/2005 | Quadracci et al. |
| 6,867,423 B2 | 3/2005 | Warner |
| 6,874,420 B2 | 4/2005 | Lewis, Jr. et al. |
| 6,899,998 B2 | 5/2005 | Figov |
| 6,920,822 B2 | 7/2005 | Finan |
| 6,989,226 B2 | 1/2006 | Araki et al. |
| 7,013,803 B2 | 3/2006 | Hansen et al. |
| 7,017,492 B2 | 3/2006 | Seymour |
| 7,032,508 B2 | 4/2006 | Seymour |
| 7,044,902 B2 | 5/2006 | d'Agrella et al. |
| 7,048,111 B2 | 5/2006 | Christofferson |
| 7,119,820 B2 | 10/2006 | Montgomery |
| 7,121,201 B2 | 10/2006 | Landskron et al. |
| 7,187,797 B2 | 3/2007 | Sones |
| 7,227,166 B2 | 6/2007 | Cochran et al. |
| 7,253,929 B2 | 8/2007 | Wendel |
| 7,262,779 B1 | 8/2007 | Sones |
| 7,307,755 B2 | 12/2007 | Delang et al. |
| 7,308,142 B2 | 12/2007 | Sones et al. |
| 7,309,563 B2 | 12/2007 | Paul et al. |
| 7,313,270 B2 | 12/2007 | Sones |
| 7,379,177 B1 | 5/2008 | Sones et al. |
| 7,394,937 B2 | 7/2008 | Sones |
| 7,399,526 B2 | 7/2008 | Dalmais et al. |
| 7,414,716 B2 | 8/2008 | Sones et al. |
| 7,423,280 B2 | 9/2008 | Pearson et al. |
| 7,430,311 B2 | 9/2008 | Sones et al. |
| 7,464,642 B2 | 12/2008 | Schaede |
| 7,488,965 B2 | 2/2009 | Cochran et al. |
| 7,541,572 B2 | 6/2009 | Novini et al. |
| 7,621,217 B2 | 11/2009 | Atwater et al. |
| 7,625,100 B2 | 12/2009 | Sones et al. |
| 7,626,158 B2 | 12/2009 | Diehr et al. |
| 7,627,141 B2 | 12/2009 | Noffke et al. |
| 7,652,792 B2 | 1/2010 | Honeck et al. |
| 7,667,836 B2 | 2/2010 | Sones et al. |
| 7,684,034 B2 | 3/2010 | Sones et al. |
| 7,691,549 B1 | 4/2010 | Glasser |
| 7,697,132 B2 | 4/2010 | Sones et al. |
| 7,729,528 B2 | 6/2010 | O'Dell et al. |
| 7,732,796 B2 | 6/2010 | Pearson et al. |
| 7,752,965 B2 | 7/2010 | Atwater et al. |
| 7,773,214 B2 | 8/2010 | Sones et al. |
| 7,810,922 B2 | 10/2010 | Gervasi et al. |
| 7,816,639 B2 | 10/2010 | Diehr et al. |
| 7,821,629 B2 | 10/2010 | Akkerman et al. |
| 7,860,278 B2 | 12/2010 | Noffke et al. |
| 7,876,951 B2 | 1/2011 | Novini et al. |
| 7,898,655 B2 | 3/2011 | Sones et al. |
| 7,969,613 B2 | 6/2011 | Honeck et al. |
| 7,997,199 B2 | 8/2011 | Watanabe et al. |
| RE42,715 E | 9/2011 | Sones |
| 8,014,586 B2 | 9/2011 | Sones et al. |
| 8,028,981 B2 | 10/2011 | Graushar |
| 8,034,207 B2 | 10/2011 | Hunahata |
| 8,039,826 B2 | 10/2011 | Pearson et al. |
| 8,083,455 B2 | 12/2011 | Graushar et al. |
| 8,120,811 B2 | 2/2012 | Graushar et al. |
| 8,183,550 B2 | 5/2012 | Pearson et al. |
| 8,194,283 B2 | 6/2012 | Honeck et al. |
| 8,386,528 B2 | 2/2013 | Blohm et al. |
| 8,409,698 B2 | 4/2013 | Byers et al. |
| 8,437,041 B2 | 5/2013 | Honeck et al. |
| 8,441,700 B2 | 5/2013 | Noffke |
| 8,544,385 B2 | 10/2013 | Schuler-Cossette et al. |
| 8,586,956 B2 | 11/2013 | Pearson et al. |
| 8,625,152 B2 | 1/2014 | Graushar et al. |
| 8,817,345 B2 | 8/2014 | Noffke |
| 9,047,520 B2 | 6/2015 | Honeck et al. |
| 9,327,493 B1 | 5/2016 | Vella |
| 9,409,433 B2 | 8/2016 | Carreras |
| 9,452,600 B2 | 9/2016 | Coates et al. |
| 9,454,812 B2 | 9/2016 | Honeck et al. |
| 9,475,276 B2 | 10/2016 | Fleischer et al. |
| 9,517,498 B2 | 12/2016 | Siles et al. |
| 9,550,372 B2 | 1/2017 | Vella |
| 9,555,616 B2 | 1/2017 | Carreras et al. |
| 9,565,339 B2 | 2/2017 | Noffke et al. |
| 9,663,846 B2 | 5/2017 | Siles et al. |
| 9,712,719 B2 | 7/2017 | Honeck et al. |
| 9,734,570 B2 | 8/2017 | Honeck et al. |
| 9,962,924 B2 | 5/2018 | Carreras |
| 2001/0022421 A1 | 9/2001 | Schaefer et al. |
| 2001/0040340 A1 | 11/2001 | Neary et al. |
| 2002/0043757 A1 | 4/2002 | d'Agrella et al. |
| 2002/0074721 A1 | 6/2002 | Schaefer et al. |
| 2002/0083855 A1 | 7/2002 | Samworth |
| 2002/0088690 A1 | 7/2002 | Christofferson |
| 2002/0178945 A1 | 12/2002 | Richards |
| 2002/0178952 A1 | 12/2002 | Sainio et al. |
| 2002/0189471 A1 | 12/2002 | Juffinger et al. |
| 2003/0015105 A1 | 1/2003 | Dewig |
| 2003/0056410 A1 | 3/2003 | Witkowski |
| 2003/0089261 A1 | 5/2003 | Landsman |
| 2003/0101885 A1 | 6/2003 | Jordan |
| 2003/0145745 A1 | 8/2003 | Hansen et al. |
| 2003/0145751 A1 | 8/2003 | Hansen et al. |
| 2003/0147090 A1 | 8/2003 | Hansen et al. |
| 2003/0147101 A1 | 8/2003 | Wendel |
| 2003/0150346 A1 | 8/2003 | Haraux et al. |
| 2003/0179920 A1 | 9/2003 | Hooker et al. |
| 2003/0221569 A1 | 12/2003 | Landskron et al. |
| 2004/0008358 A1 | 1/2004 | Kiyohara |
| 2004/0011234 A1 | 1/2004 | Figov et al. |
| 2004/0051061 A1 | 3/2004 | Warner |
| 2004/0126682 A1 | 7/2004 | Dreher et al. |
| 2004/0168886 A1 | 9/2004 | Quadracci et al. |
| 2004/0173110 A1 | 9/2004 | Roesch |
| 2004/0175093 A1 | 9/2004 | Montgomery |
| 2004/0177783 A1 | 9/2004 | Seymour |
| 2004/0182262 A1 | 9/2004 | Seymour |
| 2004/0188644 A1 | 9/2004 | Rappette et al. |
| 2004/0191693 A1 | 9/2004 | Takamiya |
| 2004/0213433 A1 | 10/2004 | Noffke et al. |
| 2004/0213436 A1 | 10/2004 | Noffke et al. |
| 2005/0098051 A1 | 5/2005 | Flint et al. |

(56) References Cited

U.S. PATENT DOCUMENTS

| | | |
|---|---|---|
| 2005/0099795 A1 | 5/2005 | Seymour |
| 2005/0124481 A1 | 6/2005 | d'Agrella et al. |
| 2005/0226466 A1 | 10/2005 | Seymour |
| 2006/0019196 A1 | 1/2006 | Miyoshi |
| 2006/0027768 A1 | 2/2006 | Pearson et al. |
| 2006/0121389 A1 | 6/2006 | Anzures et al. |
| 2006/0185549 A1 | 8/2006 | Schonert et al. |
| 2007/0084368 A1 | 4/2007 | Vest et al. |
| 2008/0002182 A1 | 1/2008 | Akkerman et al. |
| 2008/0035534 A1 | 2/2008 | Graushar |
| 2008/0093788 A1 | 4/2008 | Graushar |
| 2008/0289528 A1 | 11/2008 | Pearson et al. |
| 2008/0297861 A1 | 12/2008 | Noffke |
| 2008/0315510 A1 | 12/2008 | Brzinski et al. |
| 2009/0128590 A1 | 5/2009 | Nagai |
| 2009/0128860 A1 | 5/2009 | Graushar et al. |
| 2009/0148002 A1 | 6/2009 | Spitzig |
| 2009/0186308 A1 | 7/2009 | Rudolph |
| 2009/0211474 A1 | 8/2009 | Atwater et al. |
| 2009/0276466 A1 | 11/2009 | Blohm et al. |
| 2009/0303307 A1 | 12/2009 | Yasumatsu |
| 2010/0031834 A1 | 2/2010 | Morgavi et al. |
| 2010/0128318 A1 | 5/2010 | Noffke et al. |
| 2010/0229737 A1 | 9/2010 | Ouchi |
| 2010/0264338 A1 | 10/2010 | Pearson et al. |
| 2010/0295885 A1 | 11/2010 | LaCaze |
| 2010/0319555 A1 | 12/2010 | Hashimoto et al. |
| 2011/0079158 A1 | 4/2011 | Recchia et al. |
| 2011/0104615 A1 | 5/2011 | Sievers |
| 2011/0126760 A1 | 6/2011 | Daems et al. |
| 2011/0140010 A1 | 6/2011 | Akkerman et al. |
| 2011/0162542 A1 | 7/2011 | Nakamura et al. |
| 2011/0255134 A1 | 10/2011 | Shigeta et al. |
| 2011/0255137 A1 | 10/2011 | Pearson et al. |
| 2011/0283905 A1 | 11/2011 | Sakata |
| 2012/0017783 A1 | 1/2012 | Uptergrove |
| 2012/0048135 A1 | 3/2012 | Burberry et al. |
| 2012/0103216 A1 | 5/2012 | Knisel et al. |
| 2012/0204746 A1 | 8/2012 | Fullgraf |
| 2012/0206739 A1 | 8/2012 | Graushar et al. |
| 2012/0216689 A1 | 8/2012 | Cochran et al. |
| 2012/0238675 A1 | 9/2012 | Kataura et al. |
| 2012/0272846 A1 | 11/2012 | Fleischer et al. |
| 2012/0274695 A1 | 11/2012 | LaCaze et al. |
| 2012/0315412 A1 | 12/2012 | Clayton et al. |
| 2013/0019566 A1 | 1/2013 | Schach |
| 2013/0021600 A1 | 1/2013 | Pearson et al. |
| 2013/0075675 A1 | 3/2013 | Krutak et al. |
| 2013/0105743 A1 | 5/2013 | Owen et al. |
| 2013/0176358 A1 | 7/2013 | Yamada et al. |
| 2013/0208105 A1 | 8/2013 | Schmidt et al. |
| 2013/0228086 A1 | 9/2013 | Baldwin et al. |
| 2013/0231242 A1 | 9/2013 | Clayton et al. |
| 2013/0242276 A1 | 9/2013 | Schadebrodt et al. |
| 2013/0321887 A1 | 12/2013 | Noffke |
| 2013/0340885 A1 | 12/2013 | Clayton et al. |
| 2014/0039091 A1 | 2/2014 | Owen et al. |
| 2014/0072442 A1 | 3/2014 | Bowman et al. |
| 2014/0187668 A1 | 7/2014 | Owen et al. |
| 2014/0210201 A1 | 7/2014 | Owen et al. |
| 2014/0212654 A1 | 7/2014 | Clayton et al. |
| 2014/0253718 A1 | 9/2014 | Leitzen et al. |
| 2014/0272161 A1 | 9/2014 | Clayton et al. |
| 2015/0035970 A1 | 2/2015 | Brumbaugh et al. |
| 2015/0128819 A1 | 5/2015 | Vella |
| 2015/0128821 A1 | 5/2015 | Vella |
| 2015/0138295 A1 | 5/2015 | Lindner et al. |
| 2015/0174891 A1 | 6/2015 | Boas et al. |
| 2015/0183211 A1 | 7/2015 | Petti et al. |
| 2015/0290923 A1 | 10/2015 | Treloar |
| 2016/0001546 A1 | 1/2016 | Hughes et al. |
| 2016/0129687 A1 | 5/2016 | Boas et al. |
| 2016/0229198 A1* | 8/2016 | Izume ............... B41F 33/0045 |
| 2016/0337554 A1 | 11/2016 | Noffke et al. |
| 2016/0347048 A1 | 12/2016 | Carreras |
| 2017/0008270 A1 | 1/2017 | Fleischer et al. |
| 2017/0011530 A1 | 1/2017 | Honeck et al. |
| 2017/0069079 A1 | 3/2017 | Honeck et al. |
| 2017/0013452 A1 | 4/2017 | Boas et al. |
| 2017/0096001 A1 | 4/2017 | Carreras et al. |
| 2017/0157964 A1 | 6/2017 | Izume |
| 2017/0334659 A1* | 11/2017 | Leitzen ............... B65G 43/10 |
| 2018/0009216 A1 | 1/2018 | Egerton et al. |
| 2018/0009217 A1 | 1/2018 | Kilde et al. |
| 2019/0257692 A1 | 8/2019 | Cochran |

FOREIGN PATENT DOCUMENTS

| | | |
|---|---|---|
| CN | 101808825 | 8/2010 |
| DE | 19807924 | 8/1998 |
| DE | 10225198 | 1/2004 |
| DE | 202004007783 | 9/2005 |
| DE | 102006025897 | 1/2007 |
| DE | 102009058851 | 6/2011 |
| EP | 0123305 | 10/1984 |
| EP | 202928 | 11/1986 |
| EP | 317987 | 5/1989 |
| EP | 545862 | 6/1993 |
| EP | 0641648 | 3/1995 |
| EP | 0717320 | 6/1996 |
| EP | 0805038 | 11/1997 |
| EP | 0816097 | 1/1998 |
| EP | 0922580 | 6/1999 |
| EP | 968491 | 1/2000 |
| EP | 1080887 | 3/2001 |
| EP | 1260365 | 11/2002 |
| EP | 1262316 | 12/2002 |
| EP | 1590177 | 11/2005 |
| EP | 1630600 | 3/2006 |
| EP | 1684990 | 8/2006 |
| EP | 2153991 | 2/2010 |
| EP | 2196314 | 6/2010 |
| EP | 2242595 | 10/2010 |
| EP | 2317387 | 5/2011 |
| EP | 2384890 | 11/2011 |
| EP | 2701912 | 3/2014 |
| EP | 2809521 | 12/2014 |
| EP | 2842747 | 3/2015 |
| EP | 2943339 | 11/2015 |
| GB | 1298205 | 11/1972 |
| GB | 2097331 | 11/1982 |
| GB | 2299537 | 10/1996 |
| GB | 2504370 | 1/2014 |
| GB | 2512678 | 10/2014 |
| JP | S58-49256 | 3/1983 |
| JP | H09-039366 | 2/1997 |
| JP | H09-210924 | 8/1997 |
| JP | H09-295396 | 11/1997 |
| JP | 11115159 A * | 4/1999 |
| JP | 2000-121580 | 4/2000 |
| JP | 2000-258899 | 9/2000 |
| JP | 2001-030612 | 2/2001 |
| JP | 3216526 | 10/2001 |
| JP | 2002-156338 | 5/2002 |
| JP | 2006-068965 | 3/2006 |
| JP | 2007-076209 | 3/2007 |
| JP | 2008-249668 | 10/2008 |
| JP | 2010-249541 | 11/2010 |
| KR | 10-2006-0004679 | 1/2006 |
| RU | 2024409 | 12/1994 |
| SU | 1169832 | 7/1985 |
| WO | WO 90/02044 | 3/1990 |
| WO | WO 90/15715 | 12/1990 |
| WO | WO 92/09435 | 6/1992 |
| WO | WO 94/07693 | 4/1994 |
| WO | WO 96/41299 | 12/1996 |
| WO | WO 98/17474 | 4/1998 |
| WO | WO 98/41966 | 9/1998 |
| WO | WO 00/27644 | 5/2000 |
| WO | WO 01/12440 | 2/2001 |
| WO | WO 03/089213 | 10/2003 |
| WO | WO 2004/069539 | 8/2004 |
| WO | WO 2005/023545 | 3/2005 |
| WO | WO 2005/047011 | 5/2005 |

(56) References Cited

FOREIGN PATENT DOCUMENTS

| | | |
|---|---|---|
| WO | WO 2006/048022 | 5/2006 |
| WO | WO 2008/092940 | 8/2008 |
| WO | WO 2009/090389 | 7/2009 |
| WO | WO 2012/054655 | 4/2012 |
| WO | WO 2012/162073 | 11/2012 |
| WO | WO 2013/028804 | 2/2013 |
| WO | WO 2013/113616 | 8/2013 |
| WO | WO 2013/115800 | 8/2013 |
| WO | WO 2013/155423 | 10/2013 |
| WO | WO 2014/006517 | 1/2014 |
| WO | WO 2014/008544 | 1/2014 |
| WO | WO 2014/096088 | 6/2014 |
| WO | WO 2014/108489 | 7/2014 |
| WO | WO 2014/128200 | 8/2014 |
| WO | WO 2014/144853 | 9/2014 |
| WO | WO 2014/164796 | 10/2014 |
| WO | WO 2015/046119 | 4/2015 |
| WO | WO 2015/073240 | 5/2015 |
| WO | WO 2015/101828 | 7/2015 |
| WO | WO 2016/087876 | 6/2016 |
| WO | WO 2016/183452 | 11/2016 |
| WO | WO 2017/201398 | 11/2017 |
| WO | WO 2018/013465 | 1/2018 |
| WO | WO 2018/019912 | 2/2018 |

OTHER PUBLICATIONS

U.S. Appl. No. 15/875,968, filed Jan. 19, 2018, Efner.
"Blanket for Offset Printing," Offset printing technology, 2016, 4 pages [retrieved from: www.offsetprintingtechnology.com/sub-categories/blanket-for-offset-printing/].
"Chemical milling," Wikipedia, Feb. 13, 2015, retrieved from http://en.wikipedia.org/wiki/Chemical_milling, 6 pages.
"Complete Deco Inspection," Presco Technology, Inc., © 2017, 2 pages [retrieved online from: www.pressco.com/applications/metals/beverage-cans/complete-deco-inspection/].
"Cyrel® DSP High Performance Plate," DuPont, 2016, 2 pages [retrieved online from: www.dupont.com/produts-and-services/printing-package-printing/flexographic-platemaking-systems/brands/cyrel/products/sub-products/cyrel-dsp.html].
"Digital Ink System," QuadTech®, Apr. 2017, 2 pages [retreived online from: https://www.quadtechworld.com/downloads/brochures/Digital_Ink_System_en.pdf].
"Dry offset Printing," Encyclopaedia Britannica, 2016, 2 pages [retrieved online from: www.britannica.com/technology/dry-offset].
"Ductor Roller," PrintWiki, 2016, 2 pages [retrieved online from: printwiki.org/Ductor_Roller].
"DuPont™ Cyrel®: CyrelTM Digital flex plate Imagers (CDI)" DuPont, 2009, retrieved from http://www2.dupont.com/Packaging_Graphics/en_GB/assets/downloads/pdf/CDI_family_English.pdf, 8 pages.
"DuPont™ Cyrel® DPR: Robust Digital Plate for Highest Quality Printing," DuPont, 2010, retrieved from http://www2.dupont.com/Packaging_Graphics/en_US/assets/downloads/pdf/DP_Cyrel_DS_DPR_us_low.pdf, 2 pages.
"DuPont™ Cyrel® NOWS: Rugged, High-Performance Analog Plate," DuPont, 2007, retrieved from http://www2.dupont.com/Packaging_Graphics/en_US/assets/downloads/pdf/Cyrel_NOWS.pdf, 2 pages.
"EPDM rubber," Wikipedia, Oct. 24, 2014, retrieved from http://enwikipedia.org/wiki/EPDM_rubber, 3 pages.
"Flexographic ink," Wikipedia, Sep. 18, 2014, retrieved from http://en.wikipedia.org/wiki/Flexographic_ink, 2 pages.
"Flexography," Wikipedia, Dec. 15, 2014, retrieved from http://en.wikipedia.org/wiki/Flexographic, 6 pages.
"Fountain Blade," PrintWiki, 2017, 1 page [retrieved online from: printwiki.org/Fountain_Blade].
"Inside a Ball Beverage Can Plant," Ball, Sep. 2002, 1 page [retrieved online from: www.ball.com/Ball/media/Ball/Global/Downloads/How_a_Ball_Metal_Beverage_Can_Is_Made.pdf?ext=.pdf].
"Laser engraving," Wikipedia, Jan. 16, 2015, retrieved from http://en.wikipedia.org/wiki/Laser_engraving, 10 pages.
"Luminous paint," Wikipedia, Jul. 7, 2014, retrieved from http://en.wikipedia.org/wiki/Luminous_paint, 4 pages.
"Offset Lithography," PrintWiki, retrieved Feb. 9, 2015 from http://printwiki.org/Offset_Lithography, 8 pages.
"Offset printing," Offset printing technology, 2016, 4 pages [retrieved online from: www.offsetprintingtechnology.com].
"Offset printing," Wikipedia, Dec. 11, 2014, retrieved from http://en.wikipedia.org/wiki/Offset_printing, 12 pages.
"Offset Printing/Dry Offset," Buse Printing & Packaging, 2016, 1 page [retrieved online from: buseprinting.com/offset_printing.html].
"Offset printing," BusinessDictionary.com, 2015, 2 pages [retrieved online from: www.businessdictionary.com/definition/offset-printing.html].
"Plate," PrintWiki, retrieved Feb. 9, 2015 from http://printwiki.org/Plate, 6 pages.
"Printmaking," Wikipedia, Feb. 12, 2015, retrieved from http://en.wikipedia.org/wiki/Printmaking, 14 pages.
"What is offset printing (offset lithography)?" TechTarget, 2016, 13 pages [retrieved online from: whatis.techtarget.com/definition/offset-printing-offset-lithography].
Bodwell et al., "Advancing Flexography: The Technical Path Forward," DuPont, 2011, retrieved from www2.dupont.com/Packaging_Graphics/en_US/assets/downloads/pdf/AdvFlexo_Brochure.pdf, 12 pages.
Mine, "How Offset Printing Works," retrieved on Feb. 9, 2015 from www.howstuffworks.com/offset-printing.htm/printable, 5 pages.
International Search Report and Written Opinion for International (PCT) Patent Application No. PCT/US2017/042853, dated Sep. 27, 2017 9 pages.
Official Action for Australia Patent Application No. 2017300535, dated May 23, 2019 5 pages.
Decision to Grant with machine translation for Russia Patent Application No. 2019104634/12, dated Jul. 31, 2019 24 pages.
International Preliminary Report on Patentability for International (PCT) Patent Application No. PCT/2017/042853, dated Jan. 31, 2019 8 pages.
International Search Report and Written Opinion for International (PCT) Patent Application No. PCT/US19/14031, dated Apr. 12, 2019 9 pages.
Official Action for U.S. Appl. No. 15/875,968, dated Nov. 2, 2018 14 pages.
Official Action for U.S. Appl. No. 15/875,968, dated May 16, 2019 15 pages.
Official Action for Canada Patent Application No. 3.029,031, dated Dec. 13, 2019 4 pages.
Official Action for U.S. Appl. No. 15/875,968, dated Oct. 3, 2019 17 pages.
Official Action with English Translation for China Patent Application No. 201780044318.1, dated Feb. 25, 2020 27 pages.
Extended Search Report for European Patent Application No. 17831789.7, dated Mar. 6, 2020 9 pages.
Notice of Acceptance for Australia Patent Application No. 2017300535, dated May 27, 2020 4 pages.
International Preliminary Report on Patentability for International (PCT) Patent Application No. PCT/2019/014031, dated Jul. 30, 2020 8 pages.
Official Action for U.S. Appl. No. 15/875,968, dated Jun. 11, 2020 23 pages.

\* cited by examiner

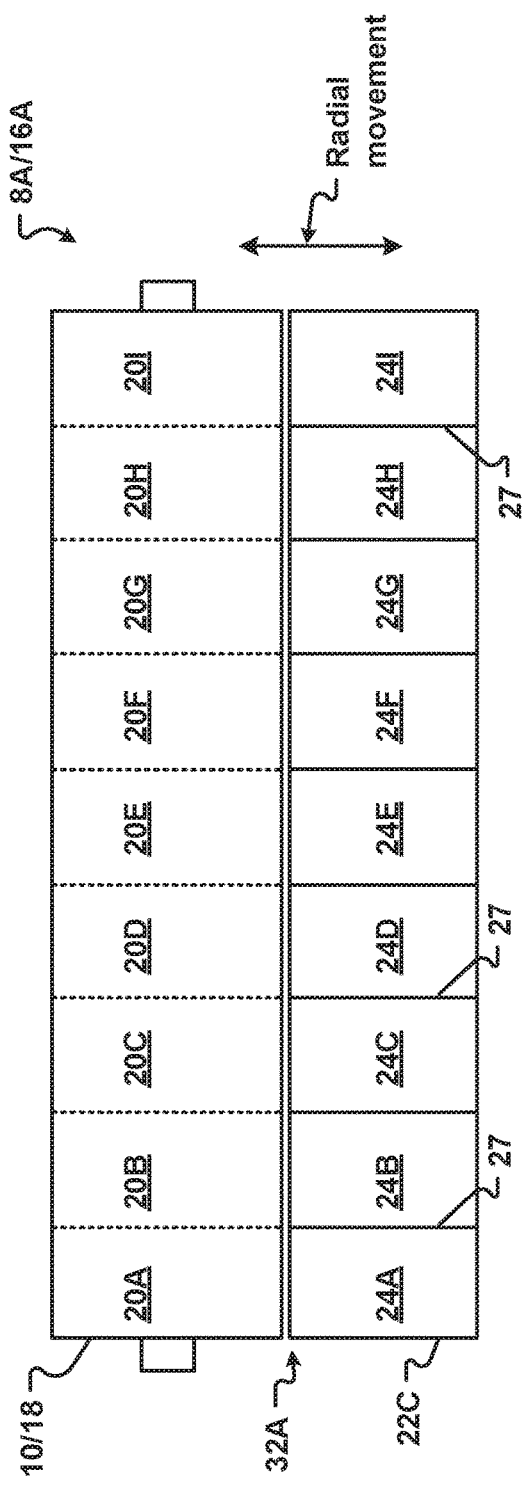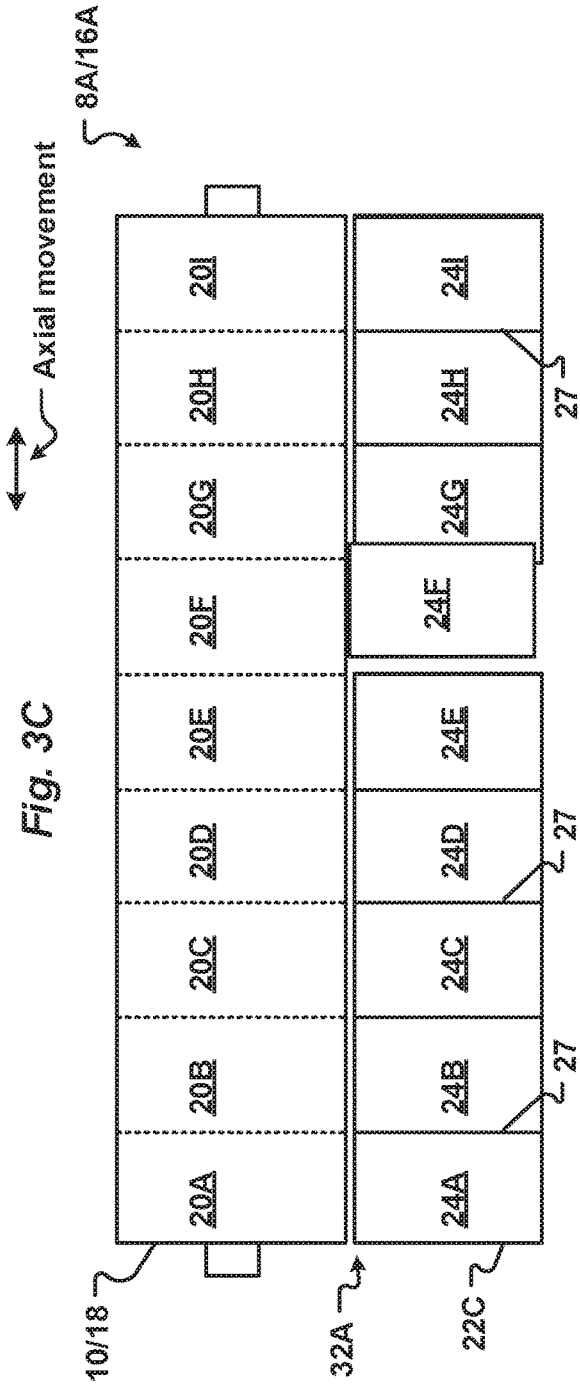

SYSTEM AND METHOD FOR ALIGNING AN INKER OF A DECORATOR

CROSS-REFERENCE TO RELATED APPLICATIONS

This application claims priority under 35 U.S.C. § 119(e) to U.S. Provisional Patent Application Ser. No. 62/364,728 filed Jul. 20, 2016 and entitled "System and Method for Aligning an Inker of a Decorator," which is incorporated herein in its entirety by reference.

FIELD OF THE INVENTION

The present invention relates generally to decorating containers. More specifically, this invention provides an apparatus and method used to monitor and automatically control the position and application of ink to an exterior surface of metallic containers.

BACKGROUND

Metallic beverage containers offer distributors and consumers many benefits. The metallic body of a beverage container provides optimal protection properties for products. For example, the metallic body prevents $CO_2$ migration and transmission of UV radiation which may damage beverages, negatively influencing the flavor, appearance, or color of the product. Metallic beverage containers also offer an impermeable barrier to light, water vapor, oils and fats, oxygen, and micro-organisms and keep the contents of the container fresh and protected from external influences, thereby guaranteeing a long shelf-life. The surfaces of metallic containers are also ideal for decorating with brand names, logos, designs, product information, and/or other preferred indicia for identifying, marketing, and distinguishing the metallic container and its contents from other products and competitors. Thus, metallic containers offer bottlers, distributors, and retailers a distinct advantage at the point of sale.

The increased durability of metallic beverage containers and aesthetic advantage compared to glass and plastic containers reduces the number of containers damaged during processing and shipping, resulting in further savings. Additionally, metallic beverage containers are lighter than glass containers of comparable size, resulting in energy savings during shipment. Further, metallic beverage containers can be manufactured with high burst pressures which make them ideal and safe for use as containers holding products under pressure, such as containers for carbonated beverages.

Additionally, many consumers prefer metallic containers compared to containers made of glass or plastic. Metallic containers are particularly attractive to consumers because of the convenience they offer. The light weight of metallic containers makes them easier to carry than glass containers. Metallic containers are particularly suitable for use in public places and outdoors because they are more durable than glass containers. Further, some consumers avoid plastic containers due to concerns that the plastic may leach chemicals into consumable products.

As a result of these benefits, sales of metallic containers were valued at approximately $53 billion globally in 2014. A large percentage of the metallic container market is driven by beverage containers. According to one report, approximately 290 billion metallic beverage containers were shipped globally in 2012. One U.S. trade group reported that 126 billion metallic containers were shipped in the U.S. alone in 2014. To meet this demand, metallic container manufacturing facilities operate some of the fastest, if not the fastest, production lines in the container industry. In some container production lines, such as those related to metallic containers formed by an impact extrusion process, decorators may operate at from about 120 to about 240 metallic containers per minute. In beverage container manufacturing lines, production equipment, including decorators, typically must operate at 500-700 metallic containers per minute. More preferably, decorators may be required to operate at production speeds of at least one thousand, and even more preferably, several thousand cylindrical metallic containers per minute. Because of the high speeds of container production lines, techniques or processes that may work in other industries or with containers formed of other materials do not necessarily work at the high speeds required for metallic container production lines. For example, apparatus and methods of decorating sheets or webs of paper and cardboard materials are distinct from decorators used for 3-dimensional objects, such as metallic containers. Accordingly, specialized equipment and techniques are often required for many of the operations used to form and decorate metallic containers.

Metallic containers are frequently decorated with an image or indicia, such as a brand name, logo, product information, or design, by a lithographic or off-set printing process. Various examples of printing methods and apparatus are described in U.S. Pat. Nos. 3,960,073; 4,384,518; 5,233,922; 6,550,389; 6,899,998; U.S. Patent App. Pub. No. 2012/0272846; U.S. Patent App. Pub. No. 2014/0360394; U.S. Patent App. No. 2015/0183211; U.S. Patent App. Pub. No. 2015/0217559; WIPO Publication No. WO 2014/006517; WIPO Publication No. WO 2014/008544; WIPO Publication No. WO 2013/113616; WIPO Publication No. WO 2014/108489; and WIPO Publication No. WO 2014/128200 each of which are each incorporated herein by reference in their entireties.

In off-set printing, one or more printing plates with image regions are attached to a plate cylinder (or press cylinder) of a decorator. The image regions can include both ink receiving regions and areas that do not receive ink. Inking assemblies transfer ink to the printing plates on a plate cylinder. The ink adheres to the ink receiving regions of each printing plate. A decorator may have a plurality of plate cylinders with inking assemblies to transfer different colors of ink to the printing plates affixed to each plate cylinder. For example, decorators used to decorate metallic containers frequently have from four to nine plate cylinders which each have an associated ink assembly.

Each inking assembly transfers a particular color of ink to the printing plates of a single associated plate cylinder. The inking assemblies generally include an ink reservoir and an ink blade positioned along an outer surface of an ink roller. The amount of ink transferred to the ink roller and subsequently to the printing plates is adjusted by altering a gap between an edge of the ink blade and an exterior surface of the ink roller. The ink blade may be divided into a plurality of individual segments known as blade segments.

The gap between the edge of the ink blade and the exterior surface of the ink rollers may be adjusted along the length of the ink roller by movement of ink keys interconnected to the ink blade. More specifically, an ink key may be advanced to move a portion of the edge of the ink blade closer to the exterior surface of the ink roller to decrease the amount of ink transferred to a portion of the ink roller. Similarly, the ink key may be withdrawn to move the edge of the ink blade further from the exterior surface of the ink roller to increase the amount of ink transferred to the portion of the ink roller. Some prior art ink blade assemblies are described in U.S. Pat. Nos. 4,000,695, 4,008,664, 5,025,676, 5,052,298, 5,967,049, 5,967,050, 6,318,260, 7,969,613, U.S. Patent Application Pub. No. 2015/0128819, and U.S. Patent Application Pub. No. 2015/0128821 which are each incorporated herein by reference in their entireties. Another ink blade assembly is described in "QuadTech® Digital Ink System" which is available at https://www.quadtechworld.com/downloads/brochures/Digital_Ink_System_en.pdf which is incorporated herein by reference in its entirety.

After receiving ink, the printing plates transfer at least some of their ink to a printing blanket (also referred to as a "transfer blanket" or a "secondary transfer plate") attached to a blanket cylinder (also known as an "offset cylinder," a "printing cylinder," or a "segment wheel") of the decorator. Decorators used in the metallic container industry typically have from 2 to 12 printing blankets on the blanket cylinder. As the plate cylinder and blanket cylinder are rotated in unison, each of the one or more printing plates contacts a printing blanket and transfers a particular color of ink to the printing blanket. When the ink and image has been transferred from a printing plate of each plate cylinder to the printing blanket, the final lithographic image is formed on the printing blanket. For example, if the decorator includes five plate cylinders, one printing plate of each of the five plate cylinders will transfer inks and images to a single printing blanket to form the lithographic image on the printing blanket. A metallic container is then brought into rotational contact with the printing blanket of the blanket cylinder and the lithographic image is transferred from the printing blanket to the exterior surface of the metallic container.

Producing acceptable decorations on metallic containers with prior art decorators is dependent upon the skill and attentiveness of the operator and requires considerable labor and associated expense. More specifically, for each production run to decorate metallic containers with a decoration using a prior art decorator, the ink keys of each inking assembly are set to an initial position which takes a significant amount of time. Because some metallic container production lines may print in excess of 15 different decorations each day, the decorator may be out of production for numerous hours each day during set-up to prepare the decorator to print different decorations. Considering the high production speeds at which metallic container production lines typically operate, this is a considerable amount of down time and lost productivity.

As will be appreciated by one of skill in the art, the initial position of the ink keys may apply too much, or too little, ink to portions of the printing plates. When this occurs, the decoration transferred to the metallic container may be deficient because one or more of the color, density, depth, alignment, and consistency of the decoration do not meet targets set by a customer. Accordingly, the decorator must be taken out of production to adjust the position of the ink keys resulting in further down time and lost productivity.

The operator of the decorator may also periodically examine a sample decorated metallic container during a production run to determine if the decoration of the sample meets the color, density, depth, alignment, and/or consistency targets. If the operator determines the sample is deficient, the operator must then determine which of the plurality of ink keys for each of the inking assemblies requires adjustment, and how to adjust the ink key, to produce an acceptable decoration. Determining which ink keys to adjust to correct the deficiency can be difficult if the deficient decoration includes inks from two or more different inking assemblies. For example, if the color is deficient in a portion of the decoration, the operator may have to increase the amount of a first ink transferred to an axial portion of a first ink roller of a first inking assembly and decrease the amount of a second ink transferred to a corresponding axial portion of a second ink roller of a second inking assembly.

Additionally, the ink roller, printing plates, and printing blankets may become worn and require adjustment or replacement during a production run. Accordingly, the amount of ink transferred during the decoration process to the exterior surface of a metallic container may change during the production run, altering decoration parameters such as color, density, depth, alignment, and consistency. Thus, the decorations formed by known decorators must be inspected frequently during the production run and the ink keys are periodically adjusted to assure the quality and consistency required by the customer.

Manually identifying a deficient decoration and then manually adjusting the decorator takes a significant amount of time. Due to the high speeds of beverage container production lines, several hundred or even several thousand metallic containers with deficient decorations may be produced before the operator identifies the problem and then properly adjusts the ink keys. Accordingly, a large amount of waste metallic containers with deficient decorations are often created by prior art decorators. Additionally, after identifying a deficient decoration, the operator may shut down the decorator while adjusting the ink keys or other elements of the decorator. This wastes valuable production time and may delay the operation of downstream production equipment due to a lack of decorated metallic containers.

Adjusting ink keys of prior art decorators is difficult and can be dangerous. Some ink keys are difficult to access. Thus, an operator may be required to at least partially disassemble the decorator and use a tool to alter the position of an ink key. Tools used to adjust the ink keys can unintentionally damage the decorator. Further, tools used by the operator may be inadvertently misplaced or left within the decorator assembly, requiring additional downtime and the associated cost of loss of production. Additionally, the operator may be injured while reaching into the decorator to adjust the ink keys.

Due to the limitations associated with existing methods and apparatus used to decorate metallic containers, there is an unmet need for an apparatus and method of automatically monitoring and adjusting settings of a decorator that generates less waste, requires less operator time, and is less susceptible to human error than known decorators without sacrificing production efficiency or image quality in a high-speed beverage container production system.

SUMMARY OF THE INVENTION

The present invention provides various apparatus, instructions stored in a non-transitory computer readable medium, and methods for decorating metallic containers in a cost-effective, fast, and reliable manner. One aspect of the present invention is a closed-loop decorator assembly and system that includes a control system that can detect a deficient decoration on a cylindrical shaped metallic container. When the control system detects a deficient decoration, the control system can determine the cause of the deficiency. The control system may then automatically correct the deficiency. Additionally, or alternatively, the control system can alert an operator that specific adjustments are required. If the cause of the deficiency can be corrected by adjusting the amount of ink transferred to the metallic container, in one embodiment the control system can send a signal to adjust at least one ink blade to correct the deficient decoration on subsequent metallic containers. Further, a signal can be sent to the equipment on the production line to reject any container which has a flawed decoration. Flawed decorations can include, but are not limited to, color variations, ink density, ink thickness, ink color, incorrect positions of indicia, and quality of the decoration. In one embodiment, when the deficiency cannot be corrected by the control system, the control system can automatically stop the production line.

Another aspect of the present invention is a decorator that includes at least one sensor in communication with a control system. The sensor collects or obtains data related to decorations on metallic containers. The control system determines if the decorations are deficient using the data received from the sensor. If the control system determines a decoration, or a portion of a decoration, is deficient, the control system utilizes the data to adjust one or more ink blades to alter an amount of ink transferred to an ink roller of an inking assembly. The at least one sensor may collect optical and other types of data associated with the decoration on the metallic container. The sensor is operable to collect data of a sufficient resolution to identify a deficiency in the decoration. In one embodiment, the sensor is a camera. In another embodiment, the sensor is operable to collect three-dimensional data related to the decorations.

In one embodiment, the sensor collects data on the decoration formed on the cylindrical body of the metallic container. The sensor may collect data as the metallic container rotates around a longitudinal axis such that the sensor collects data on the entire exterior cylindrical surface of the metallic container. In another embodiment, the at least one sensor comprises three or more sensors to collect data on the cylindrical surface of the metallic container. Optionally, the three or more sensors are spaced substantially evenly around the longitudinal axis of the metallic container. The sensors may collect the data substantially simultaneously. In one embodiment, the decorator includes four sensors that each collect data related to at least about 25 percent of the cylindrical surface. In another embodiment, each of the four sensors collects data on about 30 percent of the cylindrical surface. As one of skill in the art will appreciate, the apparatus and methods described herein can be utilized on any type of surface or container such as an end closure or closed end-wall, and is not limited to cylindrical portions of metallic containers.

Optionally, a source of light may be associated with one or more of the sensors. The light source may produce light continuously. Alternatively, the light source may produce light periodically, such as a strobe light. In this manner, the light source may produce light at a time when an associated sensor is collecting data related to a decoration on a metallic container.

In one embodiment, the at least one sensor collects data from target areas of the cylindrical surface. Optionally, a target area may be associated with each ink blade of the decorator. The decorator may include from 20 to 80 individual ink blades. For example, the decorator may include four to eight inking assemblies. Each inking assembly may include from 5 to 10 ink blades to adjust the amount of ink supplied to 5 to 10 axial portions of an ink roller of the inking assembly. Accordingly, the at least one sensor may collect data from up to 20 to 80 different target areas of the cylindrical surface. In this manner, the at least one sensor can collect data related to ink regulated by each individual ink blade of the decorator. In one embodiment, the sensor can distinguish variations in the density of ink within a decoration on a metallic container. The control system can use the sensor data to determine a location of an ink density variation on the container cylindrical body. By determining an axial portion of the container cylindrical body associated with the location of an ink density variation, the control system can determine an ink blade of one of the four to eight inking assemblies responsible for the ink density variation. The control system may then send a signal to an actuator associated with the ink blade to alter a position of the ink blade to correct a deficient decoration caused by the ink density variation.

Another aspect of the present invention is a control system operable to control a decorator. The control system includes an instruction to determine how to adjust at least one ink blade of an inking assembly to correct a deficient decoration. The control system may receive data collected by a sensor about a decoration on a metallic container. The control system can determine if the decoration is deficient by comparing the sensor data to target information for one or more print parameters. The print parameters may include at least one of a color, density, thickness, orientation, and consistency of the decoration. When the decoration is deficient, the control system is operable to send a signal to an actuator associated with the at least one ink blade requiring adjustment. The signal causes the actuator to move the ink blade toward or away from an ink roller of an inking assembly. In this manner, the control system adjusts a gap between the ink blade and the ink roller to alter an amount of ink applied to an associated axial portion of the ink roller. The sensor may collect data on the entire exterior surface of a cylindrical body of the metallic container. In one embodiment, the sensor comprises from 3 to 5 sensors positioned to interpret the decoration quality on the entire cylindrical body of the metallic container. In one embodiment, the control system compares the sensor data to an image stored in a memory of the control system. In another embodiment, the image is of a decoration that is not deficient. In one embodiment, the control system compares portions of the sensor data to a plurality of corresponding portions of acceptable images of decorations stored in the memory. In one embodiment, the control system may also stop the decorator in response to determining a decoration is deficient. More specifically, in one embodiment, the control system includes an instruction to stop the decorator after determining a predetermined number of metallic containers include deficient decorations. In another embodiment, the control system includes an instruction to stop the decorator after identifying a predetermined cause of a deficient decoration. For example, the control system may include an instruction to stop the decorator if a deficient decoration is not associated with an improper amount of ink transferred to a metallic container. In another example, the control system may include an instruction to stop the decorator after determining a deficient decoration is related to one or more of: a defective ink, a printing plate, a transfer blanket, an undetermined cause, and an improper position or alignment of a portion of a decoration.

It is another aspect of the present invention to provide a decorator with an inking assembly. Optionally, the decorator includes a plurality of inking assemblies. The inking assembly includes one or more ink blades that can be adjusted radially with respect to an ink roller. Accordingly, at least a portion of each ink blade may be moved closer to, or away from, the ink roller. In one embodiment, each of the ink blades may optionally be moved axially relative to the ink roller. In this manner, the amount (or density, thickness) of ink transferred from an ink reservoir to each axial portion of the ink roller is adjustable. In one embodiment, each ink blade may pivot with respect to the ink roller. Alternatively, in another embodiment, each ink blade may move linearly toward and away from the ink roller.

The movement of the ink blades may be selectively provided by a variety of mechanisms as appreciated by one of skill in the art. In one embodiment, movement of the ink blades is generally controlled by a control system. The ink blades generally move in response to a force. In one embodiment, the force may be generated by one or more of electric, pneumatic, hydraulic, and magnetic energy.

In one embodiment, movement of one or more ink blades is generally provided by an actuator. In another embodiment, an actuator is associated with each individual ink blade. In another embodiment, a plurality of actuators may be associated with one ink blade. In one embodiment, the actuator initiates a force transverse to a longitudinal axis of an associated ink blade. In this manner, the ink blade, or a selected portion of the ink blade, pivots or bends with respect to the ink roller. In another embodiment, the actuator initiates a force which is generally parallel to the longitudinal axis of the associated ink blade. In this embodiment, the ink blade moves linearly and generally parallel to the blade axis toward or away from the ink roller. The actuators may be controlled by a control system of the decorator.

In one embodiment, movement of the ink blades is controlled by a control system. In one embodiment, the control system includes non-transitory, computer readable instructions stored in a memory that controls the movement of the ink blades. Optionally, the control system includes an instruction to receive data from a sensor related to a decoration on a metallic container. In one embodiment, the sensor includes a charge-coupled device (CCD) or complementary metal-oxide-semiconductor (CMOS) image sensor. In one embodiment, the sensor includes a plurality of individual sensing elements. Each sensing element collects data related to a portion of the metallic container. In one embodiment, each sensor element collects a pixel of data.

The control system includes an instruction to analyze the sensor data related to the decoration. In one embodiment, the control system includes an instruction to compare the sensor data to stored data. In one embodiment, the stored data is associated with at least one acceptable decoration. The acceptable decoration may be scanned and stored in memory accessible by the control system. In one embodiment, the acceptable decoration is scanned at a resolution such that the stored data related to the acceptable decoration includes a number of pixels that may be based on the number of individual sensing elements of the sensor. More specifically, the acceptable decoration may be stored in memory at a resolution equal to the resolution of the data collected by the sensor. In another embodiment, the acceptable decoration is stored at a resolution different from the resolution of the sensor. Accordingly, in another embodiment, the acceptable decoration is stored at a greater resolution, or a lesser resolution, than the resolution of the data collected by the sensor. In one embodiment, the stored data is in a computer database. The database may be stored in memory of the control system. Optionally, the control system accesses the database by a network connection.

In one embodiment, the control system includes instructions to determine the decoration is deficient when the sensor data differs by a predetermined amount from the stored data. In one embodiment, the control system compares a plurality of portions of the sensor data to corresponding portions of the stored data. If the control system determines that portions of the sensor data vary from portions of the stored data, the decoration is deficient. Optionally, when a predetermined percentage of portions of the sensor data vary from corresponding portions of the stored data the control system will determine the decoration is deficient.

In one embodiment, the control system includes instructions to automatically adjust at least one of the ink blades to correct the deficient decoration. For example, in one embodiment, the control system includes an instruction to send a signal to an actuator. In one embodiment, the signal causes the actuator to move an ink blade in a specific direction to alter an amount of ink transferred to the ink roller. Thus, the control system can automatically adjust the at least one ink blade without input from the operator. In another embodiment, the signal causes an actuator to move one or more of an ink roller, a plate cylinder, a printing plate, a blanket cylinder, a transfer blanket, and a support element in a specific direction to correct the deficient decoration.

In one embodiment, when the control system determines a decoration is deficient, the control system sends an alert to an operator of the decorator. In one embodiment, the control system presents the alert on a display of the control system. In another embodiment, the alert may include an audible portion, such as an alarm, siren, or voice message. In another embodiment, the alert may be transmitted to a user device by a network connection. Accordingly, in one embodiment, the operator may receive the alert on a smart phone, tablet, a laptop computer, or another portable device. The alert may include information about the deficient decoration. Optionally, the alert may include information related to an adjustment of at least one component of the decorator to correct the deficient decoration. For example, the alert may provide information about an adjustment to one or more of an ink blade, an ink roller, a plate cylinder, a printing plate, a blanket cylinder, a transfer blanket, or a support element determined by the control system to correct the deficient decoration. In one embodiment, the alert is presented to the operator on a display of the control system.

In one embodiment, the operator may use an input device of the control system to approve, disapprove, or alter an adjustment of at least one component of the decorator planned by the control system to correct a deficient decoration. More specifically, the operator may make an input to the control system to approve (or confirm) the planned adjustment, alter the planned adjustment, or disapprove the planned adjustment of the at least one ink blade. In one embodiment, the operator may make the input by contact with the display. In another embodiment, the operator input may be made with a mouse or other pointer of the control system. In still another embodiment, the input may be entered using a keyboard.

In one embodiment, the control system includes an instruction to automatically adjust the at least one component of the decorator after a predetermined period of time if the operator does not disapprove or cancel a planned adjustment. In still another embodiment, the control system includes instructions to automatically adjust the at least one component of the decorator after the predetermined period of time if the operator does not approve the planned adjustment.

In one embodiment, each ink blade has a width of between about 0.5 inches and about 1.5 inches. Accordingly, a decorator having five or six ink blades per inking assembly can decorate the cylindrical body of a metallic container with a height of up to about 7 inches. However, the inking assembly of the present invention could be used to decorate much larger cylindrically shaped objects or containers as will be appreciated by one of skill in the art. In one embodiment, the ink blades of each inking assembly have substantially uniform widths. Alternatively, the ink blades of each inking assembly may have different widths. In still another embodiment, inking assemblies of the decorator have from 5 to 10 ink blades.

Still another aspect of the present invention is a decorator that includes an ejector. The ejector removes metallic containers identified by the control system as having deficient decorations from a conveyor.

Yet another aspect of the present invention is a control system for a decorator that is capable of determining an acceptable decoration of a metallic container and whether the decoration quality falls within predetermined quality standards. Once the control system establishes an acceptable decoration, the control system can detect a decoration that varies from the acceptable decoration. In this manner, the control system can determine that a metallic container includes an unacceptable, or deficient, decoration.

It is one aspect of the present invention to provide an apparatus for decorating a metallic container. The apparatus generally includes, but is not limited to: (1) an inking assembly including an ink roller, a plurality of ink blades, an ink reservoir for ink, and an actuator to move each ink blade with respect to the ink roller to adjust an amount of ink transferred from the ink reservoir to the ink roller; (2) a plate cylinder including printing plates in a predetermined alignment with respect to the ink roller such that the printing plates each receive at least some ink from the ink roller; (3) a blanket cylinder including transfer blankets in a predetermined alignment with respect to the plate cylinder such that the transfer blankets receive at least some ink from the printing plates; (4) a support element to receive the metallic container from a conveyor and move the metallic container into contact with a transfer blanket of the blanket cylinder to transfer at least some ink from the transfer blanket to the metallic container to form a decoration on an exterior surface of the metallic container; (5) at least one sensor to collect or obtain data about the decoration on the exterior surface of the metallic container; and (6) a control system that receives the data from the at least one sensor and determines if the decoration includes a deficiency, wherein if the decoration includes a deficiency the control system sends a signal to an actuator to adjust an ink blade to correct the deficiency. In one embodiment, an actuator is associated with each ink blade. In one embodiment, adjusting the ink blade alters the amount of ink transferred to the ink roller. In another embodiment, the support element includes a plurality of stations. Each of the stations is operable to receive a metallic container. In another embodiment, the stations comprise mandrels. In one embodiment, the apparatus include a plurality of inking assemblies. Each of the plurality of inking assemblies is operable to transfer an ink to the printing plates.

Optionally, in one embodiment of the present invention, the apparatus further comprises an ejector in communication with the control system. The ejector removes metallic containers with deficient decorations from the conveyor in response to receiving a signal from the control system.

In one embodiment, the sensor includes a charge-coupled device (CCD) or complementary metal-oxide-semiconductor (CMOS) image sensor. In another embodiment, the at least one sensor is operable to obtain data about one or more of: (A) a color of the decoration; (B) a density of the decoration; (C) a depth or thickness of the decoration; (D) an alignment of the decoration; and (F) a consistency of the decoration. In one embodiment, the sensor is a camera. Optionally, the apparatus may include from one to five sensors each adapted to obtain one type of data, such as color, density, depth or thickness, alignment, and consistency, with respect to the decoration. In another embodiment, the apparatus includes from three to five sensors to obtain data on the cylindrical body of the metallic container. In one embodiment, the at least one sensor obtains data from a plurality of target areas of the exterior surface of the metallic container. In another embodiment, each of the plurality of target areas corresponds to any area of the exterior surface of the metallic container associated with one of the ink blades. In one embodiment, at least one target area is associated with an ink of one inking assembly.

In another embodiment, the control system is operable to determine a deficiency that includes an error in at least one of: (i) a color of the decoration; (ii) a density of the decoration; (iii) a thickness of the decoration; (iv) an alignment of the decoration; and (v) a consistency of the decoration. In response to detecting a deficiency in a decoration, the control system is operable to alter a position of at least one of the plurality of ink blades while the apparatus is in operation decorating the metallic containers. The control system can send a signal to an actuator associated with the one ink blade to selectively move the ink blade to a predetermined position with respect to the ink roller. In one embodiment, a distance between the ink blade and an axial portion of the ink roller is altered.

It is another aspect of the present invention to provide a method of sensing and correcting an abnormality in a decoration applied to an exterior surface of a container. The method includes, but is not limited to: (1) providing a container; (2) decorating the container with a decorator; (3) obtaining data about the decoration on the exterior surface of the container by at least one sensor; (4) determining, by a control system, if the decoration includes an abnormality; and (5) if the decoration includes an abnormality, sending, by the control system, a signal to the decorator to alter at least one of a color and a density of subsequent decorations. In one embodiment, the container is a metallic container including a closed end-wall and a body portion extending from the closed end-wall. In one embodiment, the body portion is substantially cylindrical. Optionally, the method may further comprise sending an alert to an operator. In one embodiment, the alert is presented on a display of the control system. In another embodiment, the alert includes information about the abnormality. In one embodiment, the information about the abnormality includes an image of the container exterior surface obtained by the at least one sensor. In another embodiment, the alert includes information about the signal sent to the decorator by the control system.

In one embodiment of the present invention the decorator includes: (a) an inking assembly including an ink roller, a plurality of ink blades, an ink reservoir for ink, and an actuator to move the ink blades with respect to the ink roller to adjust the amount of ink transferred from the ink reservoir to the ink roller; (b) a plate cylinder including printing plates in a predetermined alignment with respect to the ink roller such that each of the printing plates receive at least some ink from the ink roller; (c) a blanket cylinder including transfer blankets in a predetermined alignment with respect to the plate cylinder such that each transfer blanket receives at least some ink from one of the printing plates of the plate cylinder; and (d) a support device to receive a container from a conveyor and move the container into contact with a transfer blanket of the blanket cylinder to transfer at least some ink from the transfer blanket to the container to form the decoration on an exterior surface of the container. In one embodiment, an actuator is associated with each ink blade. In another embodiment, the support device includes a plurality of stations that are each operable to receive a container. In still another embodiment, the decorator includes from two to twelve inking assemblies. Each of the inking assemblies is operable to transfer an ink to the printing plates of the plate cylinder.

In one embodiment, the ink roller includes a plurality of axial portions, each axial portion defined by an ink blade. In one embodiment, each axial portion of the ink roller comprises a cylindrical portion of the curved surface of the ink roller.

In one embodiment, the signal causes an actuator associated with an ink blade to move the ink blade in a specific direction to alter an amount of ink transferred from the ink reservoir to an axial portion of the ink roller. In another embodiment, the signal causes the actuator to rotate in a first predetermined direction to move the ink blade of the inking assembly to a position which either increases or decreases the amount of ink transferred to the axial portion of the ink roller. In yet another embodiment, the signal causes the decorator to alter at least one of a color, a density, a thickness, an alignment, and a consistency of subsequent decorations.

In another embodiment, the signal causes at least one of the inking assembly, the ink roller, the plate cylinder, and the blanket cylinder to move in a specific direction. In yet another embodiment, the control system can send a signal to an actuator to alter a position of at least one of a printing plate on the plate cylinder and a transfer blanket on the blanket cylinder. Optionally, in one embodiment, the method further comprises sending, by the control system, a signal to an ejector to remove the container with the abnormal decoration from the conveyor associated with the decorator.

In one embodiment, the at least one sensor comprises from one to five sensors. In another embodiment, the one to five sensors are arranged to obtain data on the cylindrical body substantially simultaneously. Optionally, the one to five sensors are arranged around the cylindrical body of the metallic container. In one embodiment, the at least one sensor comprises from two to five sensors substantially evenly arranged around a longitudinal axis of the metallic container. In one embodiment, each of the one to five sensors may obtain the same type of data. In another embodiment, the one to five sensors may obtain different types of data. For example, in one embodiment, the at least one sensor comprises one or more of: (i) a first sensor to obtain data about a color of the decoration; (ii) a second sensor to obtain data about a density of the decoration; (iii) a third sensor to obtain data about a depth of the decoration; (iv) a fourth sensor to obtain data about an alignment of the decoration; and (v) a fifth sensor to obtain data about a consistency of the decoration.

In one embodiment, the method further includes (6) altering a position of the at least one ink blade in response to receiving the signal from the control system; (7) providing a second container; (8) decorating the second container with the decorator; (9) waiting a predetermined amount of time for the second decorator to reach the at least one sensor; (10) obtaining data about a decoration on the exterior surface of the second container; and (11) determining, by the control system, if the decoration on the second container includes an abnormality.

Another aspect of the present invention is a control system to monitor and identify decoration abnormalities and take action to correct abnormalities. The control system includes instructions stored on a non-transitory computer readable medium which, when executed by a processor of the control system, cause the control system to modify and change physical parameters and equipment to perform the methods described herein.

Yet another aspect is a non-transitory computer readable medium having stored thereon computer-executable instructions that cause a processor of a control system to execute a method of automatically correcting an abnormality in a decoration formed on a cylindrical surface of a metallic container by a decorator. The instructions include, but are not limited to: (1) an instruction to receive data related to the decoration formed on the cylindrical surface of the metallic container by the decorator; (2) an instruction to determine if the decoration includes an abnormality; and (3) if the decoration includes an abnormality, an instruction to determine an adjustment to the decorator to correct the abnormality. In one embodiment, the abnormality may be related to at least one of a color, a density, a thickness, an alignment, and a consistency of the decoration. Optionally, in another embodiment, the instructions may further comprise an instruction to determine a cause of the abnormal decoration. More specifically, in one embodiment, the instructions include an instruction to determine if an abnormal decoration is related to one or more of: (i) an improper amount of ink; (ii) a defective ink; (iii) a printing plate or a transfer blanket of the decorator; and (iv) an improper alignment of a component of the decorator. In one embodiment, the control system can determine that an abnormal decoration is related to a printing plate or a transfer blanket that is defective, worn, or improperly aligned based on the received data.

In one embodiment, the instructions further include an instruction to send a signal to the decorator to correct the abnormal decoration. In another embodiment, the signal may cause the decorator to alter at least one of a color, a density, a thickness, an alignment, and a consistency of subsequent decorations formed by the decorator. More specifically, in one embodiment, the signal can activate an actuator to move a component of the decorator in a specific direction. In one embodiment, the signal causes an actuator to move such that an amount of ink transferred to an ink roller of the decorator is altered.

In one embodiment, the instructions further include and instruction to send a signal to an actuator to adjust an ink blade. In one embodiment, the signal causes the actuator to move the ink blade in a specified direction with respect to an ink roller of the decorator to alter an amount of ink applied to a portion of the ink roller. In another embodiment, the signal causes the actuator to move at least one ink blade of the decorator to a position which either increases or decreases the amount of ink transferred to a portion of the ink roller.

In another embodiment, the instructions may further include an instruction to send a signal to an actuator of the decorator to move at least one of an inking assembly, an ink roller, a plate cylinder, a printing plate on the plate cylinder, a blanket cylinder, and a transfer blanket of the decorator in a specific direction.

In one embodiment, the data is obtained by at least one sensor. Optionally, the at least one sensor comprises from three to five sensors spaced substantially evenly around a circumference of the metallic container.

In one embodiment, the instruction to determine if the decoration includes an abnormality further comprises an instruction to compare the received data to stored data associated with an acceptable decoration. The method may optionally include an instruction to determine that the decoration includes an abnormality when the received data varies from the stored data by a predetermined amount. In one embodiment, the instructions further include an instruction to compare a plurality of portions of the received data to a corresponding plurality of portions of the stored data. Optionally, the instructions may include an instruction to determine the decoration includes an abnormality when a predetermined percentage of the portions of the received data vary from the corresponding portions of the stored data.

In one embodiment, the stored data is stored in a database. The database may include a plurality of fields associated with the acceptable decoration. In one embodiment, each field is associated with an ink blade of the decorator. In another embodiment, at least one field of the database includes information related to targets of the acceptable decoration. The targets may comprise one or more of ink color, ink consistency, ink density, ink thickness, orientation of the decoration, and alignment of the decoration.

Optionally, the stored data may include sensor data obtained on a plurality of metallic containers that include acceptable decorations. More specifically, in one embodiment, the control system includes instructions to receive data obtained by a sensor related to a plurality of metallic container with acceptable decorations. The instructions may include, an instruction for the control system to analyze the sensor data and an instruction to store the sensor data in fields of the database.

Yet another aspect of the present invention is a non-transitory computer readable medium provided on a storage medium and having instructions that when executed by a processor of a control system cause the processor to perform a method of sensing and correcting an abnormality in a decoration formed on a cylindrical surface of a container by a decorator. The instructions include one or more of, but are not limited to: (1) an instruction to receive data related to the decoration formed on the cylindrical surface of the container; (2) an instruction to determine if the decoration includes an abnormality; and (3) an instruction to send a signal to the decorator to alter subsequent decorations formed by the decorator. In one embodiment, the data is received from a sensor. In another embodiment, the abnormality is related to at least one of a color, a density, a thickness, an alignment, and a consistency of the decoration. In yet another embodiment, the signal causes the decorator to alter at least one of: (i) a color, (ii) a density, (iii) a thickness, (iv) an alignment, and (v) a consistency of subsequent decorations formed by the decorator.

Optionally, the instructions may further include an instruction to compare the data received from the sensor to data of an acceptable decoration. In one embodiment, the instructions further include an instruction to determine if the abnormal decoration is related to one or more of: (A) an improper amount of ink; (B) a defective ink; (C) a defective printing plate or transfer blanket of the decorator; and (D) an improper alignment of a component of the decorator. In one embodiment, the instructions may also include an instruction to determine that the abnormal decoration is related to an unknown cause.

In one embodiment, the signal causes at least one of an inking assembly, an ink roller, a plate cylinder, a printing plate on the plate cylinder, a blanket cylinder, and a transfer blanket of the decorator to move in a specific direction. In another embodiment, the signal causes an actuator to move an ink blade of the decorator to a position which either increases or decreases the amount of ink transferred to a portion of an ink roller. In still another embodiment, the signal causes an actuator associated with one or more of an inking assembly, an ink roller, a plate cylinder, a printing plate on the plate cylinder, a blanket cylinder, and a transfer blanket of the decorator to move in the specific direction.

It is another aspect of the present invention to provide an inking assembly for a decorator. The inking assembly generally includes, but is not limited to, one or more of: (1) an ink roller; (2) an ink reservoir; (3) a plurality of ink blades positioned proximate to the ink roller, each ink blade defining an axial portion of the ink roller; and (4) an actuator associated with the ink blades, wherein, in response to a signal received from a control system, the actuator is operable to alter a position of an ink blade with respect to the ink roller to adjust an amount of ink transferred to the ink roller. In one embodiment, a portion of each ink blade proximate to the ink roller includes a longitudinal portion and an end portion extending from the longitudinal portion. In one embodiment, the longitudinal portion and the end portion have shapes that are substantially planar. Optionally the end portion extends from the longitudinal portion at an angle of between about 80° and about 100°.

In one embodiment, an actuator is associated with each of the ink blades. In another embodiment, each actuator includes a shaft interconnected to one associated ink blade. Optionally, the shaft is threadably interconnected to the one associated ink blade such that rotating the shaft in a predetermined direction moves the one associated ink blade either closure to or further away from the ink roller. In one embodiment, the actuator is a solenoid.

Optionally, the inking assembly may further include a potentiometer associated with each of the plurality of ink blades. In one embodiment, the potentiometer is operable to measure movement of the ink blades with respect to the ink roller. In another embodiment, the potentiometer can detect rotation of the shaft. In one embodiment, the potentiometer includes a first gear that engages a second gear associated with an actuator.

Although generally referred to herein as "metallic container," "beverage container," "can," and "container," it should be appreciated that the current invention may be used to decorate containers of any size or shape including, without limitation, beverage cans, beverage bottles, and aerosol containers. Accordingly, the term "container" is intended to cover containers of any type or shape for any product and is not specifically limited to a beverage container such as a soft drink or beer can. The containers may also be in any state of manufacture and may be formed by a draw and ironing process or by an impact extrusion process. Thus, the current invention may be used to decorate "a cup" that is subsequently formed into a finished container, a "bottle preform" that is subsequently formed into a metallic bottle, or a "tube" that is formed into an aerosol container body.

The terms "metal" or "metallic" as used hereinto refer to any metallic material that may be used to form a container, including without limitation aluminum, steel, tin, and any combination thereof. However, it will be appreciated that the apparatus and method of the present invention may be used in various forms and embodiments to decorate containers formed of any material, including paper, plastic, and glass.

The methods and apparatus of the present invention may be used with inks of any type or variety. For example, one or more "specialty inks," including pigmented ink, thermochromic ink, photochromic ink, scented thermochromic ink, fluorescent ink, UV ink, black light ink, infrared ink, phosphorescent ink, pressure sensitive ink, tactile ink, thermo-tactile ink, leuco dye, matte ink, and any other type of ink, dye, or varnish that changes appearance, color, phase, and/or texture in response to temperature changes or exposure to light or pressure may be used with a decorator of the present invention.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary of the Invention, Brief Description of the Drawings, Detailed Description, Abstract, and Claims themselves.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus may also refer to a part of a communication hardware that interfaces the communication hardware with other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

A "communication modality" can refer to any protocol- or standard defined or specific communication session or interaction, such as Voice-Over-Internet-Protocol ("VoIP"), cellular communications (e.g., IS-95, 1G, 2G, 3G, 3.5G, 4G, 4G/IMT-Advanced standards, 3GPP, WIMAX™, GSM, CDMA, CDMA2000, EDGE, 1xEVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or Microsoft Network (MSN) Messenger™ Wireclub, Xfire, and Yahoo! Messenger™), email, Twitter (e.g., tweeting), Digital Service Protocol (DSP), and the like.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers to some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, read only memory (ROM), a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The terms display and variations thereof, as used herein, may be used interchangeably and can be any panel and/or area of an output device that can display information to an operator or use. Displays may include, but are not limited to, one or more control panel(s), instrument housing(s), indicator(s), gauge(s), meter(s), light(s), computer(s), screen(s), display(s), heads-up display HUD unit(s), and graphical user interface(s).

The term "module" as used herein refers to any known or later developed hardware, software, firmware, artificial intelligence, fuzzy logic, or combination of hardware and software that is capable of performing the functionality associated with that element.

The term "desktop" refers to a metaphor used to portray systems. A desktop is generally considered a "surface" that may include pictures, called icons, widgets, folders, etc. that can activate and/or show applications, windows, cabinets, files, folders, documents, and other graphical items. The icons are generally selectable to initiate a task through user interface interaction to allow a user to execute applications and/or conduct other operations.

The term "display" refers to a portion of a physical screen used to display the output of a computer to a user.

The term "displayed image" refers to an image produced on the display. A typical displayed image is a window or desktop. The displayed image may occupy all or a portion of the display.

The term "electronic address" can refer to any contactable address, including a telephone number, instant message handle, e-mail address, Uniform Resource Locator ("URL"), Global Universal Identifier ("GUID"), Universal Resource Identifier ("URI"), Address of Record ("AOR"), electronic alias in a database, etc., combinations thereof.

The term "screen," "touch screen," "touchscreen," or "touch-sensitive display" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure the desktop. The dimensions and orientation of the window may be configurable either by another module or by a user. When the window is expanded, the window can occupy substantially all of the display space on a screen or screens.

The terms "determine," "calculate," and "compute," and variations thereof, as used herein, are used interchangeably and include any type of methodology, process, mathematical operation, or technique.

The Summary of the Invention is neither intended, nor should it be construed, as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements or components. Additional aspects of the present invention will become more readily apparent from the Detailed Description, particularly when taken together with the drawings.

BRIEF DESCRIPTION OF THE DRAWINGS

The accompanying drawings, which are incorporated herein and constitute a part of the specification, illustrate embodiments of the invention and together with the Summary of the Invention given above and the Detailed Description given below serve to explain the principles of these embodiments. In certain instances, details that are not necessary for an understanding of the disclosure or that render other details difficult to perceive may have been omitted. It should be understood, of course, that the present invention is not necessarily limited to the particular embodiments illustrated herein. Additionally, it should be understood that the drawings are not necessarily to scale.

FIGS. 3C, 3D are top plan views of an inking assembly of the present invention and generally illustrate axial movement of an ink blade with respect to an ink roller;

Figure 1:
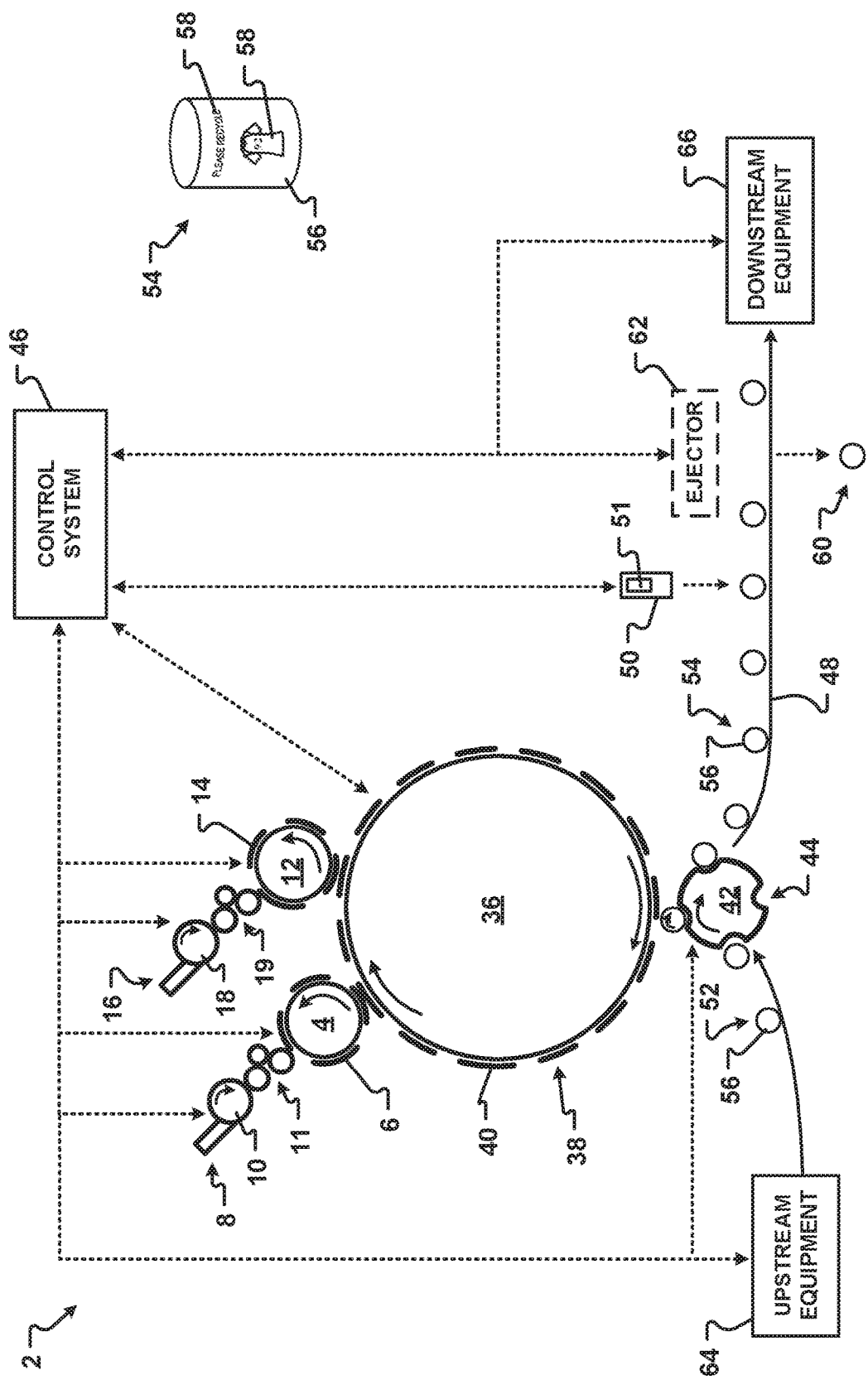
FIG. 1 is a schematic flow diagram of a decorator depicting one embodiment of the present invention and also illustrating a metallic container decorated by the decorator of the present invention.

Number Component
2 Decorator
4 First plate cylinder
6 Printing plates of first plate cylinder
8 First inking assembly
10 Ink roller of first inking assembly
11 Ink train
12 Second plate cylinder
14 Printing plates of second plate cylinder
16 Second inking assembly
18 Ink roller of second inking assembly
19 Ink train
20 Axial portion of ink roller
21 Ink blade
22 Ink blade
24 Blade segments or portions
25 Grooves
26 Ink
27 Longitudinal edge of blade segments
28 Ink key
29 Ink channel
30 Actuator
31 Shaft
32 Gap between ink blade segment and ink roller
33 Threads
34 Ink reservoir
35 Ink blade edge
36 Blanket cylinder
38 Transfer blankets (or "printing blankets")
40 Exterior surface portion of transfer blanket
42 Support element
44 Station in support element for metallic container
46 Control system
48 Conveyor
49 Sensor
50 Sensor
51 Light
52 Undecorated metallic container
54 Decorated metallic container
56 Exterior surface of metallic container
57 Cylindrical portions of container
58 Decoration
59 Target
60 Metallic container with deficient decoration
62 Ejector
64 Upstream equipment
66 Downstream equipment
68 Casting
70 Mounting plate
72 Pivot blocks
74 Sidewalls
76 Top plate
78 Ink bar
79 Back plate
80 Potentiometer
82 Bus
84 CPU
86 Input devices
88 Output devices
90 Storage devices
92 Computer readable storage media reader
94 Communication system
96 Working memory
98 Processing acceleration unit
100 Database
102 Network
104 Remote storage device/database
106 Operating system
108 Other code
110 Data structure
112 Ellipses
114 Ellipses
116 First data object
118 Identifier
120 Color
122 Density
124 Thickness
126 Position/Alignment
128 Consistency
130 Other
132 Records
134 Second data object
140 Method of programming the control system
142 Start
144 Provide a metallic container with a decoration
146 Sense the decoration
148 Control system analyzes sensor data 150 Control system stores sensor data
152 Repeat
154 Provide a metallic container with a deficient decoration
156 Sensor the deficient decoration
158 Control system identifies deficient decoration
160 End
166 Method of determining a cause of a deficient decoration
168 Start
170 Receive data from sensor
172 Determine if the decoration is satisfactory
174 Determine if an improper amount of ink is transferred
176 Determine if a defective ink is present
178 Determine if a defective printing plate or transfer blanket is present
180 Determine if the position or alignment of the decoration is improper
182 Undetermined deficiency
184 Optionally remove deficient metallic container
186 Optionally send an alert
188 End
200 Method of automatically adjusting a decorator to correct a deficient decoration
202 Start
204 Move ink keys to initial position
206 Transfer ink to axial portions of ink rollers
208 Transfer ink to printing plates
210 Transfer ink from printing plates to transfer blankets
212 Transfer ink from transfer blankets to metallic containers
214 Wait a predetermined period of time
216 Sense decorations on metallic containers by at least one sensor
218 Determine if decoration is satisfactory
220 Optionally remove metallic containers with deficient decorations
222 Send alert
224 Determine whether to continue decoration run
226 Adjust at least one element of the decorator
228 Convey decorated metallic containers to downstream equipment
230 Determine if decoration production run should continue
232 End

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. Exemplary embodiments are described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Referring now to FIG. 1, a schematic flow diagram of a decorator 2 of the present invention is illustrated. The decorator 2 generally comprises at least one plate cylinder 4, 12, printing plates 6, 14 interconnected to each of the plate cylinders 4, 12, at least one inking assembly 8, 16 including an ink roller 10, 18 associated with each plate cylinder 4, 12, a blanket cylinder 36, transfer blankets 38 interconnected to the blanket cylinder 36, a support element 42, a control system 46, a sensor 50, and, optionally, one or more of a light 51 and an ejector 62.

The ink roller 10, 18 of each inking assembly 8, 16 is in a predetermined alignment with the plate cylinder 4, 12 with which it is associated. The ink rollers 10, 18 of each inking assembly 8, 16 transfer one color of ink to the printing plates 6, 14 of each plate cylinder 4, 12. The first inking assembly 8 transfers a first color or type of ink to the printing plates 6 of the first plate cylinder 4. Similarly, the second inking assembly 16 transfers a second color or type of ink to the printing plates 14 of the second plate cylinder 12. It will be appreciated that the decorator 2 may include any number of inking assemblies and plate cylinders to transfer a plurality of inks to blankets 38 of the blanket cylinder 36. In one embodiment, the decorator 2 includes from two to eleven inking assemblies and associated plate cylinders.

In one embodiment, the ink rollers 10, 18 contact an exterior surface portion of the printing plates 6, 14. Optionally, in another embodiment, the ink rollers 10, 18 do not contact the printing plates 6, 14. More specifically, the ink rollers 10, 18 transfer ink 26 to one or more intermediate transfer rollers of an ink train 11, 19. The intermediate transfer rollers form a pathway by which ink is transferred from ink rollers 10, 18, to the intermediate transfer rollers of the ink train 11, 19, and then to the printing plates 6, 14. Each ink roller 10, 18 may have associated ink train 11, 19. The ink rollers 10, 18 contact a first transfer roller in each ink train 11, 19. The printing plates 6, 14 contact the final transfer roller of each ink train 11, 19.

Any suitable ink train 11, 19 may be used with the decorator 2 of the present invention. The intermediate transfer rollers of the ink trains 11, 19 may have a variety of different diameters. Although only three intermediate transfer rollers are illustrated in the ink trains 11, 19, one of skill in the art will appreciate that any number of intermediate transfer rollers may be included in ink trains 11, 19. One example of an ink train that may be used with the decorator of the present invention is described in U.S. Patent App. Pub. 2017/0008270 which is incorporated herein by reference in its entirety. In one embodiment, ink rollers 10, 18 rotate in a first direction as the plate cylinders 4, 12 rotate in a second opposite direction.

Figure 2A:
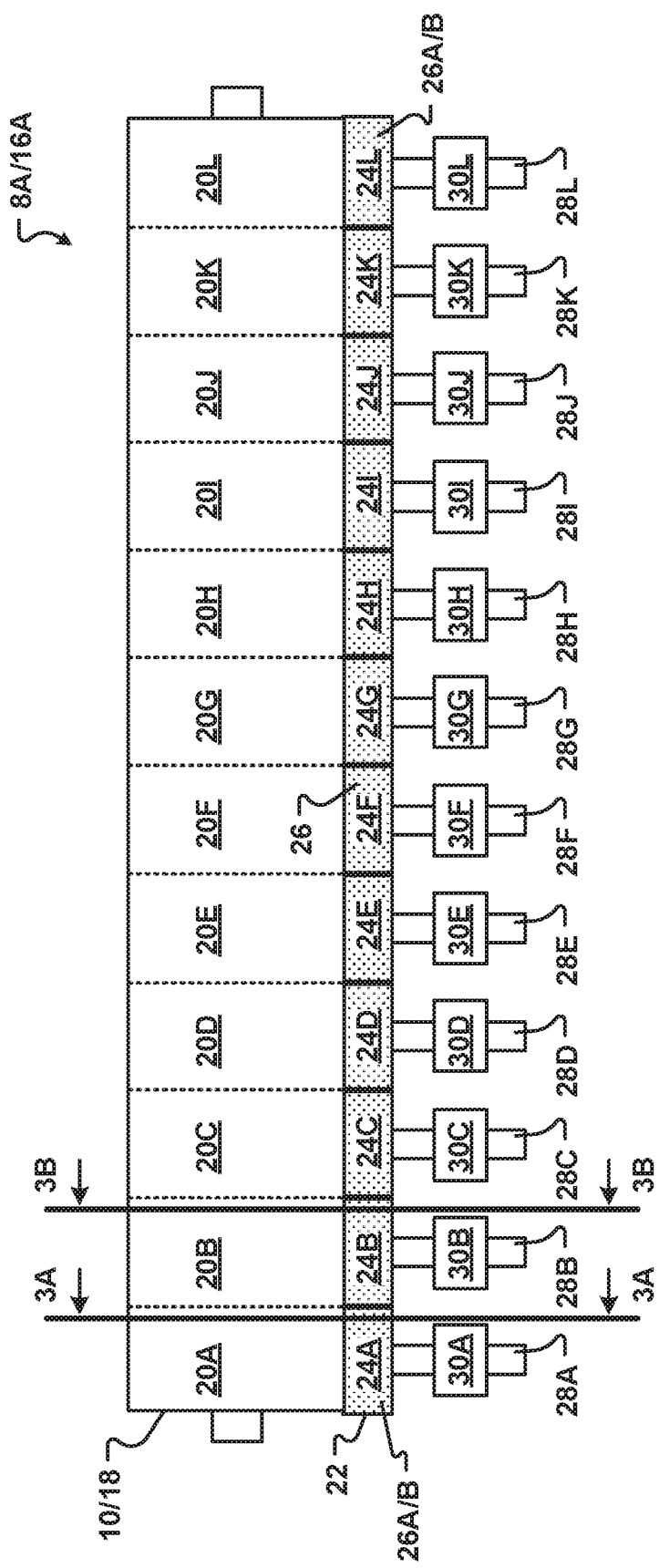
FIG. 2A is a top plan view of various components of an inking assembly of one embodiment of the present invention.

Referring now to FIG. 2A, a portion of an inking assembly 8A or 16A of one embodiment of the present invention is illustrated. The amount of ink 26 transferred by the inking assembly 8A, 16A to the printing plates 6, 14 may be individually adjusted along a plurality of axial portions 20A-20L of each ink roller 10, 18. More specifically, each inking assembly 8A, 16A includes an ink blade 22 that meters ink 26 onto the ink roller 10, 18. In one embodiment, the ink blade 22 is continuous along the length of the ink roller 10, 18. Segments 24 of the ink blade 22 correspond to one of the axial portions 20.

Figure 2B:
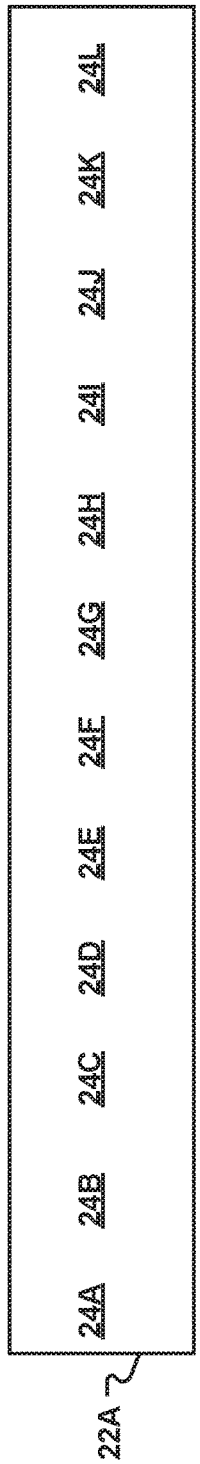
FIG. 2B is a top plan view of an ink blade of one embodiment of the present invention.

Referring now to FIG. 2B, in one embodiment, the ink blade 22A has a generally planar shape. Portions 24A-24L of the ink blade 22A may move with respect to corresponding axial portions 20A-20L of ink roller 10, 18. In one embodiment, portions 24 of the ink blade 22A may bend in response to a force to move closer to, or away from, an ink roller 10, 18.

Figure 2C:
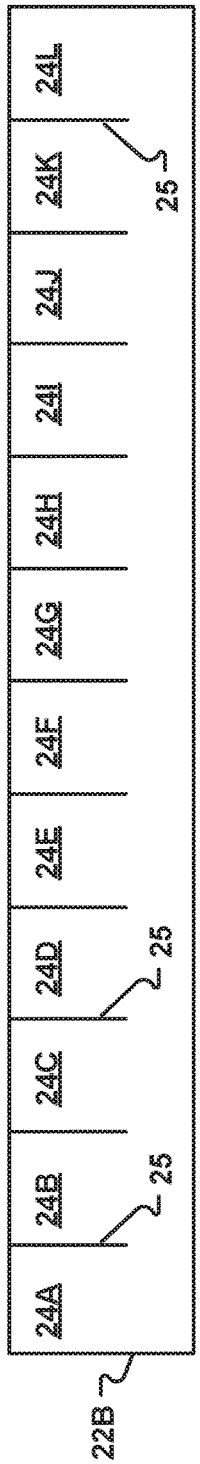
FIG. 2C is a top plan view of another embodiment of an ink blade of the present invention including transverse grooves that define portions of the ink blade

Alternatively, and referring now to FIG. 2C, the ink blade 22B includes blade segments 24 formed by transverse cuts or grooves 25 through the ink blade 22B. The grooves 25 extend along at least a portion of a width of the ink blade 22B. The blade segments 24 are individually adjustable with respect to the ink roller 10, 18. Each of the blade segments 24A-24L defines a corresponding axial portion 20A-20L of the ink roller 10, 18. In one embodiment, the grooves 25 extend through a longitudinal edge of the ink blade 22B that will be positioned proximate to the ink roller 10, 18.

Figure 2D:
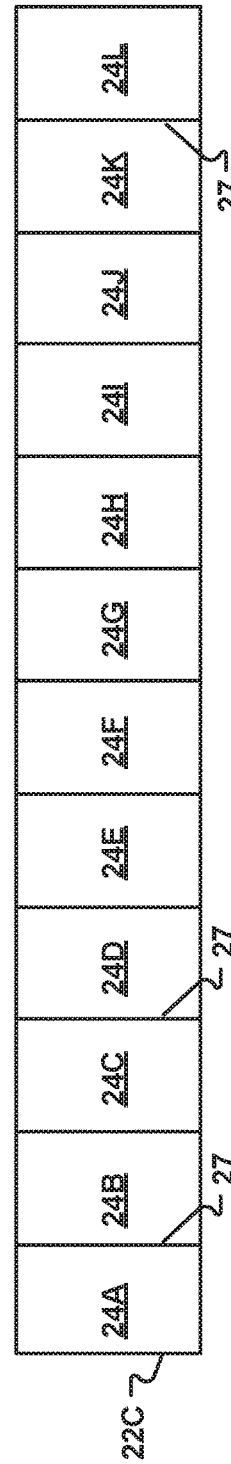
FIG. 2D is yet another top plan view of an ink blade of the present invention which comprises a plurality of individual blade segments.

Referring now to FIG. 2D, in another embodiment, the ink blade 22C comprises a plurality of individual blade segments 24A-24L. Each blade segment 24A-24L is formed separately from others of the blade segments 24A-24L. In one embodiment, a longitudinal edge 27 of each blade segment 24 is arranged proximate to a longitudinal edge 27 of at least one adjacent blade segment 24. In one embodiment, each blade segment 24A-24L defines an axial portion 20 of the ink roller 10, 18. Each blade segment 24A-24L is individually moveable with respect to the ink roller 10, 18 and a corresponding axial portion 20A-20L.

Figure 2E:
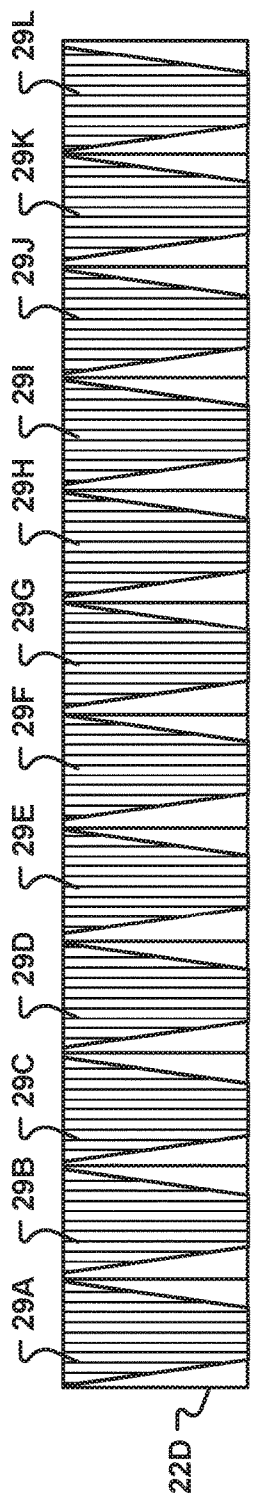
FIG. 2E is another top plan view of an ink blade of one embodiment of the present invention which a plurality of ink channels.

Optionally, in another embodiment generally illustrated in FIG. 2E, the ink blade 22D may comprise a plurality of channels 29A-29L that guide the ink 26 to a corresponding axial portion 20 of the ink roller 10, 18. In contrast to other ink blades described herein, in one embodiment, ink blade 22D is not moveable with respect to the ink roller 10, 18. In another embodiment, a pump directs ink 26 to the channels 29. In one embodiment, the pump can individual control the amount of ink that flows to each of the channels 29. Optionally, each channel 29A-29L may be associated with an individual pump.

Referring again to FIG. 2A, in one embodiment, an ink key 28A-28L is associated with each one of the blade segments 24. Each ink key 28 may be individually advanced and withdrawn with respect to the ink blade 22 and a corresponding blade segment 24. In one embodiment, the position of each ink key 28A-28L may adjusted by an actuator 30A-30L. In one embodiment, the ink blade 22 is flexible. In another embodiment, each individual blade segment 24A-24L is flexible. Accordingly, portions 24A-24L of the ink blade 22 may be positioned in closer proximity with respect to the exterior surface of the ink roller 10, 18 or, alternatively, further away from the ink roller 10, 18 in response to movement of the ink keys 28. In one embodiment, the ink blade 22 is biased away from the ink roller 10, 18. In this embodiment, movement of an ink key 28 away from the ink roller 10, 18 allows at least a portion of the ink blade 22 proximate to the ink key 28 to move away from the ink roller 10, 18. Optionally, the ink blade 22 is pivotally positioned with respect to a longitudinal axis of the ink roller 10, 18. In this manner, the blade segments 24A-24L may pivot with respect to the exterior surface of the ink roller 10, 18. Optionally, a cycle rate of a ductor roller (not illustrated) of the decorator 2 may be adjusted to alter the amount of ink on the ink roller 10, 18 after the ink is applied by segments 24 of the ink blade 22.

Figure 3B:
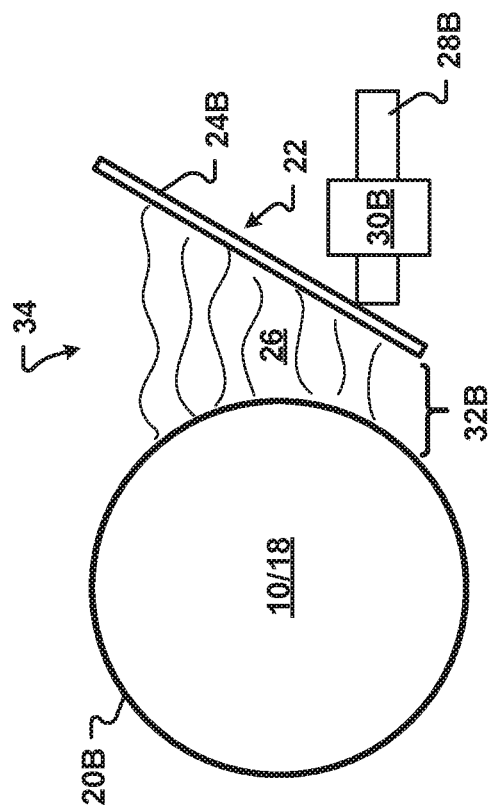
FIG. 3B is another cross-sectional side elevation view of the inking assembly taken along line 3B-3B of FIG. 2A and showing a second gap between another blade segment and the ink roller of the inking assembly wherein the second gap has a greater length than the first gap.
Figure 3A:
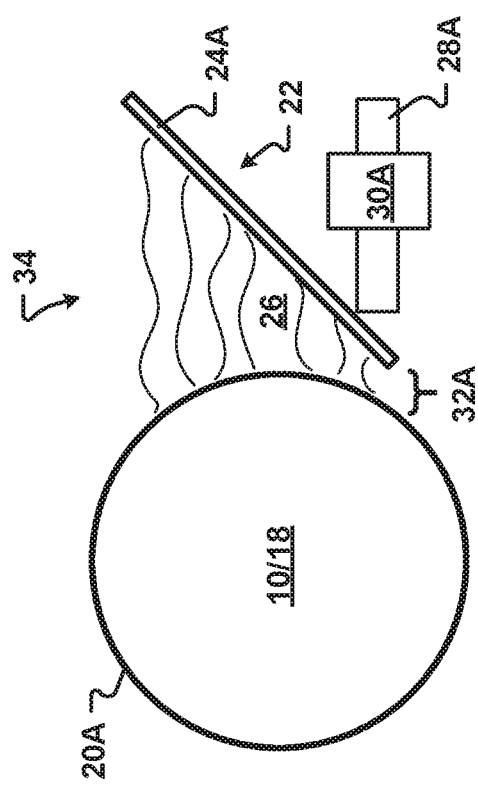
FIG. 3A is a cross-sectional side elevation view of the inking assembly taken along line 3A-3A of FIG. 2A and showing a first gap between a blade segment and an ink roller of the inking assembly.
Figure 4:
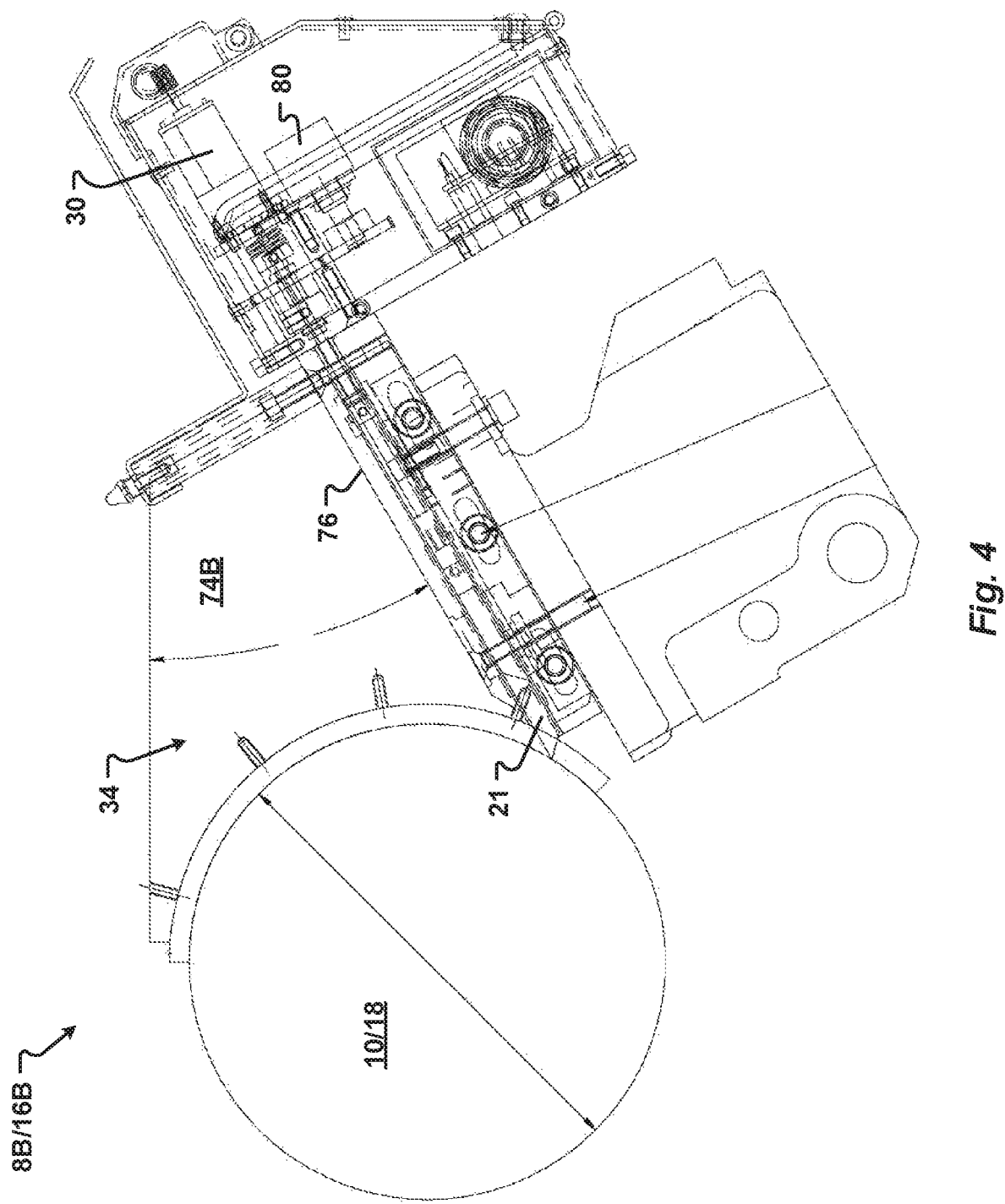
FIG. 4 is a cross-sectional front elevation view of an inking assembly of another embodiment of the present invention.
Figure 5:
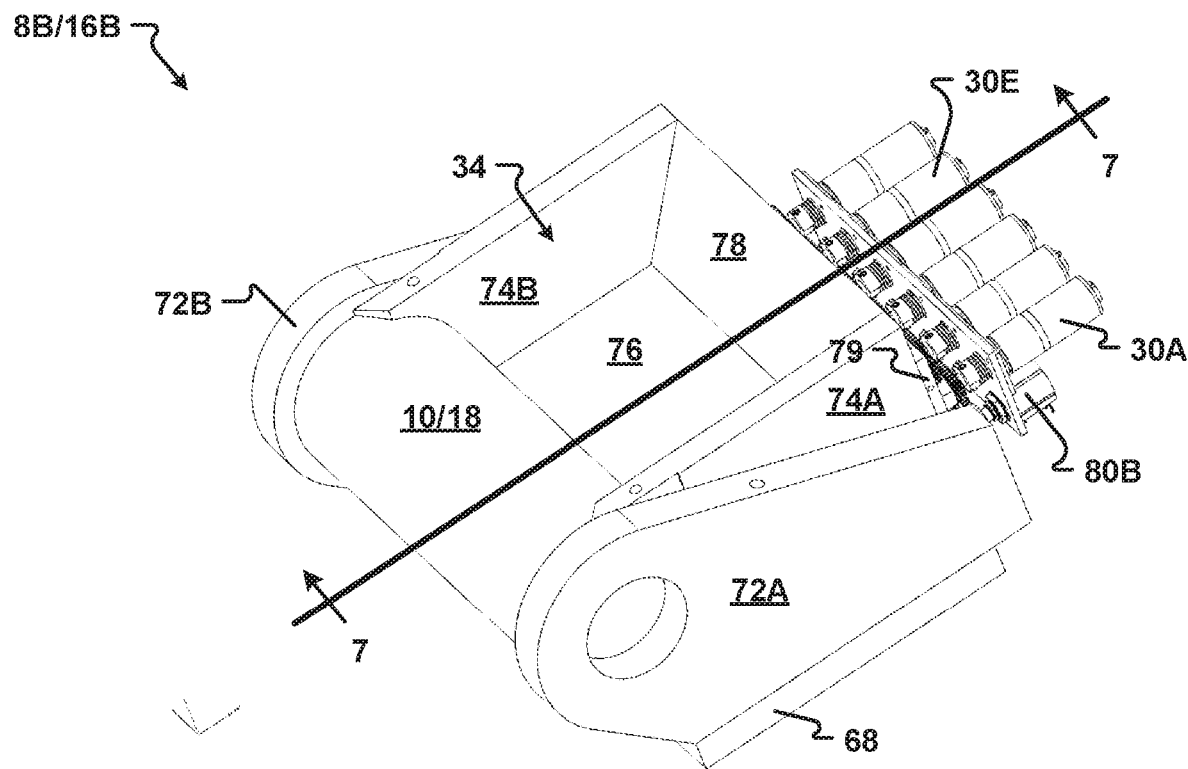
FIG. 5 is a top perspective view of the inking assembly of FIG. 4.
Figure 6:
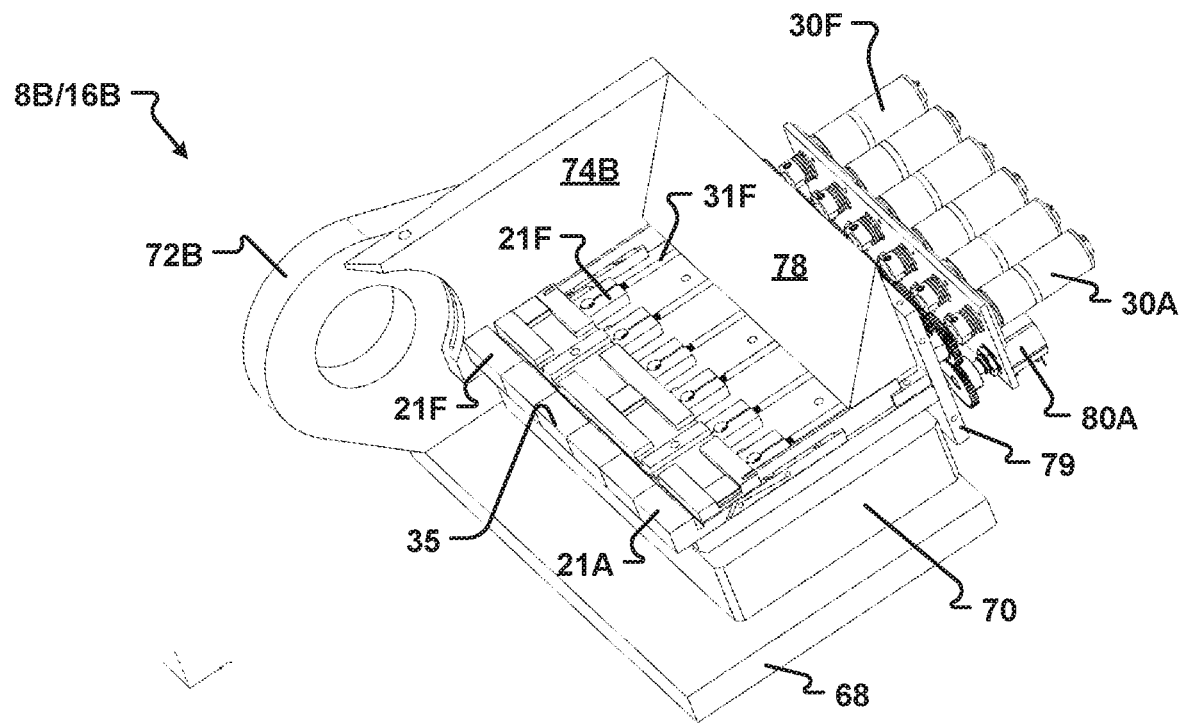
FIG. 6 is a top perspective view of the inking assembly of FIG. 5 with some components removed for clarity.
Figure 7:
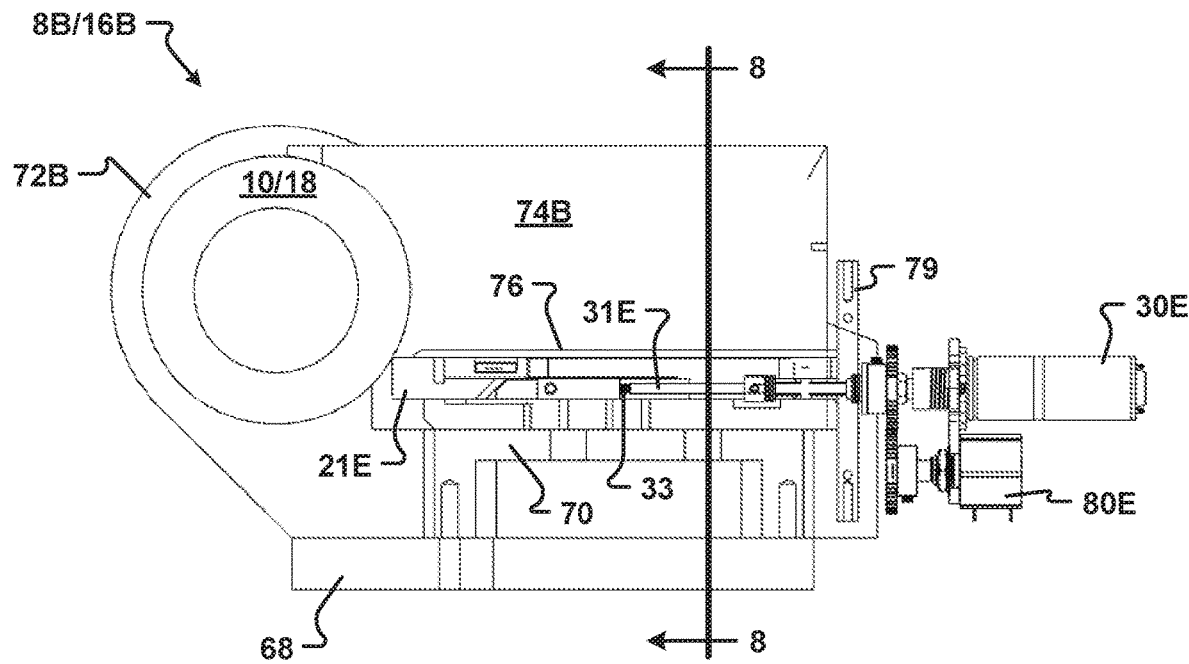
FIG. 7 is a cross-sectional front elevation view of the inking assembly of FIG. 4 taken along line 7-7 of FIG. 5.
Figure 8:
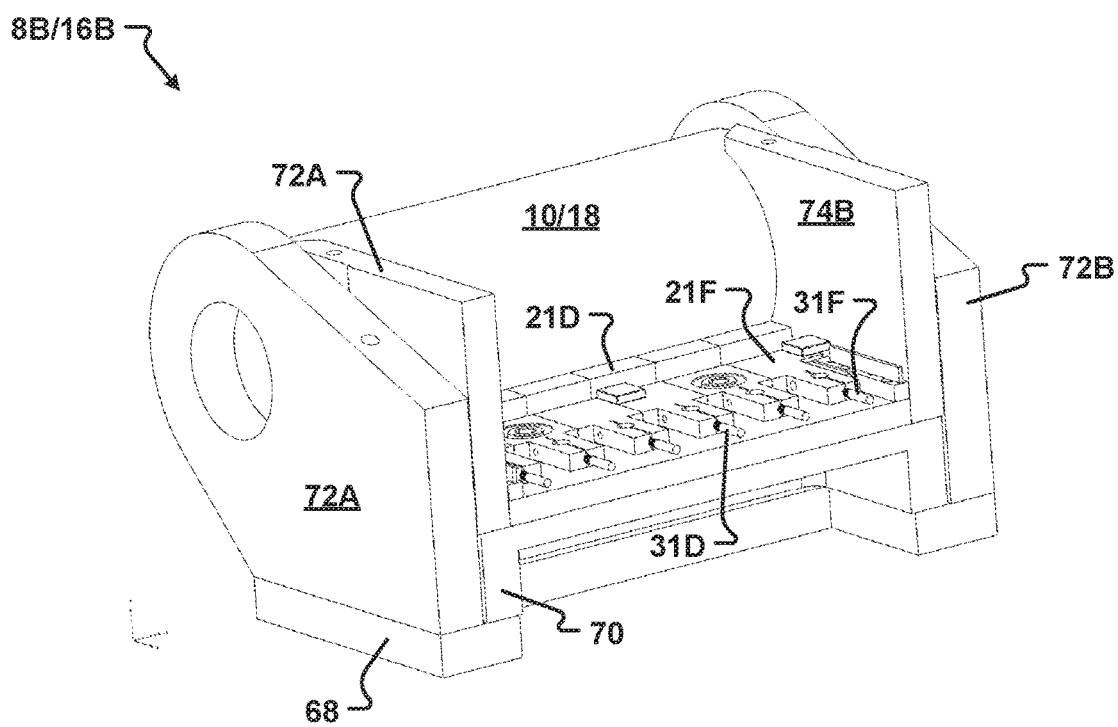
FIG. 8 is a right-side cross-sectional perspective view of the inking assembly of FIG. 4 taken along line 8-8 of FIG. 7.

Referring now to FIG. 3A, in one embodiment, by advancing ink key 28A, a portion 24A of the ink blade 22 is pushed toward the ink roller 10, 18. In this manner, a gap 32A between the blade portion 24A and axial portion 20A of the ink roller 10, 18 is reduced in length. This reduces the amount of ink 26 transferred to axial portion 20A of the ink roller 10, 18 and subsequently to the printing plates 6, 14.

Differently stated, the gap 32A generally defines the density or thickness of ink 26 which is transferred to the ink roller 10, 18 and, subsequently, to a metallic container 52. The density of the ink generally relates to an amount of ink is used to form the decoration. When the density of the ink is incorrect, the color of the decoration may be incorrect. For example, background colors may be at least partially visible through the ink of the decoration. In one embodiment, the gap 32 between an ink blade portion 24 and an axial portion 20 of the ink roller may vary between approximately 0 inches to about 0.015 inches. In another embodiment, the gap 32 may be up to about 0.02 inches. In another embodiment, the gap may be between about 0.001 inches and about 0.02 inches. In one embodiment, movement of the ink key 28A is initiated by actuator 30A. The actuator 30A may receive a signal from the control system 46 to alter the position of the ink key 28A to alter the size of the gap 32.

Alternatively, and referring now to FIG. 3B, by withdrawing ink key 28B, blade portion 24B moves away from axial portion 20B of the ink roller 10, 18. In this manner, the gap 32B is increased in length, increasing the amount of ink 26 transferred to axial portion 20B of the ink roller 10, 18 and subsequently to the printing plates 6, 14.

Referring now to FIGS. 3C, 3D, in one optional embodiment of the present invention, individual segments 24 of ink blade 22C may be moved axially with respect to an axis of rotation of the ink roller 10, 18. For example, in one embodiment, blade segment 24F may be moved axially with respect to blade segments 24E, 24G. Optionally, at least a portion of blade segment 24F may overlap one of blade segments 24E, 24G, as generally illustrated in FIG. 3D. It will be appreciated by one of skill in the art that all of the blade segments 24 may be repositioned axially in the same or a similar manner. Further, each of the blade segments 24 may be moved radially with respect to the ink roller 10, 18 as previously described.

Referring now to FIGS. 4-10 an inking assembly 8B, 16B in accordance with another embodiment of the present invention is generally illustrated. Inking assembly 8B, 16B is similar to the inking assembly 8A, 16A described in conjunction with FIGS. 2-3 and operates in a similar manner. Notably, inking assembly 8B, 16B includes individual ink blades 21 that move generally linearly with respect to the ink roller 10, 18. Each of the ink blades 21 is individually positionable with respect to the ink roller 10, 18. Although six ink blades 21A-21F are illustrated, the inking assembly may have any number of individual ink blades 21. In one embodiment, inking assembly 8B, 16B includes from two to twelve ink blades 21. In another embodiment, the inking assembly includes four to eight ink blades. In one embodiment, each ink blade 21 has a width of up to about 0.5 inches. In another embodiment, each ink blade 21 has a width of up to about 1.5 inches. However, other dimensions are contemplated. Accordingly, in one embodiment, each ink blade regulates the flow of ink to a corresponding axial portion 20 of the ink roller 10, 18 having a width of up to about 0.5 inches, or, in another embodiment, up to about 1.5 inches.

The inking assembly 8B, 16B generally includes a casting 68, a mounting plate 70, pivot blocks 72A, 72B that support the ink roller 10,18, sidewalls 74A, 74B, a top plate 76, an ink bar 78, a back plate 79, the ink blades 21, and actuators 30. The ink bar 78, top plate 76, sidewalls 74, ink blades 21, and ink roller 10, 18 define a reservoir 34 for ink that will be transferred to the ink roller 10, 18. In one embodiment, a portion of the sidewalls 74 proximate to the ink roller 10, 18 is shaped to fit at least partially around the ink roller.

The actuator 30 is mounted to the inking assembly 8B, 16B a predetermined distance from the ink roller 10, 18. In one embodiment, the actuator 30 is mounted to the inking assembly 8B, 16B at the back plate 79. However, other arrangements of the actuator 30 are contemplated. The actuator 30 can adjust the position of the ink blade 21 with respect to the ink roller 10, 18. In one embodiment, each actuator 30 is interconnected to an ink blade 21 by a shaft 31. In another embodiment, the actuator 30 is in communication with the control system 46. Accordingly, in response to a signal from the control system 46, the actuator 30 converts electrical energy into a mechanical force to adjust the position of an associated ink blade 21. The actuator 30 may be comprised of a solenoid or other similar devices known to those of skill in the art.

In one embodiment, each shaft 31 is selectively receivable by an associated ink blade 21. Accordingly, the distance between the ink blade 21 and the actuator 30 is adjustable by the actuator. Optionally, the shaft 31 includes threads 33 which are received by an end of the ink blade 21 proximate to the actuator 30. In one embodiment, each ink blade 21 includes a bore with internal threads to engage the shaft threads 33.

In one embodiment, an edge portion 35 of each ink blade 21 proximate to the ink roller 10, 18 is substantially parallel to a longitudinal axis of the ink roller 10, 18. The edge portion 35 is defined by a longitudinal portion and an end portion extending from the longitudinal portion In one embodiment, the longitudinal portion defines a plane that is generally parallel to the longitudinal axis of the ink blade. In another embodiment, the end portion is generally perpendicular to the shaft 31. In one embodiment, the longitudinal portion and the end portion have shapes that are substantially planar. Optionally the end portion extends from the longitudinal portion at an angle of between about 80° and about 100°. In one embodiment, the end portion is substantially orthogonal to the longitudinal portion. Optionally, in another embodiment, the end portion is interconnected to the longitudinal portion at an angle that is not orthogonal.

Figure 10A:
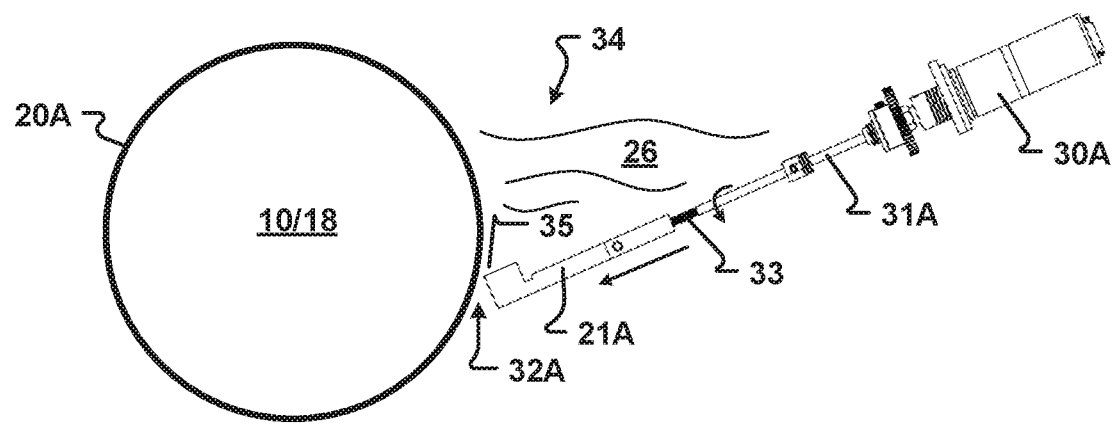
FIGS. 10A, 10B are cross-sectional side elevation views of ink blades in relation to the ink roller of the inking assembly of FIG. 4.

Referring now to FIG. 10A, in one embodiment, actuator 30A can rotate the shaft 31A in a first direction. Because the actuator 30A and shaft 31A are mounted a fixed distance from the ink roller 10, 18, rotating the shaft 31A in the first direction causes the ink blade 21A to move toward the ink roller 10, 18. In this manner, a gap 32A between the edge portion 35 of ink blade 21A and axial portion 20A of the ink roller 10, 18 is reduced in length. This reduces the amount of ink 26 transferred to axial portion 20A of the ink roller 10, 18 and to the printing plates 6, 14. More specifically, the gap 32A generally defines the density or thickness of ink 26 which is transferred to the ink roller 10, 18 and, subsequently, to an undecorated metallic container 52. In one embodiment, the blade edge portion 35 may be moved into contact with axial portion 20A of ink roller 10, 18 such that the gap 32A is closed. Thus, the ink blade 21A may prevent the flow of ink to axial portion 20A. In one embodiment, the gap 32 between an ink blade 21 and an axial portion 20 of the ink roller may vary between approximately 0 inches to about 0.015 inches. In another embodiment, the gap 32 may be up to about 0.02 inches. In another embodiment, the gap may be between about 0.001 inches and about 0.02 inches. In one embodiment, movement of the ink blade 21A is initiated by actuator 30A. The actuator 30A may receive a signal from the control system 46 to alter the portion of the ink key 28A to alter the size of the gap 32.

Figure 10B:
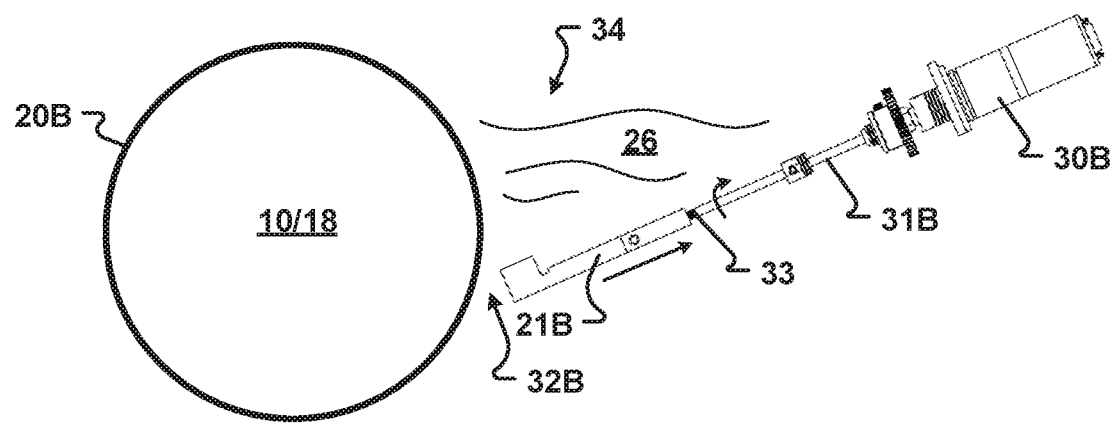

Similarly, and referring now to FIG. 10B, by rotating the shaft 31B in a second direction, actuator 30B causes the shaft 31B to move the ink blade 21B away from the ink roller 10, 18. This increases the length of the gap 32B between the ink roller 10, 18 and the edge portion 35 of ink blade 21B. This movement of the ink blade 21B correspondingly increases the amount of ink transferred to axial portion 20B as well as the density (or thickness) of ink transferred to the metallic container 52.

Figure 9:
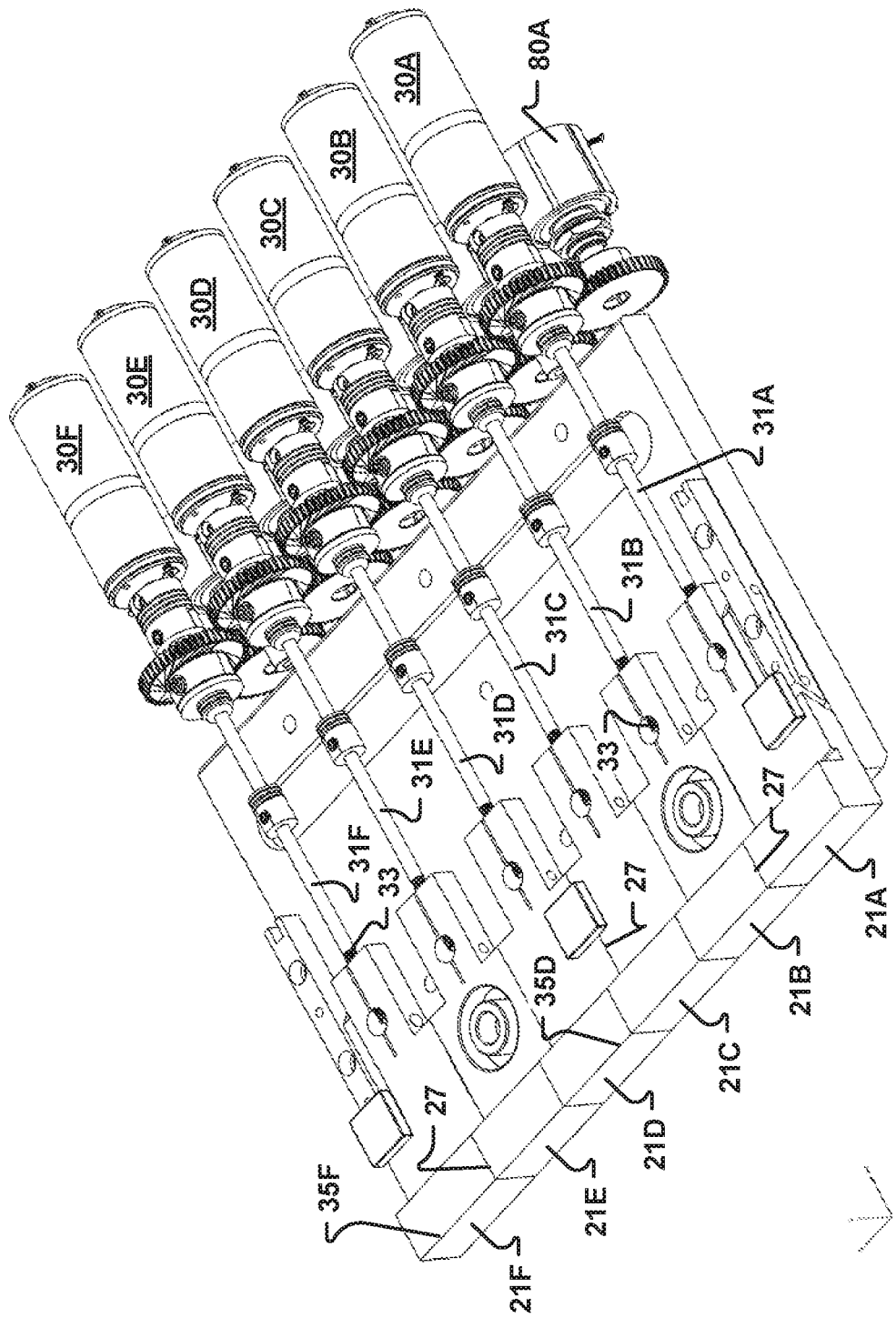
FIG. 9 is a top perspective view of ink blades and actuators of the inking assembly of FIG. 4.

Referring now to FIG. 9, an angle and/or a rotation detection sensor may be utilized. For example, in one embodiment, a potentiometer 80 may optionally be associated with each actuator 30 or ink blade 21. The potentiometer 80 is operable determine movement of the ink blade 21. In one embodiment, the potentiometer 80 is operable to sense movement of the shaft 31. The potentiometer 80 may transmit the amount and direction of shaft movement to the control system 46. For example, the potentiometer 80 may transmit a signal, such as a voltage, indicative of an amount and direction of movement of shaft 31 to the control system 46. The control system 46 can use the information received from the potentiometer 80 to determine the position of the ink blade 21 in relation to the ink roller 10, 18. In one embodiment, the potentiometer 80 is operable to sense rotational movement of the shaft 31 and differentiate between rotation in the first and second directions. In one embodiment, the potentiometer 80 is interconnected to the shaft 31. Optionally, the potentiometer 80 and the shaft 21 may include gears with intermeshing teeth. Alternatively, or in addition, other sensors may be utilized to detect movement of the shaft 31. That is, one or more rotation and/or angle sensor 80 may utilize or otherwise include a Hall effect sensor, one or more rotary encoders including but not limited to mechanical, conductive, and optical rotary encoders, non-contact imaging systems, and the like.

Referring again to FIG. 1, more than two colors or types of ink 26 may be used with the decorator 2 if additional plate cylinders are provided. For example, although only two plate cylinders 4, 12 are illustrated, it will be appreciated by one of skill in the art that the decorator 2 may include any number of plate cylinders 4, 12. In one embodiment, the decorator 2 includes from two to eight plate cylinders 4, 12 that each receive a different color, or a different type, of ink from an associated inking assembly 8, 16.

Optionally, one or more of the printing plates 6, 14 may have an image formed on an exterior surface. Additionally, although individual printing plates 6, 14 are illustrated interconnected to the plate cylinders 4, 12, a single sleeve or cylinder that wraps around a circumference of each plate cylinder 4, 12 may also be used with the decorator 2 of the present invention.

Each plate cylinder 4, 12 is in a predetermined alignment with respect to the blanket cylinder 36 and the transfer blankets 38 interconnected thereto. Accordingly, as the blanket cylinder 36 rotates, a transfer blanket 38 is rotated into contact with a first printing plate 6 of the first plate cylinder 4. The first printing plate 6 transfers at least some of the first ink 26A to an exterior surface portion 40 of the transfer blanket 38. As the blanket cylinder 36 continues rotating, the transfer blanket 38 is rotated into contact with a second printing plate 14 of the second plate cylinder 12. The second printing plate 14 transfers at least some of the second ink 26B to the exterior surface portion 40 of the transfer blanket 38. Optionally, a single continuous transfer blanket may be positioned around the circumference of the blanket cylinder 36. In one embodiment, the blanket cylinder 36 rotates in the first direction.

After the transfer blanket 38 has received first and second inks 26A, 26B from a printing plate 6, 14 of each plate cylinder 4, 12, the exterior surface portion 40 of the transfer blanket 38 is rotated into contact with an exterior surface 56 of an undecorated metallic container 52. The transfer blanket 38 transfers at least some of the first and second inks to the exterior surface 56 of the metallic container 52. In this manner, a decoration 58 is formed on the container exterior surface 56. It will be appreciated that the decoration may comprise any combination of images, text, numbers, and symbols.

Figure 11:
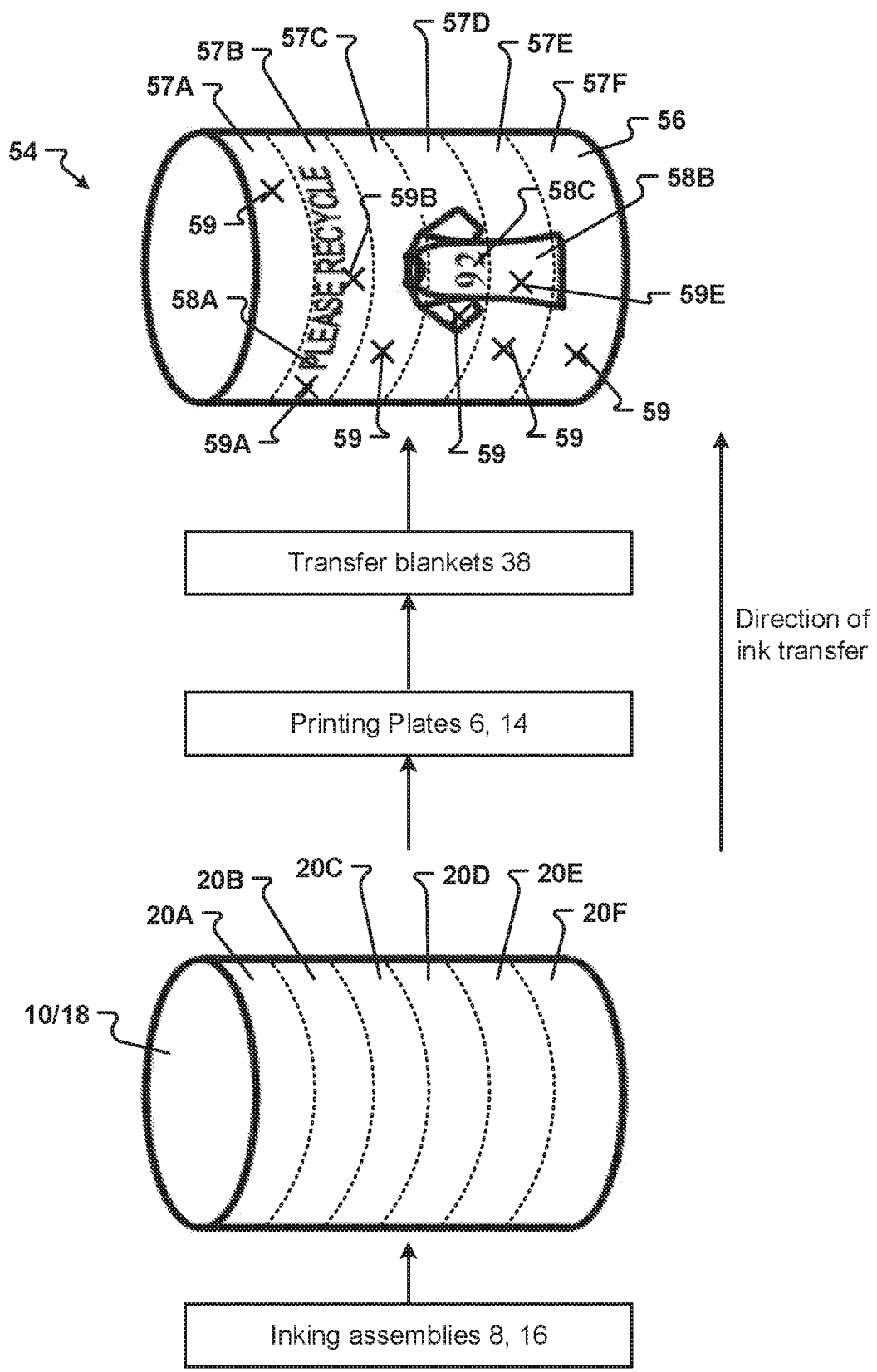
FIG. 11 is a flow diagram illustrating the transfer of ink from axial portions of ink rollers to corresponding cylindrical portions of a metallic container.

Referring now to FIG. 11, the cylindrical exterior surface 56 of metallic container 54 includes cylindrical portions 57 that correspond to the axial portions 20 of the ink rollers 10, 18 of the ink assemblies 8, 16. Accordingly, for a decorator 2 that includes ink rollers 10, 18 with six axial portions 20A-20F defined by six portions 24A-24F of ink blade 22 (illustrated in FIG. 2) or by six individual ink blades 21A-21F (such as illustrated in FIG. 9), the metallic container 54 includes six corresponding cylindrical portions 57A-57F. The amount of first ink 26A transferred to the cylindrical portions 57A-57F by the printing plates 6 affixed to first plate cylinder 4 is controlled by adjusting the ink blades 21 or portions 24 of ink blade 22 relative to axial portions 20A-20F of the first ink roller 10. Similarly, the quantity of second ink 26B transferred to the metallic container 54 by the printing plates 14 of the second plate cylinder 12 can be adjusted by altering the gaps 32 (illustrated in FIGS. 3, 10) between the ink blades 21 or portions of ink blade 22 and the axial portions 20A-20F of the second ink roller 18.

As generally illustrated in FIG. 11, the metallic container 54 may have two or more different decorations 58A, 58B. As will be appreciated by one of skill in the art, the decoration 58A, 58B may include different types or colors of ink. For example, in one embodiment, decoration 58A is formed by first ink 26A of the first inking assembly 8. Similarly, decoration 58B may be formed by second ink 26B of the second inking assembly 16. Further, each decoration 58A, 58B may include portions of other inks. Accordingly, in one embodiment, numerals 58C of decoration 58B may be formed of an ink different than the second ink 26B. For example, in one embodiment, decoration portion 58C is formed of the first ink 26A of the first inking assembly 8. Alternatively, decoration portion 58C may be formed by a different third ink of another inking assembly of the decorator 2.

In one embodiment, a support element 42 receives an undecorated metallic container 52 from upstream equipment 64. The metallic container 52 may be a beverage container, such as a beverage can, a beverage bottle, an aerosol container, or a container for any other type of product. The upstream equipment 64 may comprise a draw and iron production line or an impact extrusion production line. An example of a known draw and iron metallic container production line is generally illustrated and described in "Inside a Ball Beverage Can Plant," available at http://www.ball.com/Ball/media/Ball/Global/Downloads/How_a_Ball_Metal_Beverage_Can_Is_Made.pdf?ext=.pdf (last visited Apr. 30, 2016) which is incorporated herein by reference in its entirety. Methods and apparatus of forming metallic containers in an impact extrusion production line are described in U.S. Patent Application Publication No. 2013/0068352 and U.S. Patent Application Publication No. 2014/0298641 which are each incorporated herein by reference in their entireties. In one embodiment, the upstream equipment 64 includes at least one sensor. The sensor may be the same as, or similar to, sensor 50. Accordingly, in one embodiment the control system 46 may receive data collected or obtained by a sensor of the upstream equipment 64 related to the exterior surface 56 of metallic containers 52 before the metallic containers 52 reach the support element 42.

The support element 42 moves the metallic container 52 into contact with a transfer blanket 38. In one embodiment, the support element 42 includes a plurality of stations 44 to receive and support metallic containers 52 in a predetermined position with respect to the blanket cylinder 36. Optionally, a sensor 50 may be associated with the support element 42. The sensor may obtain data on a position or orientation of a metallic contain 52 supported by a station 44. The sensor 50 may provide the data to the control system 46. In this manner, the control system 46 can determine if the metallic container 52 is in a predetermine orientation or alignment with respect to a transfer blanket 38 of the transfer cylinder 36. In one embodiment, the stations 44 comprise recesses to receive a portion of a metallic container. Alternatively, another embodiment, the stations may comprise mandrels projecting from the support element 42. A portion of each mandrel is configured to project at least partially through an open end into a hollow interior of a metallic container 52. One example of a support element 42 that may be used with the decorator 2 of the present invention is described in U.S. Pat. No. 9,452,600 which is incorporated herein by reference in its entirety.

Returning again to FIG. 1, in one embodiment of the present invention, one or more inking assemblies 8, 16 may move in response to a signal received from the control system 46. More specifically, in one embodiment, the inking assemblies 8, 16, or at least the ink roller 10, 18, may move to alter the alignment of the inking assemblies 8, 16 and/or the ink rollers 10, 18 with respect to the plate cylinders 4, 12. In one embodiment, the inking assemblies 8, 16 and the ink rollers 10, 18 may move in a plurality of directions. Optionally, the inking assemblies 8, 16 and/or the ink roller 10, 18 may move in one or more of: (1) an axial or "z-direction" (substantially perpendicular to the plane of FIG. 1); (2) a lateral or "x-direction" (substantially perpendicular to the axial direction); and (3) a vertical or "y-direction" (substantially perpendicular to each of the axial direction and the lateral direction). In one or more embodiments, each of the inking assemblies 8, 16 and/or the ink roller 10, 18 may move, or otherwise pivot, about a rotational axis. In one embodiment, one or more actuators are associated with each of the inking assemblies 8, 16 and/or the ink rollers 10, 18. Each of the actuators is operable to move an associated inking assembly or ink roller in one or more of the x, y, and z directions in response to a signal from the control system 46. In this manner, the control system 46 may send a signal to an actuator associated with the inking assemblies 8, 16 and/or the ink rollers 10, 18 to alter one or more of a position and an alignment of ink transferred from the ink rollers to the printing plates 6.

In another embodiment, one or more of the plate cylinders 4, 12, the blanket cylinder 36, and the support element 42 may move in response to a signal from the control system 46. For example, in one embodiment, one or more of the plate cylinders 4, 12, the blanket cylinder 36, and the support element 42 may be interconnected to actuators. In response to a signal from the control system 46, the actuators may move at least one of the plate cylinders 4, 12, the blanket cylinder 36, and the support element 42 in a plurality of directions. In one embodiment, one or more of the plate cylinders 4, 12, the blanket cylinder 36, and the support element 42 may move in at least one of an x-direction, a y-direction, and a z-direction in response to a force received from an actuator. Accordingly, when the control system 46 determines a position or alignment of a decoration is deficient, the control system 46 may adjust the positions of one or more of the plate cylinders 4, 12, the blanket cylinder 36, and the support element 42 in a plurality of specific directions.

The actuators associated with the inking assemblies 8, 16, the ink rollers 10 18, the plate cylinders 4, 12, the blanket cylinder 36, and the support element 42 (which are not illustrated in FIG. 1 for clarity) may be the same as, or similar to, actuators 30. Further, one or more potentiometers may be associated with each of the actuators. The potentiometers, or rotation sensors, may send data to the control system 46 such that the control system 46 may determine the relative positions of the inking assemblies 8, 16, the ink rollers 10 18, the plate cylinders 4, 12, the blanket cylinder 36, and the support element 42.

After the metallic containers 54 are decorated by the decorator 2, the sensor 50 collects data on the decoration 58. The sensor 50 is positioned to sense the entire cylindrical surface 56 of the metallic container 54. In one embodiment, the sensor 50 senses the decorated metallic containers 54 while the containers are associated with the support element 42. Alternatively, the decorated metallic containers 54 are transported, for example, by a conveyor 48, to the sensor 50. Any suitable conveyor 48 may be used with the decorator 2 of the present invention. In one embodiment, the conveyor 48 comprises a belt. The cycle rates of the support element 42 and the conveyor 48 may be controlled by the control system 46.

Optionally, one or more operations may be performed on the metallic containers 54 after the metallic containers 54 receive the decoration 58 and before the metallic containers 54 are sensed by the sensor 50. More specifically, the metallic contains 54 may be one or more of cleaned, tested, and dried. Accordingly, there may be a predetermined lag time from when the decoration 58 is formed on a container 54 to when the metallic container 54 is sensed by the sensor 50. Thus, although the sensor 50 is generally illustrated upstream from downstream equipment 66 in FIG. 1, the sensor 50 may be positioned downstream of at least some of equipment 66. For example, in one embodiment, after leaving the support element 42, the metallic containers 54 are transported to one or more of a tester, a cleaner, and an oven before reaching the sensor 50. Accordingly, a predetermined period of time may elapse after a metallic container 54 receives a decoration 58 before the sensor 50 senses the container cylindrical surface 56. Thus, the sensor 50 and the control system 46 must account for and adjust to the lag time which occurs after making adjustments to the ink blades 21, 22 before a metallic container with a decoration formed with the adjusted ink blades reaches the sensor 50.

The sensor 50 is positioned to sense the exterior surface 56 of the metallic container 54. The sensor 50 sends data related to the decoration 58 of each metallic container 54 to the control system 46. More specifically, the sensor 50 gathers data about the decoration 58 on the container 54. The control system 46 uses data gathered by the sensor 50 to determine if any defects are present in the decoration 58. For example, the sensor 50 can collect or obtain data related to a color, a density, a depth, a consistency, an alignment of the decoration 58.

Any suitable sensor 50 that can detect decorations 58 printed on the container exterior surface 56 may be used with the decorator 2 of the present invention. In one embodiment, the sensor 50 comprises an optical or visual sensor. In another embodiment of the present invention, the sensor 50 comprises a camera. The camera may be a high-speed camera. In yet another embodiment the sensor 50 comprises a laser. In still another embodiment, the sensor 50 comprises a hyperspectral imager. In one embodiment, the sensor 50 can collect data in three-dimensions. In one embodiment, one or more of the optics, resolution, magnification, and shutter of the camera are controlled by the control system 46. In one embodiment, the sensor 50 is operable to sense up to about 700 metallic containers per minute. In another embodiment, the sensor 50 is operable to sense up to about 2,000 metallic containers per minute.

In one embodiment, one or more targets 59 on the container exterior surface 56 are selected for sensing by the sensor 50. The targets 59 may be selected by the control system 46. Additionally, or alternatively, the targets 59 may be set by an operator of the decorator 2. In one embodiment, the targets 59 are determined at least in part by the decoration 58 to be applied to the metallic container 54. More specifically, the targets 59 may be selected based on locations where one or more inks 26 are to be positioned on the exterior surface 56. Additionally, targets 59 may also be selected for locations where no ink is to be applied to the exterior surface 56. Accordingly, target 59 may vary from a first decoration run to a second decoration run.

Referring again to FIG. 11, the one or more targets 59 may be located in a variety of predetermined locations on the container exterior surface 56. In this manner, the sensor 50 will collect data related to ink 26 applied by each inking assembly 8, 16. In one embodiment, at least one target 59 is associated with an ink 26 of each inking assembly 8, 16. In another embodiment, a target 59 may be associated with each of the ink blades 21 or segments 24 of ink blade 22. For example, for a decorator 2 with between four to eight inking assemblies which each have between five to ten ink blades 21 or segments of ink blade 22, the sensor 50 may collect data on approximately 20 to 80 targets 59. In this manner, the control system 46 will almost continuously receive data related to the quality, thickness, and positioning of ink 26 applied by each ink blade 21 and each segment 24 of an ink blade 22 of each inking assembly 8, 16.

Optionally, at least one light 51 can be associated with the sensor 50. In one embodiment, the light 51 is operable to provide a strobe illumination such that an associated sensor 50 may obtain data from moving metallic containers 54. The operation of the light 51 may be controlled by the control system 46. In this manner, illumination generated by the light 51 is timed with data collection of the sensor 50. In one embodiment, the light 51 comprises at least one of an incandescent lamp, an LED, a high intensity light, a laser, a fluorescent light, a xenon flash tube, and an arc discharge lamp. The light 51 is selected to generate illumination of a predetermined wavelength based on the requirements of the sensor 50.

In one embodiment, the light 51 is aligned generally parallel to a boresight of the sensor, such as generally illustrated in FIG. 1. In one embodiment, one or more diffusers and lenses are associated with the light 51. In one embodiment, the diffusers and lenses are aligned such that illumination generated by the light 51 is generally parallel to a longitudinal axis of the metallic containers 54. In one embodiment, the diffuser has a width which is about equal to the height of the metallic containers. Accordingly, the light 51 can illuminate one or more portions of the exterior surface 56 of the metallic containers 54.

Optionally, one or more angles of illumination may be provided by the at least one light. In another embodiment, the light 51 includes two or more lights arranged at different angles with respect to the metallic container 54. For example, in one embodiment, a first light 51 may be positioned at an angle of about 90° above a portion of the metallic container 54 to be sensed by the sensor 50. In another embodiment, a second light 51 is positioned at an angle of between about 10° and about 90° or between about 1° and about 10° with respect to the portion of the metallic container 54 to be sensed. Accordingly, the angle of the light 51 with respect to the metallic container 54 may be selected such that the decoration 58, which may include a variety of surfaces extending different heights from the cylindrical surface 56 of the metallic container 54, reflect light differently than other portions of the exterior surface 56 of the metallic container 54.

In one embodiment, the sensor 50 can sense the entire exterior surface 56 of the metallic container. In contrast, some prior art decorators for decorating continuous webs or substrates include a sensor that can only sense a portion of the width (known as a "swath") of the continuous web between a first longitudinal edge and a second longitudinal edge of the web. The sensor may move periodically from the first longitudinal edge to the second longitudinal edge of the web. However, at any given time, the sensor may only sense a portion of the width of the web. Accordingly, when sensing a first swath, the sensor may not detect a printing error or deficiency in a second swath.

Optionally, the metallic container 54 rotates around a longitudinal axis of the metallic container during sensing by the sensor 50. Accordingly, additional processing techniques may be required to correct distortion in images obtained by a sensor 50 due in part to the rotation of the metallic container 54. In another embodiment, the sensor 50 is substantially stationary during sensing of the metallic container 54. Accordingly, data (such as images) collected by the sensor 50 may not include distortions caused by movement of the sensor. In contrast, some sensors or cameras of prior art continuous web decorators move laterally across a width of the web. The movements of the camera may decrease the accuracy of images captured by the camera. Further, in some prior art web decorators, the camera and the web are both moving during image collection by the camera. This simultaneous movement may cause further distortions in images collected by the camera. The simultaneous movement also adds complexity to controlling the camera and to identifying causes of decoration deficiencies as well as corrections required to fix deficiencies.

Optionally, the metallic containers 54 move substantially continuously with respect to the sensor 50. More specifically, in one embodiment, the metallic containers 54 move laterally perpendicular to a longitudinal axis of the metallic containers as the sensor 50 senses the exterior surface 56 of the metallic containers. Alternatively, in another embodiment, the metallic containers 54 are substantially stationary with respect to the sensor 50 during sensing of the metallic container.

Figure 1A:
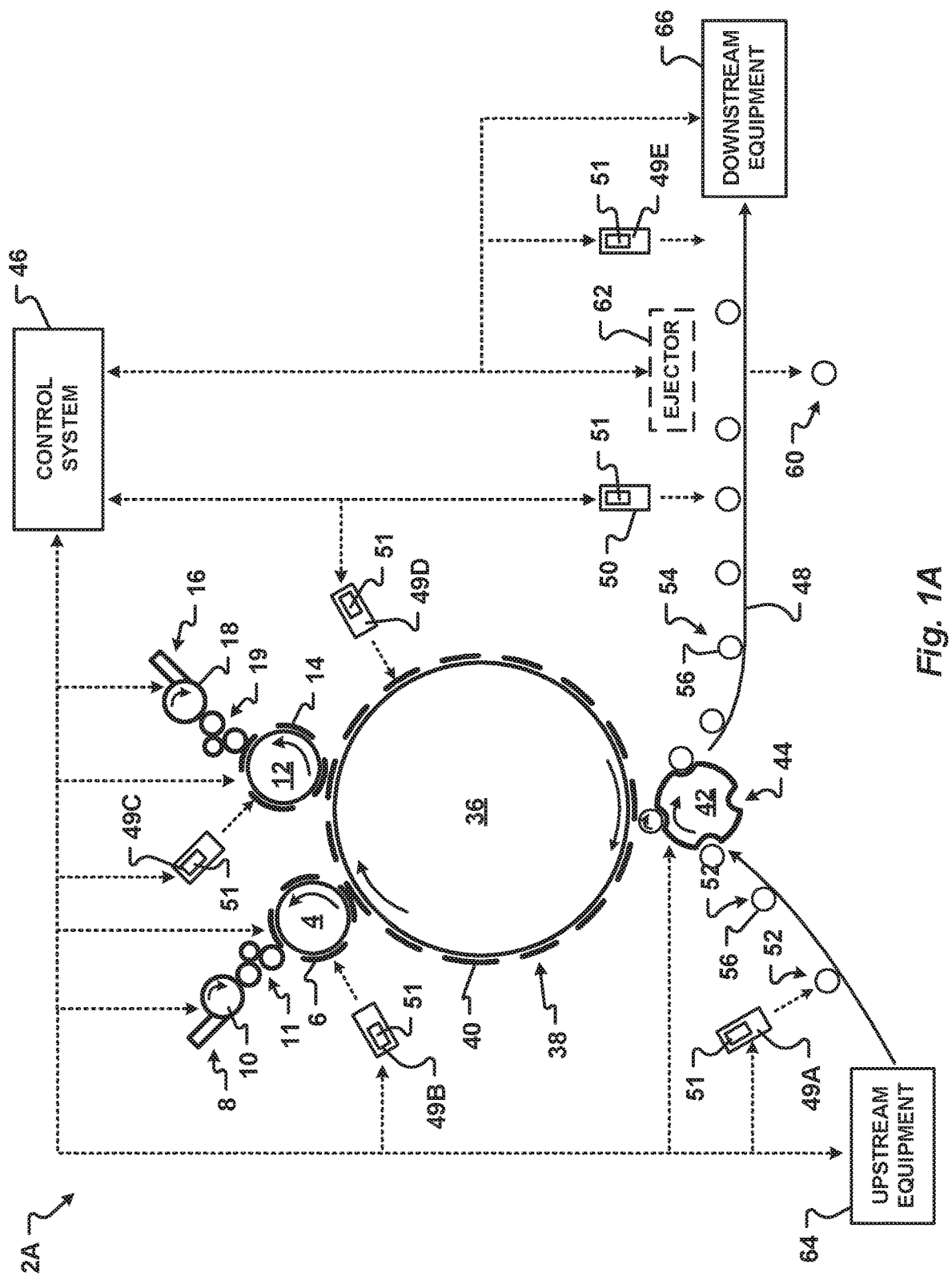
FIG. 1A is another schematic flow diagram of another embodiment of a decorator of the present invention.

Although only one sensor 50 is illustrated in FIG. 1, it will be appreciated by one of skill in the art that any number of sensors 50 may be used with the decorator 2 of the present invention. Accordingly, and referring now to FIG. 1A, another decorator 2A of the present invention is generally illustrated. Decorator 2A includes one or more plate cylinders 4, 12, inking assemblies 8, 16, ink rollers 10, 18, ink trains 11, 19, a blanket cylinder 36, support cylinder 42, sensor 50, and an ejector 62 that are the same as, or similar to those of decorator 2. Notably, decorator 2A includes a plurality of optional sensors 49. The sensors 49 may be the same as, or similar to sensor 50. Additionally, the sensors 49 may provide data to control system 46. A light 51 may be associated with one or more of the sensors 49.

In one embodiment, a sensor 49A is positioned to collect data on an exterior surface 56 of an undecorated container before the undecorated container is received by the support element 42. The control system 46 may use data from sensor 49A to determine if the exterior surface 56 of the container 52 includes any deficiencies or abnormalities.

Another sensor 49B may be arranged to collect data, and/or images, on the printing plates 6 of the first plate cylinder 4. Similarly, optional sensor 49C may be positioned to collect data on the printing plates 14 of the second plate cylinder 12. In one embodiment, the sensors 49B, 49C collect data related to the inks transferred to the printing plates 6, 14 by the respect inking assemblies 8, 16. In this manner, the control system 46 may determine ink is improperly transferred to the printing plates 6, 14. For example, in one embodiment, the control system 46 may determine that an inappropriate amount of ink is being transferred to the printing plates 6, 14 or to a portion of the printing plates. In another, the control system 46 may use the data from sensors 49B, 49C to determine the ink is being applied to inappropriate portions of the printing plates. In yet another embodiment, the sensor data from the sensors 49B, 49C may indicate that an inappropriate type or color of ink is being applied by one or more of the inking assemblies 8, 16. The control system 46 may also determine that the ink 26 applied by one of the inking assemblies 8, 16 is defective based on data received from one or more of the sensors 49B, 49C. In still another embodiment, the control system 46 may determine, using data from the sensors 49B, 49C, that one or more of the printing plates 6, 14 is not properly aligned on a respective plate cylinder 4, 12.

In one embodiment, another sensor 49D may be positioned to collect data from the transfer blankets 38 on the blanket cylinder 36. Using data from sensor 49D, the control system 46 may determine that one or more of the inks 26 transferred to the transfer blankets 38 by the printing plates 6, 14 is not properly aligned. The control system 46 may also determine that a decoration formed on the transfer blankets 38 by the inks is defective. For example, the control system may determine that one or more target parameters associated with a decoration are deficient while the ink is on a transfer blanket 38. In one embodiment, using data received from sensor 49D, the control system 46 can determine one or more of color, density, depth, alignment, and consistency of ink on a transfer blanket 38 do not comply with decoration parameters.

In another embodiment, the decorator may also include a sensor 49E positioned downstream from ejector 62. In one embodiment, the control system 46 may compare data received from sensor 49E to data received from sensor 50. In this manner, the control system 46 may determine if a decoration on a metallic container 54 has changed after the metallic container was sensed by sensor 50. In one embodiment, the control system 46 may determine that a decoration formed on a metallic container 54 has been damaged during transport by conveyor 48. For example, a decoration may be scratched or otherwise marred during transport after moving downstream from sensor 50.

In one embodiment, the decorator 2 includes three to five sensors 50 arranged around the longitudinal axis of the metallic containers 54. In this manner, the cylindrical body 56 of the metallic container 54 may be sensed in one operation. Said differently, the three to five sensors 54 are positioned to sense the cylindrical body 56 substantially simultaneously.

Figure 12A:
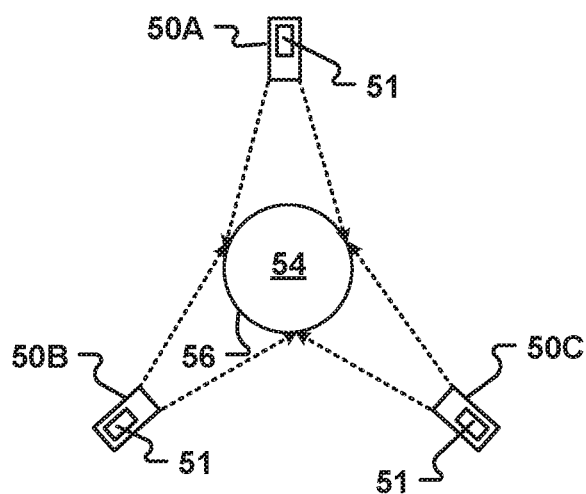
FIGS. 12A-12C are top plan views of sensors positioned around a longitudinal axis of a metallic container to sense the cylindrical surface of the metallic container in predetermined locations according to various embodiments of the present invention.
Figure 12B:
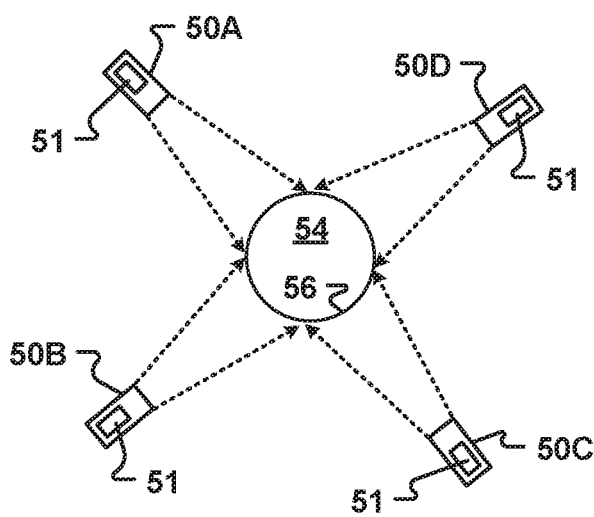
Figure 12C:
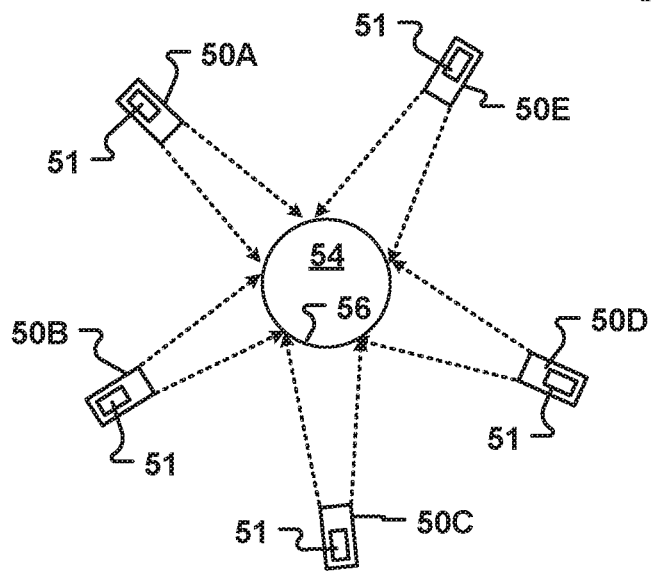

Referring now to FIG. 12A, in one embodiment, the decorator 2 includes three sensors 50A, 50B, 50C that each sense at least about one-third of the cylindrical body 56. The sensors 50A-50C are substantially evenly spaced around a longitudinal axis of the metallic container 54 which is substantially perpendicular to the plane of FIG. 12A. In another embodiment, generally illustrated in FIG. 12B, the decorator 2 includes four sensors 50A, 50B, 50C, 50D that each sense at least about one-fourth of the cylindrical body 56. Similar to FIG. 12A, the sensors 50A-50D are substantially evenly arranged around a longitudinal axis of the metallic container 54. Optionally, and referring now to FIG. 12C, in one embodiment, five sensors 50A-50E of the decorator 2 each sense at least about one-fifth of the cylindrical body 56, with the five sensors being substantially evenly positioned around a longitudinal axis of the metallic container 54.

The one to five sensors 50 may each collect or obtain the same types of information. Such information obtained from the sensors may be in the form of an image; accordingly, the images may be processed and analyzed in order to obtain color, ink density, alignment, depth, and/or consistency of a decoration. In accordance with at least one embodiment, at least one sensor 50 senses a different type of information than another one of the one to five sensors. For example, in one embodiment, a first sensor may collect a first type of data related to the decoration 58 and a second sensor of a different type may collect a second type of data related to the decoration 58. Optionally, in one embodiment of the present invention, a first sensor collects data about the color of the decoration, a second sensor collects data about the density of the decoration, a third sensor collects data about the alignment of the decoration, a fourth sensor collects data about a depth of the decoration, and a fifth sensor collects data about the consistency (or uniformity) of the decoration. In another embodiment, each sensor 50 is operable to sense colors including at least red, green, and blue. In yet another embodiment, each sensor 50 is operable to sense variations or gradation in colors within each cylindrical portion 57 of a metallic container. In still another embodiment, the sensors 50 are operable to distinguish a density of an ink or a color of an ink in a first cylindrical portion 57 from a density or color of an ink in a second cylindrical portion 57.

Figure 13:
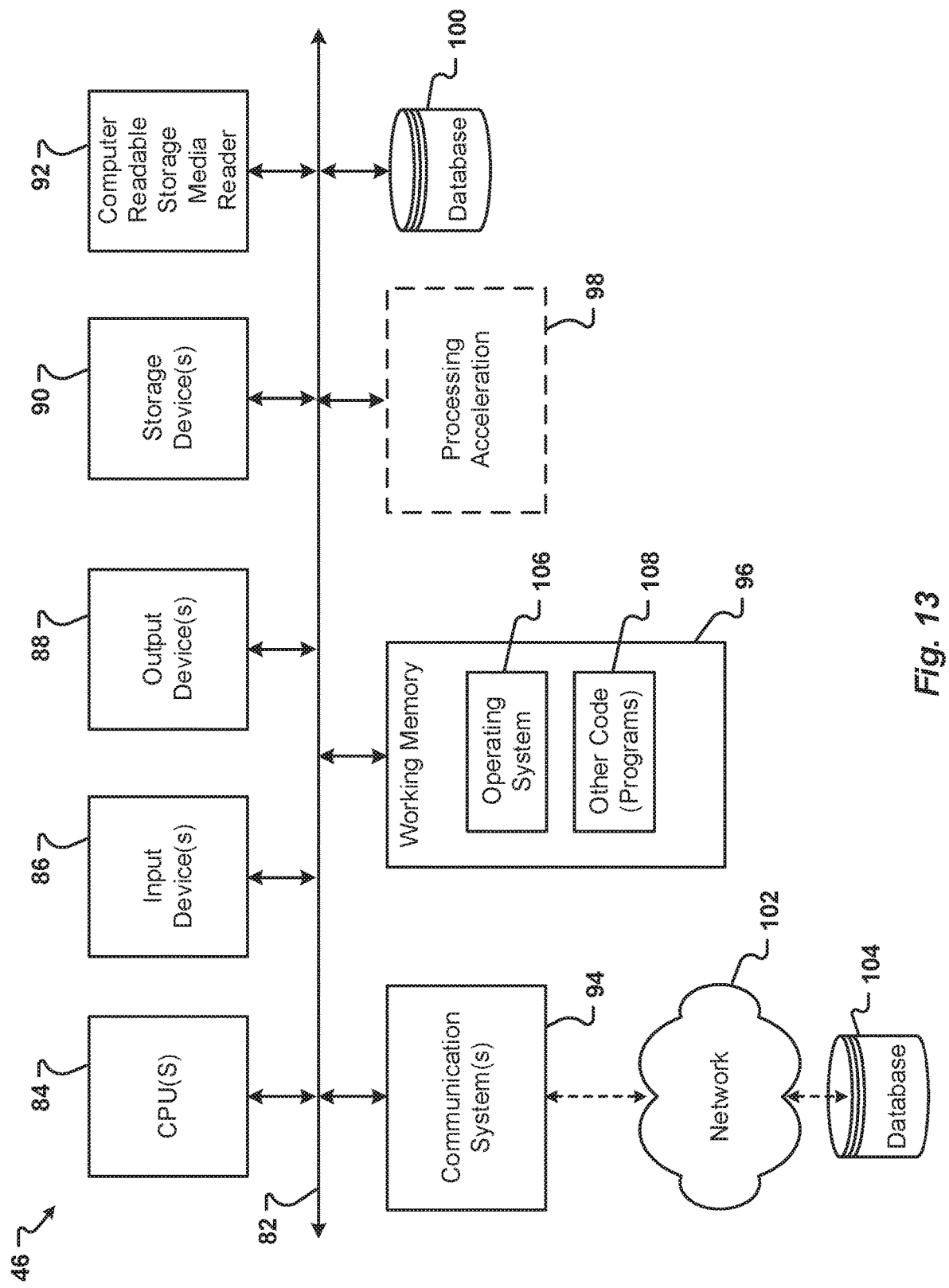
FIG. 13 is a block diagram of an embodiment of a control system of the present invention.

Referring now to FIG. 13, a control system 46 of one embodiment of the present invention is generally illustrated. More specifically, FIG. 13 illustrates one embodiment of a control system 46 of the present invention operable to determine and correct an abnormality in a decoration applied to an exterior surface of a metallic container by a decorator 2. The control system 46 is generally illustrated with hardware elements that may be electrically coupled via a bus 82. The hardware elements may include one or more central processing units (CPUs) 84; one or more input devices 86 (e.g., a mouse, a keyboard, etc.); and one or more output devices 88 (e.g., a display device, a printer, etc.). The control system 46 may also include one or more storage devices 90. In one embodiment, the storage device(s) 90 may be disk drives, optical storage devices, solid-state storage device such as a random access memory ("RAM") and/or a read-only memory ("ROM"), which can be programmable, flash-updateable and/or the like.

The control system 46 may additionally include one or more of a computer-readable storage media reader 92; a communications system 94 (e.g., a modem, a network card (wireless or wired), an infra-red communication device, etc.); and working memory 96, which may include RAM and ROM devices as described above. In some embodiments, the control system 46 may also include a processing acceleration unit 98, which can include a DSP, a special-purpose processor and/or the like. Optionally, the control system 46 also includes a database 100.

The computer-readable storage media reader 92 can further be connected to a computer-readable storage medium, together (and, optionally, in combination with storage device(s) 90) comprehensively representing remote, local, fixed, and/or removable storage devices plus storage media for temporarily and/or more permanently containing computer-readable information. The communications system 94 may permit data to be exchanged with a network 102 and/or any other data-processing. Optionally, the control unit 46 may access data stored in a remote storage device, such as database 104 by connection to the network 102. In one embodiment, the network 102 may be the internet.

The control system 46 may also comprise software elements, shown as being currently located within the working memory 96. The software elements may include an operating system 106 and/or other code 108, such as program code implementing one or more methods and aspects of the present invention.

One of skill in the art will appreciate that alternate embodiments of the control system 46 may have numerous variations from that described above. For example, customized hardware might also be used and/or particular elements might be implemented in hardware, software (including portable software, such as applets), or both. Further, connection to other computing devices such as network input/output devices may be employed.

In one embodiment, the control system 46 is a personal computer, such as, but not limited to, a personal computer running the MS Windows operating system. Optionally, the control system 46 may be a smart phone, a tablet computer, a laptop computer, and similar computing devices. In one embodiment, the control system 46 is a data processing system which includes one or more of, but is not limited to: at least one input device (e.g. a keyboard, mouse, or touchscreen); at an output device (e.g. a display, a speaker); a graphics card; a communication device (e.g. an Ethernet card or wireless communication device); permanent memory (such as a hard drive); temporary memory (for example, random access memory); computer instructions stored in the permanent memory and/or the temporary memory, and a processor. The control system 46 may be any programmable logic controller (PLC). One example of a suitable PLC is a Controllogix PLC produced by Rockwell Automation, Inc., although other PLCs are contemplated for use with embodiments of the present invention.

In one embodiment, the control system 46 is in communication with one or more of the inking assemblies 8, 16, the plate cylinders 4, 12, actuators 30, potentiometers 80, the blanket cylinder 36, the support element 42, the sensors 49, 50, the light 51, the conveyor 48, the ejector 62, the upstream equipment 64 and the downstream equipment 66. Accordingly, the control system 46 receives data from the sensors 49, 50 related to undecorated metallic containers 52, decorated metallic containers 54, the printing plates, and the transfer blankets 40. Using the data, the control system 46 can determine if the decoration 58 is deficient or satisfactory. More specifically, the control system 46 can determine if the decoration 58 at least meets targets corresponding to one or more parameters, such as color, density, depth, alignment, and consistency. The targets may be set by a customer or an operator of the decorator 2. One or more of the parameters may include a target range. If sensor data related to a parameter falls within lower and upper limits of the range, at least this parameter of the decoration is acceptable. In one embodiment, when a decoration 58 does not meet one or more of the targets, the decoration is deficient.

The control system 46 compares data from the sensor 50 to the targets for the indicia/decoration 58. In one embodiment, the control system 46 compares data associated with a plurality of portions of an image of the decoration/indicia received from the sensor 50 to the target level for corresponding portions of the decoration. In this manner, the control system 46 may determine if one or more of the color, density, depth (or thickness), alignment, and consistency for each portion of the decoration differs from the target values or position for each portion of the decoration. If the sensor data for a portion of the decoration differs from one or more of the target values, the control system 46 may determine that the decoration is deficient.

In one embodiment, the control system 46 recognizes a deficient decoration by inspecting at least one metallic container with an acceptable decoration 58. For example, metallic containers 54 with acceptable decorations 58 may be sensed by the sensor 50. The control system 46 receives data from the sensor related to the acceptable decorations 58. With this information, the control system 46 may create a database 100, 104. The database 100 may be stored in memory 96 of the control system 46 such as memory 96. Optionally the database 104 may be accessible by network connection 102. The database may include a plurality of fields that describe the characteristics of the acceptable decoration. The characteristics may include one or more of color, density, depth (or thickness), position (or alignment), and consistency of the decoration. Each of the characteristics may be assigned a value based on the sensor data. In one embodiment, each portion of the decoration 58 sensed by the sensor 50 is associated with a field of the plurality of fields. Thus, data associated with each sensed portion of a decoration may be stored in the database and accessed by the control system 46.

Figure 14:
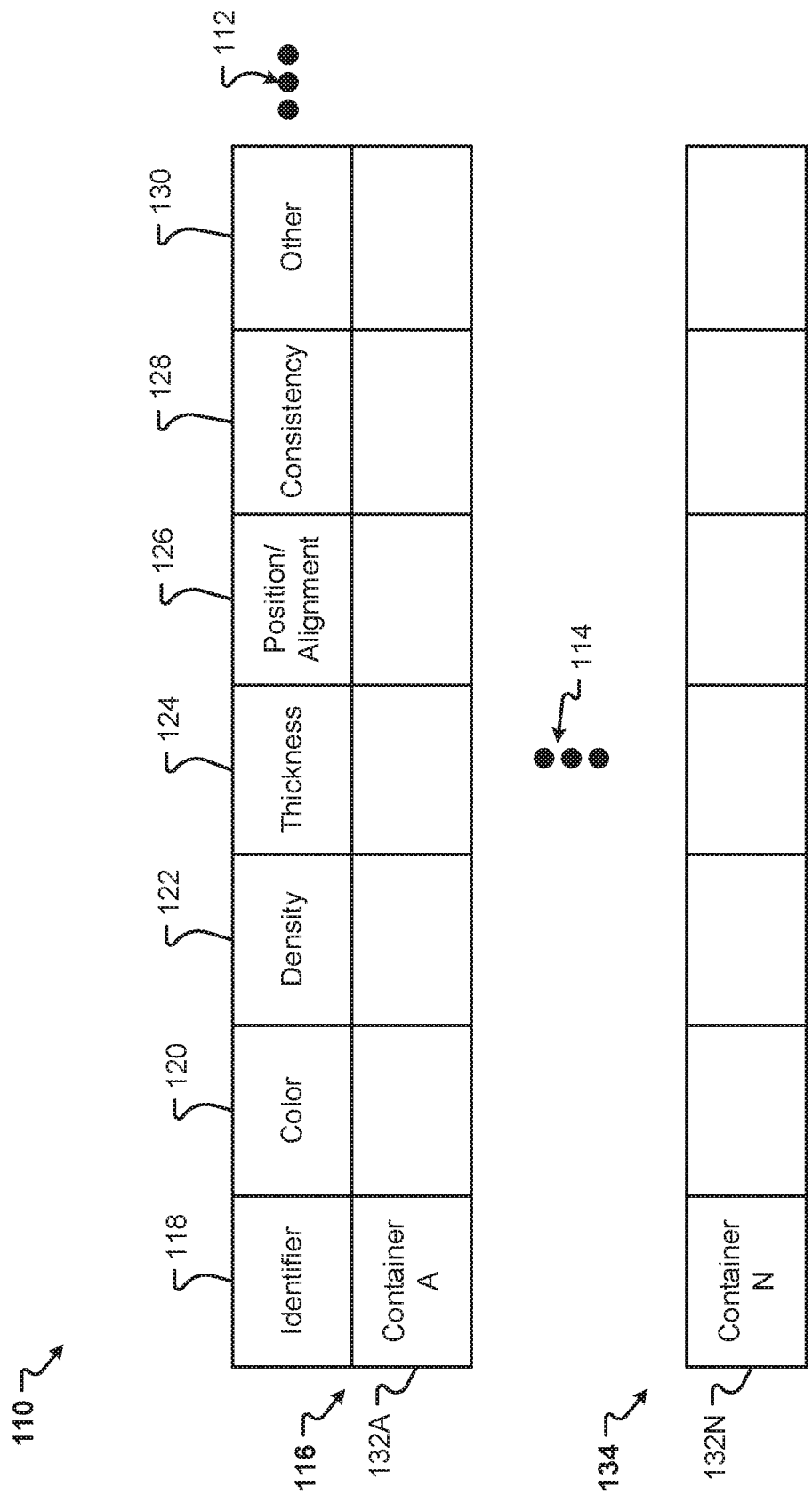
FIG. 14 is a block diagram of an embodiment of a data structure for storing sensor data.

Referring now to FIG. 14, one embodiment of a data structure 110, such as a database, is generally illustrated. The data structure may include one or more of data files or data objects 116, 134. Thus, the data structure 110 may represent different types of databases or data storage, for example, object-oriented data bases, flat file data structures, relational database, or other types of data storage arrangements. Embodiments of the data structure 110 disclosed herein may be separate, combined, and/or distributed. As indicated in FIG. 14, there may be more or fewer portions in the data structure 110, as represented by ellipses 112. Further, there may be more or fewer files or records 132 in the data structure 110, as represented by ellipses 114. In one embodiment, the data structure 110 is stored in a memory of the control system 46, such as database 100. Additionally, or alternatively, the data structure 110 may be accessed by the control system 46 using network 102. Accordingly, in one embodiment, the data structure 110 is stored in a remote location, such as database 104.

A first data object 116 may relate to data collected from at least one known acceptable decoration by sensor 50. In one embodiment, the data of the first data object 116 is collected while the control system 46 is being programmed to recognize an acceptable decoration prior to a production run. The data object 116 may include several portions 118-130 representing different types of data. Each of these types of data may be associated with a decoration 58 sensed by sensor 50. There may be one or more records 132 and associated data stored within the first data object 116.

In one embodiment, each record 132 includes an identifier 118. For example, the identifier 118 may be associated with each container sensed by the sensor 50. Other fields include different data collected by sensors 49, 50 for each decoration. The fields may include, but are not limited to, field 120 related to color(s), portion 122 related to density, portion 124 associated with thickness or depth, field 126 related to decoration position and/or alignment, field 128 for decoration consistency, and field 130 for other data. In one embodiment, field 120 may include information associating a color of ink to an inking assembly 8, 16. More specifically, field 120 may include information to identify a color of the first ink 26 of the first inking assembly 8. Field 120 may also include information identifying a color of the second ink 26 of the second inking assembly 16. In this manner, the control system 46 may determine which inking assembly 8, 16 is associated with a deficiency of an ink 26 of a decoration 58. The control system 46 can also identify which ink blade 21, 22 associated with the ink deficiency based upon one or more cylindrical portions 57 that include the ink deficiency. In one embodiment, an image of each decoration sensed by the sensors 49E, 50 is saved in each record 132. In one embodiment, the image is stored in portion 130.

Settings for ink blades 21, 22 may be stored in data structure 110. In one embodiment, the ink blade settings may be stored in portion 130. Optionally, the ink blade settings may be input to the control system 46 by an operation. In another embodiment, the ink blade settings may be determined by the control system. In one embodiment, before a production run begins, an image of a decoration to be formed by the decorator 2 is received by the control system 46. The control system 46 may analyze the image and automatically determine settings for the ink blades 21, 22. In another embodiment, the control system 46 saves the settings of ink blades 21, 22 associated with each metallic container sensed by sensor 50. In this manner, when a decoration includes a deficiency, the ink blade settings that existed when the deficient decoration was formed may be reviewed.

Optionally, data structure 110 may include second data object 134. Data object 134 may include the same or similar fields 118-130 as first data object 116. In one embodiment, control system 46 may store data received from sensors 49, 50 during a production run in second data object 134. Accordingly, the second data object 134 may include a plurality of records 134 related to metallic containers decorated by the decorator during the production run. In contrast, in one embodiment, data object 116 may optionally include data collected by sensors 49, 50 before the production run begins.

Figure 15:
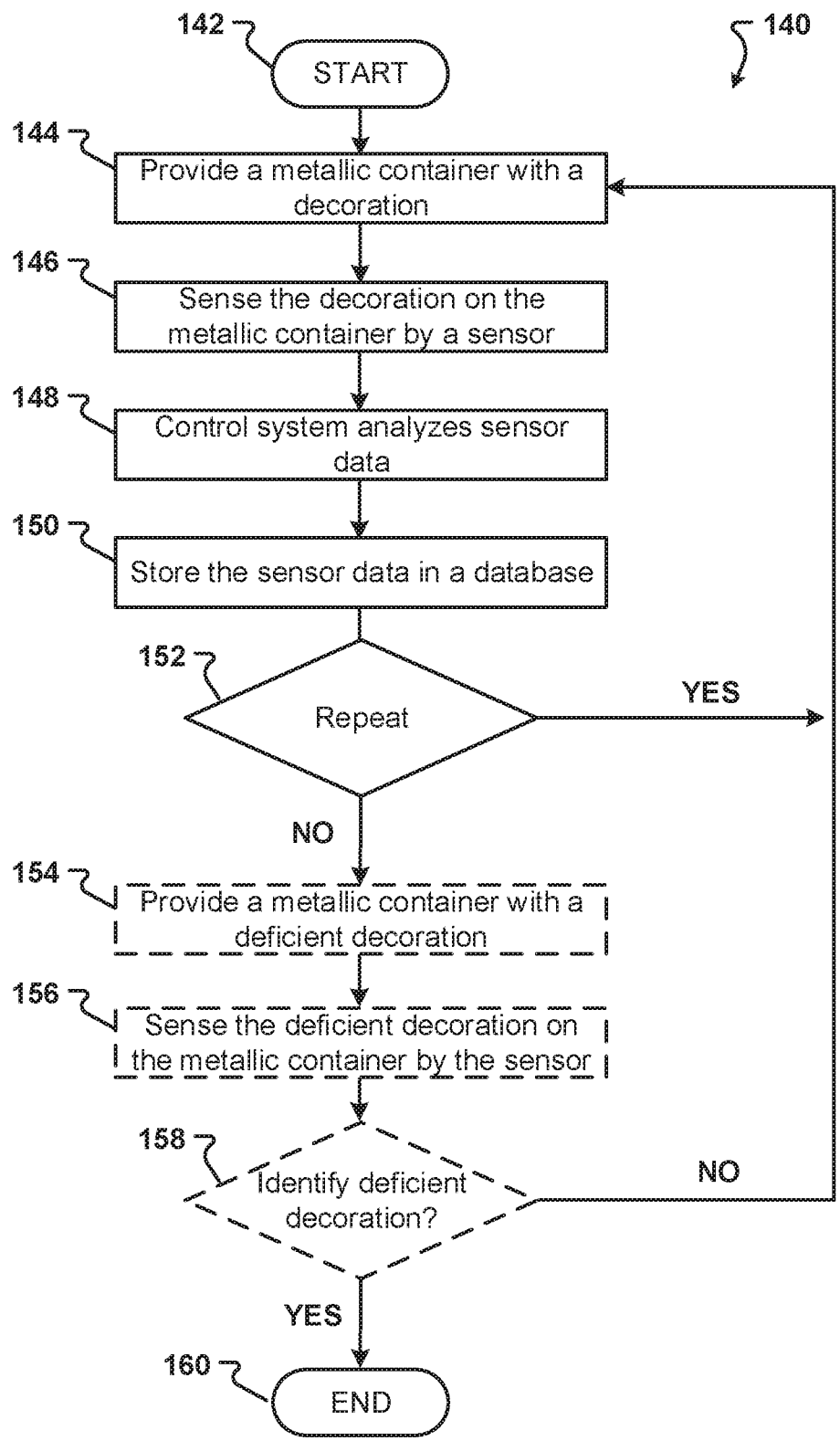
FIG. 15 is a flow diagram of a method utilized with a control system to recognize an acceptable decoration according to one embodiment of the present invention.

Referring now to FIG. 15, one embodiment of a method 140 utilized with the control system 46 is generally illustrated. While a general order of the operations of method 140 are shown in FIG. 15, method 140 can include more or fewer operations, or can arrange the order of the operations differently than those shown in FIG. 15. Further, although the operations of method 140 may be described sequentially, many of the operations may in fact be performed in parallel or concurrently. Generally, method 140 starts with a start operation 142 and ends with an end operation 160. Portions of method 140 can be executed as a set of computer-executable instructions executed by a computer system and encoded or stored on a computer readable medium. One example of the computer system may include, for example, the control system 46. An example of the computer readable medium may include, but is not limited to, a memory of the control system 46. Hereinafter, method 140 shall be explained with reference to the control system 46, decorator 2, and components described in conjunction with FIGS. 1-14.

In operation 144, a metallic container 54 with a decoration 58 is provided. Data related to the decoration 58 of the metallic container 54 is collected by at least one sensor 49, 50 in operation 146. The control system 46 then receives the collected data from the at least one sensor 49, 50.

In operation 148, the control system analyzes the collected data received from the sensor. In one embodiment, the control system considers data associated with a plurality of targets 59 of the container exterior surface 56. In another embodiment, control system 46 analyzes data collected from one or more cylindrical portions 57 of the metallic container 54. The control system 46 may identify characteristics of the decoration 58 such as, but not limited to, color, thickness, density, consistency, and alignment.

In operation 150 the control system 46 stores the collected data in memory. In one embodiment, the control system stores the collected data in a record 132 of database 110. Optionally, the collected data may be stored in the first data object 116 of database 110.

In one embodiment, method 140 loops a predetermined number of times at operation 152. For example, method 140 may include sensing a predetermined number of metallic containers 54 with acceptable decorations.

Optionally, in one embodiment, method 140 may include sensing at least one metallic container 60 including a known deficient decoration. The decoration may be deficient with respect to one or more parameters that vary from targets. The parameters may include, but are not limited to, at least one of color, density, thickness (or depth), position and/or alignment, and consistency of the decoration. Optionally, a plurality of metallic containers 60 with deficient decorations may be sensed by sensor 50. In one embodiment, at least one of the deficient decorations is associated with an improper amount of ink. Another one of the deficient decorations is due to a defective ink. Still another of the deficient decorations is caused by a defective (or misaligned) printing plate. Another deficient decoration may be related to a defective (or misaligned) transfer blanket. Yet another deficient decoration may be associated with an improperly aligned (or positioned) decoration.

For each metallic container 60 sensed which includes a known deficient decoration, the control system 46 may store the sensor data in a record 132 that includes a field with data identifying the reason the decoration is deficient. In one embodiment, the field may include data indicating an action the control system 46 should take if a similar deficient decoration is sensed by at least one of sensors 49E, 50 during a production run of the decorator 2. For example, the database 110 may include an action in field "other" 130 to provide an alert to an operator when a deficient decoration is sensed. In another embodiment, when a deficient decoration related to an improper amount of ink is sensed, field "other" 130 may include instructions to adjust a position of one or more ink blades 21 or portions 24 of ink blade 22. In this manner, the control system 46 may alter the amount of ink 26 transferred to an ink roller 10, 18 and subsequently to a metallic container. In yet another embodiment, if a decoration is deficient due to improper alignment or position, the control system may include instructions to alter a position of one or more elements of the decorator 2. For example, the control system 46 may include instructions to move at least one of an inking assembly 8, 16, an ink roller 10, 18, a plate cylinder 4, 12, a blanket cylinder 36, and a support element 42. In this manner, in one embodiment, the control system 46 can correct a deficiency caused by an improper alignment or position of a decoration formed on a metallic container.

If the predetermined number of metallic containers have not been sensed by sensor 50, the control system 46 may determine in operation 152 that operations 144-150 should be repeated. Accordingly, method 140 will return YES to operation 144. Alternatively, the control system 46 may determine that a sufficient (or predetermined) number of metallic containers with decorations have been sensed such that operations 144-150 should not be repeated. In this case, method 140 continues NO to operation 154.

Method 140 may then optionally test the ability of control system 46 to recognize a deficient decoration in operations 154-158. More specifically, in operation 154 a metallic container 60 with a known deficient decoration is provided. At least one sensor 49, 50 collects data on the deficient decoration in operation 156.

In operation 158, the control system 46 evaluates the collected data similar to operation 148. The control system 46 will then determine whether or not the decoration is deficient. If control system 46 does not identify the deficient decoration, method 140 returns NO to operation 144 and additional metallic containers with decorations are sensed and analyzed by the control system. More specifically, the control system 46 will analyze sensor data related to one or more decorations that include acceptable, or deficient, decorations.

Alternatively, if the control system 46 correctly identifies the deficient decoration, method 140 continues YES to end operation 160. In one embodiment, correctly identifying the deficient decoration includes the control system 46 correctly identifying why the decoration is deficient. For example, the decoration may be deficient due to one or more of the color of the ink, the density of the ink, the thickness of the ink, the amount of ink, the consistency of the ink, and the location or alignment of the decoration.

In one embodiment, correctly identifying the deficient decoration further includes the control system 46 correctly identifying an action required to correct the deficient decoration. For example, if the decoration is deficient due to an incorrect amount of ink, the control system may indicate one or more ink blades 21 or segments of ink blade 22 that should be adjusted to correct the deficiency. Similarly, if the location or alignment of the decoration is deficient, the control system 46 may identify at least one inking assembly, ink roller, plate cylinder, blanket cylinder, and support element that should be adjusted to correct the deficient decoration.

Once the control system 46 is trained to recognize an acceptable decoration, the control system 46 can detect a decoration 58 that varies from the acceptable decoration. In this manner, the control system can determine that a metallic container includes an unacceptable, or deficient, decoration. In one embodiment, the control system 46 can be trained to recognize an acceptable decoration when less than 100 metallic containers with acceptable decorations are sensed by the sensor 50. Alternatively, in another embodiment, the control system 46 is trained to recognize an acceptable decoration after receiving sensor data of between about 100 and about 200 metallic containers with acceptable decorations. In accordance with embodiments of the present invention, the control system 46 may utilize supervised and/or unsupervised machine learning techniques such as, but not limited to support vector machines, boosted decision trees, and/or one or more neural networks, in order to recognize an acceptable decoration.

In one embodiment, the control system 46 compares the sensor data received from one or more of the sensors 49, 50 to a known reference stored in memory. For example, the control system 46 may compare the sensor data, or a portion of an obtained image, to an image of a metallic container 54 with a refence decoration 58 that is of sufficient quality. The image of the metallic container may be stored in a memory 90, 92 of the control system 46. In another embodiment, the image may be stored in a database 110 with which the control system 46 is in communication, such as by a connect to network 102.

The decoration may be deficient if one of the inking assemblies 8, 16 transfers an excessive or insufficient amount of ink 26 to a portion of the printing plates 6, 14. In another embodiment, a decoration may be deficient if the inking assemblies 8, 16 transfer ink 26 to an improper portion of the printing plates 6, 14. If the control system 46 determines the decoration 58 is deficient, the control system 46 is operable to determine whether one or more of the ink blades 21 or a portion of ink blade 22 should be adjusted to produce an acceptable decoration 58. More specifically, in one embodiment, the control system 46 can determine which inking assembly 8, 16 is associated with a deficient decoration based at least in part on a color of ink 26 of the deficient decoration. In one embodiment, the control system 46 can retrieve data from field 120 of data structure 110 to determine which one of inking assemblies 8, 16 is associated with the color of the ink. The control system 46 can determine at least one ink blade 21, 22 of the one of inking assembly 8, 16 which is associated with the deficiency based upon a location of the deficient decoration in one or more cylindrical portions 57. For example, in one embodiment, inking assembly 8 includes a first ink 26A of a first color. Database 110 includes information in field 120 associating the first ink 26A with the first inking assembly 8. One or more sensors 49, 50 obtain data related to a metallic container 54 (illustrated in FIG. 11) that includes decoration 58B. The control system 46 may determine that a portion of the decoration 58B formed of the first ink 26A is deficient. The deficiency may be in cylindrical portion 57E. Accordingly, the control system 46 can determine that ink blade 21E or 22E of inking assembly 8 is in an improper position with respect to axial portion 20E of the first ink roller 10.

The control system 46 may cause one or more corresponding actuators 30 to change the alignment of the ink blades 21 or ink blade 22 to increase or decrease the gap 32. In one embodiment, the control system 46 can automatically send a signal to one or more corresponding actuators 30 to change the alignment of the ink blades 21 or ink blade 22 to increase or decrease the gap 32. In this manner, the control system 46 can adjust the amount of ink 26 transferred to the printing plates 6, 14 of one or more of the plate cylinders 4, 12 without input from an operator of the decorator 2.

Additionally, the control system 46 may optionally send a signal to the actuators 30 to adjust an axial position of an associated blade segment 24 with respect to the ink rollers 10, 18. More specifically, in one embodiment, the signal from the control system 46 may cause the actuator 30F to move at least a portion of associate blade segment 24F toward one of blade segment 24E or blade segment 24G such as generally illustrated in FIG. 3D.

In another embodiment, the control system 46 may send a signal to an actuator associated with at least one element of the decorator 2, such as the inking assemblies 8, 16, the ink rollers 10, 18, the plate cylinders 4, 12, the blanket cylinder 36, and the support element 42. The signal may cause an actuator to move an associated element to automatically correct a deficient decoration related to a position or an alignment of the decoration. The actuator may move the associated element in one or more specific directions, including along one or more of an x direction, a y direction, and a z direction.

In another embodiment, the control system 46 can report changes to elements of the decorator 2 made to correct a deficient decoration to an operator. In one embodiment, the report may include changes to the radial or axial position of one or more of the ink blades 21 or segments 24 of ink blade 22 required to correct a deficient decoration. Additionally, or alternatively, the report may include changes to other elements of the decorator 2 required to correct the deficient decoration.

The report may be presented on an output device 88 of the control system 46, such as a display. In this manner, the operator can at least review the changes, such as changes to the ink blades 21 or segments 24 of ink blade 22 prepared by the control system 46. In one embodiment, the operator must approve the planned changes before the control system 46 sends a signal to the actuators 30 to change the positions. In another embodiment, the operator may use an input device 86, such as a pointer (including a mouse, touchpad, or trackball), a keyboard, or a touch screen of the control system 46, to approve, disapprove, or alter the changes planned by the control system.

In one embodiment, after reporting changes planned for elements of the decorator 2 to the operator, the control system 46 waits a predetermined period of time. Optionally, if the operator does not reject the planned changes within the period of time, the control system 46 sends a signal to the actuators 30 to implement the planned changes. In another embodiment, if the operator does not approve the planned changes within the period of time, the control system 46 will not send the signal to the actuators 30 and the ink blades 21 or segments 24 of ink blade 22 and other elements of the decorator will remain in the current position.

Referring again to FIG. 11, the control system 46 may determine that one or more of decorations 58A, 58B (or a portion of one of the decorations 58) is deficient. For example, part of decoration 58B in cylindrical portion 57E may be deficient. One or more of the sensor 49, 50 may have a target 59E associated with cylindrical portion 57E. In one embodiment, the control system 46 can use the data from the sensors 49, 50 to determine that the deficiency is due to an improper amount of one or more of the first and second inks 26A, 26B transferred to cylindrical portion 57E. Using the sensor data, the control system 46 can determine the improper amount of ink is caused by one or more of: (1) too much first ink 26A from axial portion 20E of first ink roller 10; (2) too little first ink 26A from axial portion 20E of first ink roller 10; (3) too much second ink 26B from axial portion 20E of second ink roller 18; and (4) too little second ink 26B from axial portion 20E of second ink roller 18.

After determining the cause of the deficiency for the part of decoration 58B in cylindrical portion 57E, the control system 46 can send a signal to the actuator 30E associated with axial portion 20E of the first ink roller 10 to alter the gap 32 between the axial portion 20E of first ink roller 10 and the associated ink blade 21 or the segment 24E of ink blade 22. The signal may result in an increase, or a decrease, in an amount of the first ink 26A transferred to axial portion 20E of the first ink roller 10. If the deficiency is due to an incorrect amount of the second ink 26B transferred to cylindrical portion 57E, the control system 46 can send a similar signal to the actuator 30E associated with axial portion 20E of the second ink roller 18 to adjust the amount of second ink 26B transferred to cylindrical portion 57E. Optionally, in another embodiment, the control system 46 can send a signal to a pump to change the amount of ink supplied to the ink channel 29E of ink blade 22D of the first or second ink roller 10, 18.

Alternatively, the control system 46 may determine that the deficiency is not related to an improper amount of ink 26A, 26B transferred to the metallic container 54. As one of skill in the art will appreciate, the deficiency may be due to other problems, such as, but not limited to: a problem with one of the printing plates 6, 14, a problem with a transfer blanket 38, a defective ink 26, and a problem with support element 42. Problems with the printing plates 6, 14 and transfer blankets 38 include, among others: damaged, defective, and misaligned printing plates 6, 14 or transfer blankets 38.

Printing plates 6, 14 and transfer blankets 38 gradually wear during a production run. For example, the frequent contact of the printing plates 6, 14 with the ink rollers 10, 18 and the transfer blankets 38 causes the surface of the printing plates 6, 14 to wear. The transfer blankets 38 are also subject to wear due to contact with the printing plates 6, 14 and the metallic containers 54. The control system 46 can compensate for the wear by substantially continuously adjusting the amount of inks 26A, 26B transferred to the metallic containers 54 as described above. In one embodiment, the wear may cause a decoration to be deficient such as by being out of alignment or in an improper position. In response to determining from the sensor data that the deficiency is due to an improper alignment or position of one or more of the decorations 58, the control system 46 may send a signal to move one or more of the inking assemblies 8, 16, the ink rollers 10, 18, the plate cylinders 4, 12, the blanket cylinder 36, and the support element 42 in a specific direction. In this manner, the control system 46 can automatically correct a deficient decoration caused by improper alignment or position of a decoration.

Occasionally a printing plate 6, 14 or transfer blanket 38 is damaged. The damage may occur either prior to the beginning a production run or during the production run. A printing plate 6, 14 or transfer blanket 38 may also include a defect that effects decoration quality. Further, one of the printing plates 6, 14 or transfer blankets 38 may not be aligned properly with an associated plate cylinder 4, 12 or blanket cylinder 36. The alignment problem may occur during the production run. For example, the high rotation rate of the plate cylinders 4, 12 or blanket cylinder 36 can cause the printing plates 6, 14 or transfer blankets 38 to move out of proper alignment, negatively effecting decorations formed on the metallic containers 54.

The control system 46 can determine that a deficient decoration 58 is due to a problem with a printing plate 6, 14, or a transfer blanket 38, because the deficient decoration 58 will repeat periodically on other metallic containers 54. More specifically, a metallic container 54 with a deficient decoration caused by a problem with a printing plate 6, 14 or a transfer blanket 38 will be positioned between metallic containers with satisfactory decorations.

The control system 46 can associate the cause of the deficient decoration to either the printing plates 6, 14 or the transfer blanket 38 based on how frequently the deficient decoration is repeated on the metallic containers. More specifically, in one embodiment, the number of printing plates 6, 14 on the plate cylinders 4, 12 is different than the number of transfer blankets 38 on the blanket cylinder 36. Accordingly, a deficient decoration caused by a problem with a transfer blanket 38 will repeat at a different rate than a deficient decoration that results from a problem with a printing plate 6, 14. If the deficient decoration repeats at a rate equal to the number of transfer blankets 38, the control system 46 can determine that the deficient decoration is caused by a problem with one of the transfer blankets 38. Otherwise, if the deficient decoration repeats at a rate that matches the number of printing plates 6, 14, the control system 46 can determine that a printing plate 6, 14 with a problem is the cause of the deficient decoration.

The deficient decoration can be traced, by the control system 46, either to the printing plates 6 of the first plate cylinder 4 or the printing plates 14 of the second plate cylinder 12 based on which of the first and second inks 26A, 26B is associated with the periodically deficient decoration. For example, if deficient decorations are periodically observed and the deficiency relates to a problem with only the first ink 26A then the control system 46 can determine that one of the first printing plates 6 has a problem. Alternatively, if the decoration deficiency is periodic and only associated with the second ink 26B, the problem is related to one of the second printing plates 14. In one embodiment, the control system 46 can send a signal to one or more of the plate cylinders 4, 12 to alter a position of a printing plate 6, 14 to correct the alignment of the printing plate on the plate cylinder. In this manner, the control system 46 may correct a deficient decoration due to improper alignment or position of a printing plate 6, 14. In another embodiment, the control system 46 can send a signal to an actuator of the blanket cylinder 36. The signal can direct the actuator to move a transfer blanket 40 in a specific direction to correct an improperly aligned transfer blanket 40.

A problem with the support element 42 may be identified by the control system when a decoration is improperly aligned or positioned on the metallic container 54. For example, the support element 42 may be improperly aligned with the blanket cylinder 36. When this occurs, a decoration transferred to a metallic container 54 may be improperly positioned on the metallic container. For example, the decoration may be too high or low on the metallic container. Alternatively, the decoration may not be aligned with an axis of the metallic container. A deficient decoration may also be caused when a metallic container 54 is not properly aligned on a support element station 44. For example, a station 44 may be damaged or worn such that a metallic container 54 is not properly aligned with a transfer blanket 38. In one embodiment, the support element 42 includes a plurality of mandrels 44. A mandrel 44 may be damaged such that a metallic container 54 thereon is improperly aligned with a transfer blanket 38. The control system 46 may determine the support element 42, or a station 44 of the support element, is associated with a deficient decoration at least in part based on a frequency at which the deficient decoration occurs. In one embodiment, the control system 42 may send a signal to an actuator associated with the support element 42 to move the support element 42, or a mandrel 44 of the support element, in a specific direction to correct deficient decoration. In another embodiment, the control system 42 may send an alert to an operator indicating that a deficient decoration is associated with the support element 42.

A defective ink 26 may include: ink of an improper color, an incorrect viscosity of ink, impurities in the ink, and ink that is at an incorrect temperature. The control system 46 may determine that a deficient decoration is related to a defective ink if similar deficiencies are observed on a number of metallic containers and adjusting the amount of ink transferred to the metallic containers does not eliminate the deficiency. In one example, the control system 46 may identify a deficient decoration and determine an improper amount of ink is the cause. The control system 46 may adjust the position of one or more ink blades 21 or portions of ink blade 22 associated with at least one of the first ink roller 10 and the second ink roller 18. If similar deficient decorations are identified by the control system 46 after adjusting the ink blades 21 or portions of ink blade 22, the control system may determine the cause of the deficient decoration is a defective ink.

In another embodiment, the control system 46 can determine that defective ink is causing deficient decorations when the deficiency is observed on two or more cylindrical portions 57 of the cylindrical body 56 of the metallic container. More specifically, an improperly adjusted ink blade 21 or segment 24 of ink blade 22 should only effect one cylindrical portion 57 of the metallic container. In contrast, when defective ink is supplied to the inking assemblies 8, 16, the defective ink will be transferred across all axial portions 20 of the ink rollers 10, 18. Accordingly, at least two cylindrical portions 57 of the metallic container 54 will include decoration deficiencies.

The control system 46 may assign an error value to each deficient decoration. In one embodiment, the error value may be stored in portion 130 of database 110. In one embodiment, the control system 46 may perform different actions based on a level of the error value. For example, in one embodiment, the control system 46 may take a first action for a first error value and a second action for a second error value. In another embodiment, the first action may include sending a signal to an actuator to adjust an element of a decorator 2. The signal may activate the actuator to move an associated ink blade 21, 22, inking assembly 8, 16, ink roller 10, 18, plate cylinder 4, 12, the blanket cylinder 36, or support element 42 in a specific direction. The first action may also include sending an alert to an operator. The second action may include sending a signal to the ejector 62 to remove a metallic container with a deficient decoration from the conveyor 48. In one embodiment, the second action may also include sending a signal to the decorator 2 to stop the decorator. In one embodiment, the first error value is a warning level and the second error value is a reject level. In another embodiment, the first error value is associated with a deficiency associated with a first density of a decoration. The first density may be obtained by one or more sensors 49, 50 and transmitted to the control system 46. The second error value may be associated with a second density of a deficient decoration. In one embodiment, by assigning an alert level before assigning a reject level, the control system 46 is given a period of time to adjust a decorator 2 to correct deficient decorations before stopping the decorator.

In another embodiment, the error value will increase as the magnitude of the deficiency increases. The error value can be related to one or more of the color, density, alignment, depth, and consistency of the deficient decoration. In one example, the error value is proportional to the surface area of the container exterior surface 56 covered by the deficient decoration. Additionally, or alternatively, the error value may be below a predetermined value if the deficiency is not visible to a human eye. Similarly, the error value may be above the predetermined value if the deficiency is visible to a human.

The error value may also be associated with a frequency of a periodic deficient decoration. For example, an error value associated with a problem of a printing plate 6, 14 or a transfer blanket 38 (which, in some instances, cannot be corrected by the control system 46) may be higher than an error value for a decoration deficiency associated with the amount of ink transferred to the metallic container (which can be corrected by the control system 46). In one embodiment in which there are fewer printing plates 6, 14 than transfer blankets 38, a deficient decoration caused by a printing plate 6, 14 will be given a higher error value by the control system 46 than for a deficient decoration caused by a transfer blanket 38. The error value associated with a decoration deficiency caused by a printing plate 6, 14 is higher than an error value associated with deficiencies caused by a transfer blanket 38 because the printing plate deficiency will occur more frequently than the transfer blanket deficiency. In one embodiment, the error value may increase based on the number of metallic containers observed with a deficient decoration. More specifically, a deficient decoration may be associated with a first error value. The first error value may be a warning level. If additional metallic containers are identified within a predetermined period of time with deficient decorations, the control system 46 may increase the error value to a second error value. The control system 46 may then send a signal to the decorator 2 which causes the decorator to stop. In one embodiment, when the control system 46 identifies a predetermined number of metallic containers 60 with deficient decorations, the control system 46 will send the signal which causes the decorator 2 to stop.

In another embodiment, for a deficient decoration that the control system 46 determines is due to defective ink 26, the control system 46 can assign an error value that is higher than error values related to problems with printing plates 6, 14 and the transfer blanket 38. The higher error value for defective inks is warranted because a defective ink may cause deficient decorations at a greater frequency than the rate of deficient decorations caused by problems of printing plates 6, 14 and transfer blankets 38.

The control system 46 may generate an error or alarm code related to deficient decorations. In one embodiment, the error or alarm code is stored in field 130 of database 110. The alarm code may include information about the cause of the deficient decoration as determined by the control system 46. The error value assigned to the deficient decoration by the control system 46 may be included in the alarm code. In one embodiment, the control system 46 may generate the alarm code when a deficient decoration is related to an improper amount of ink transferred to the metallic container, a problem with a printing plate 6, 14 or a transfer blanket 38, or a defective ink. In another embodiment, the alarm code is generated when the error value assigned to the deficient decoration exceeds a predetermined value. In still another embodiment, the alarm code may be generated for each deficient decoration identified by the control system 46. In one embodiment, the alarm code may be generated for deficient decorations which the control system cannot correct or which are not eliminated. For example, a deficient decoration that the control system cannot correct by sending signals to the actuators 30 to adjust the amount of ink transferred to the metallic containers 54 or by adjusting the position of one or more of the inking assemblies, the ink rollers, the plate cylinders, the blanket cylinder, and the support element may cause the control system 46 to generate an alarm code. In another embodiment, the control system 46 may generate an alarm code for deficient decorations for which the control system cannot identify a cause.

Additionally, or alternatively, the control system 46 may stop the decorator 2 after detecting a defective decoration based on rules stored in a memory 96 of the control system 46. In one example, the rules may direct the control system 46 to stop the decorator 2 when the error value is above a certain amount. In this manner, the control system 46 can stop the decorator when one or more of: (1) a deficient decoration occurs at or above a predetermined frequency; (2) a deficient decoration has a surface area greater than a predetermine amount; (3) more than a predetermined number of deficient decorations are detected; and (4) similar deficient decorations are detected after the position of at least one ink blade 21 or portion of ink blade 22 is adjusted by a signal from the control system 46 to an actuator 30.

Optionally, when the control system 46 determines that a metallic container 60 has a deficient decoration 58, the control system 46 is operable to send a signal to activate the ejector 62. The ejector 62 is operable to remove the metallic container 60 from the conveyor 48, as illustrated by the ejection of metallic container 60 in FIG. 1. In this manner, metallic containers 60 with deficient decorations are not transported to downstream equipment 66.

In one embodiment, the control system 46 sends a signal to the ejector 62 to remove metallic containers 54 which include a deficient decoration with an error value above a predetermined level. Some deficient decorations may be subtle. Although the deficient decoration does not meet decoration standards, the deficiency may not be apparent to the human eye. Accordingly, the control system 46 can adjust the ink blades 21 or portions of an ink blade 22 to correct the deficiency; however, if the deficiency is not detectable by a human eye, the control system 46 may allow the metallic container 54 to continue to downstream equipment 66. Other deficient decorations may be apparent to a human eye. Decorations visible to humans may be assigned a higher error value such that the metallic containers 60 with visibly deficient decorations require ejection. Accordingly, the control system 46 may send a signal to the ejector 62 to prevent the flow of metallic containers 60 with visible deficiencies above a predetermined error value to downstream equipment 66.

In one embodiment, the ejector 62 uses a gust of compressed gas, such as air, to remove metallic containers 60 with deficient decorations from the conveyor 48. In another embodiment, the ejector 62 contacts and applies a mechanical force to the deficient metallic containers 60. The force moves the metallic containers 60 from the conveyor 48.

Metallic containers 54 with acceptable decorations 58 are conveyed past the ejector 62 to downstream equipment 66. In one embodiment, the downstream equipment 66 includes one or more of a coater, an oven, a waxer, a die necker, a tester, an inspection station, a sensor, and a palletizer. The coater applies a lacquer (or other material) to the interior of the metallic container 54. The oven cures the lacquer. A thin layer of a lubricant may be applied by a waxer to a portion of the container body proximate to an open end of the metallic container 54. The die necker reduces the diameter of a portion of the metallic container body and applies a curl to aerosol containers. The tester checks the container for unintended apertures or leaks. The inspection station may check the shape or other features of the metallic container 54. Optionally, the downstream equipment 66 includes at least one sensor. The sensor may be the same as, or similar to, sensors 49, 50. Accordingly, in one embodiment the control system 46 may receive data collected by a sensor of the downstream stream equipment 64 related to the exterior surface 56 of metallic containers 54. The palletizer can bundle the finished metallic containers 54 for shipment or storage.

Figure 16:
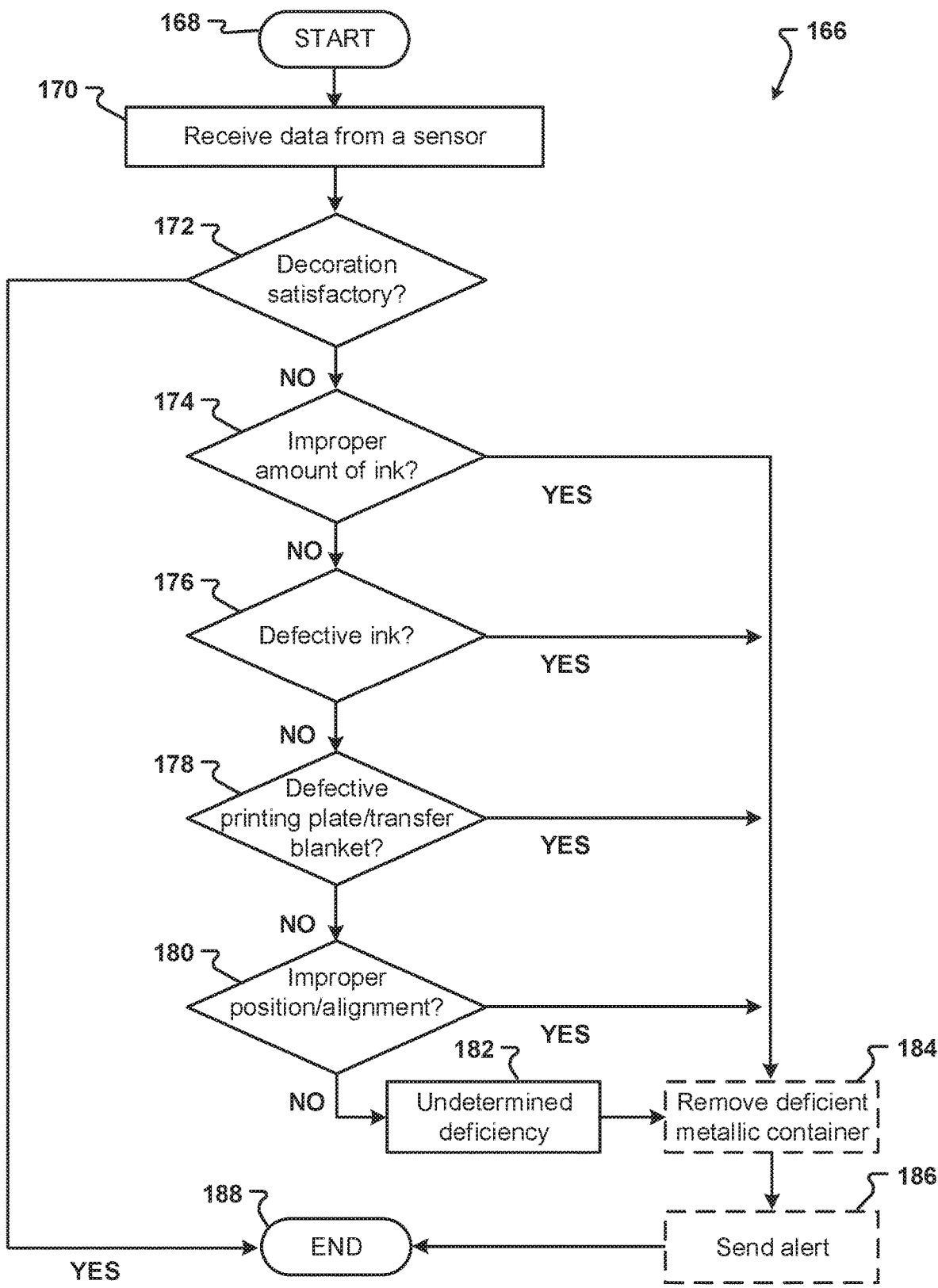
FIG. 16 is a process flow diagram of a method of identifying a cause of a deficient decoration.

Referring now to FIG. 16, one embodiment of a method 166 of the present invention for determining a cause of a deficient decoration on a metallic container 54 is generally illustrated. While a general order of the operations of method 166 are shown in FIG. 16, method 166 can include more or fewer operations, or can be operated in a different sequence than those shown in FIG. 16. Further, although the operations of method 166 may be described sequentially, many of the operations may in fact be performed in parallel or concurrently. Generally, method 166 starts with a start operation 168 and ends with an end operation 188. At least a portion of method 166 can be executed as a set of computer-executable instructions executed by a computer system and encoded or stored on a computer readable medium. One example of the computer system may include, for example, the control system 46. An example of the computer readable medium may include, but is not limited to, a memory of the control system 46. Hereinafter, method 166 shall be explained with reference to the control system 46, decorator 2 and components described in conjunction with FIGS. 1-15.

At operation 170, the control system 46 receives data from a sensor 49, 50. The control system 46 can then determine whether the decoration is satisfactory in operation 170. In one embodiment, the control system 46 compares the sensor data to stored data of an acceptable decoration. When the sensor data varies from the stored data by a predetermined amount, the control system 46 can determine that the decoration on the metallic container 60 is deficient. Optionally, the control system 46 may establish an error value for the deficient decoration. In one embodiment, the error value is one of a warning level and a reject level. The control system 46 may determine a decoration is deficient for one or more reasons. For example, the control system 46 can determine a decoration is deficient due to one or more of an improper amount of ink, defective ink, a defective printing plate or transfer blanket, an improper position of the decoration, an improper alignment of the decoration, and others. If the decoration is not satisfactory, method 166 continues NO to operation 174. When the decoration is satisfactory, method 166 jumps YES to end operation 188.

In operation 174, the control system 46 can determine if the deficient decoration is caused by an improper amount of ink 26 transferred to the metallic container 60. The improper amount of ink may include too much, or too little, ink transferred to an axial portion 20 and subsequently to the metallic container 60. The improper amount of ink may result in a deficient decoration which has an improper color, improper ink density, or an improper thickness. The control system 46 can determine that a deficient decoration is due to an improper amount of ink from the data received from the sensor 50.

In one embodiment, when a decoration 58 is deficient in only one cylindrical portion 57 of a metallic container 60 and the deficiency repeats in a plurality of metallic containers 60, the control system 46 can determine that the deficient decoration is associated with an improper amount of ink 26 transferred to an axial portion 20 of one of the ink rollers 10, 18. Additionally, or alternatively, the control system 46 may determine the deficient decoration is due to an improper amount of ink if at least one of the color, density, and thickness of at least a portion of a decoration 58 is different that the color, density, and thickness of a corresponding portion of an acceptable decoration, such as an acceptable decoration stored in data object 116 of database 110.

Additionally, in operation 174, the control system 26 can determine which ink blade 21 or portion of ink blade 22 is associated with the cylindrical portion 57 that includes an improper amount of ink 26. When an improper amount of ink is the cause of a deficient decoration, the improper amount of ink will be of a substantially uniform density or thickness along a single cylindrical portion 57 of the metallic container 60. Accordingly, the improperly adjusted ink blade 21 or portion 24 of ink blade 22 will generally correspond to the cylindrical portion 57 with the improper amount of ink.

For example, if cylindrical portion 57B of container 54 illustrated in FIG. 11 includes decoration 58A formed with an improper amount of ink, then ink blade 21B or blade segment 24B of ink blade 22 is improperly adjusted with respect to one of the ink rollers 10, 18. The control system 46 can also determine if the inking assembly 8, 16 includes an improperly adjusted ink blade 21B or blade segment 24B based at least in part on the type or color of ink 26 associated with the deficiency identified in cylindrical portion 57B. More specifically, if ink blade 21B or blade segment 24B of the first inking assembly 8 is improperly adjusted, the deficient decoration will be associated with the first ink 26A. The control system 46 can also consider data received from a potentiometer 80B associated with ink blade 21B or blade segment 24B to determine a current position of the ink blade or blade segment. The data received from the potentiometer may indicate the ink blade 21B or blade segment 24B has inadvertently or unexpectedly moved from an initial position.

In one embodiment, the control system 46 may also consider data received from one or more of sensors 49B, 49C regarding ink on the printing plates. The data from sensors 49B, 49C may indicate that an ink blade 21 or blade segment 24 of one of the inking assemblies 8, 16, is transferring an incorrect amount of ink 26. Accordingly, the control system 46 may consider data from a plurality of sensors 49, 50, and potentiometers 80 to determine which ink blade 21 or blade segment 24 is improperly adjusted.

If the deficiency is not due to an improper amount of ink, method 166 proceeds NO to operation 176. If the deficiency is due to an improper amount of ink, method 166 proceeds YES to operation 184.

In operation 176, control system 46 may determine that a deficient decoration is related to a defective ink 26. More specifically, if a deficient decoration is observed on each of a plurality of metallic containers 60, and the deficient decoration extends to more than one cylindrical portion 57 of the metallic container 60, the control system 46 can determine that the deficiency is due to defective ink or other criteria.

In one embodiment, the control system 46 may determine a defective ink 26 is the cause of the deficient decoration when adjusting the position of an ink blade 21 or a portion of ink blade 22 to alter the amount of ink transferred to the metallic containers does not eliminate the deficiency. In another embodiment, the control system 46 can determine that defective ink 26 is causing deficient decorations when the deficiency is observed in sensor data associated with two or more cylindrical portions 57 of the cylindrical body 56 of the metallic container. More specifically, an improperly adjusted ink blade 21 or segment 24 of blade 22 should only effect one cylindrical portion 57 of the metallic container 60. However, when defective ink is supplied to the inking assemblies 8, 16, the defective ink will be transferred across all axial portions 20 of the ink rollers 10, 18. Accordingly, at least two cylindrical portions 57 of the metallic container 60 will include decoration deficiencies.

Additionally, or alternatively, the control system 46 may determine a defective ink 26 is the cause of a deficient decoration when data received from one or more of the sensors 49, 50 indicates variations in the color, density, or thickness of the ink within one cylindrical portion 57 of the container 60. More specifically, ink 26 that is not defective should have a uniform color, density, and thickness when transferred from an axial portion 20 of an ink roller 10, 18 to a cylindrical portion 57 of a container. However, if the ink 26 is defective, the data from the sensor 50 associated with a cylindrical portion of the container may include variations. An ink may be defective if it is contaminated (such as with particles, other inks, etc.), is at an improper temperature, is improperly mixed, or is at an incorrect viscosity.

When an ink is contaminated with particles, one of the sensors 49E, 50 may detect the particles in one or more cylindrical portions 57 of the container. In one embodiment, one of the sensors 49B, 49C, 49D may detect particles in ink 26 on a printing plate 6, 14 or a transfer blanket 38. In one embodiment, an ink contaminated with particles may be detected when a particle in the ink prevents or interrupts the transfer of ink to the ink roller 10, 18. For example, a particle stuck in the gap 32 between the ink roller 10, 18 and an ink blade 21 or ink blade portion 24 may result in a lack of ink being transferred to a circumferential portion of the ink roller 10, 18. The circumferential lack of ink on the ink roller 10, 18 may result in an uninked band on a printing plate, a transfer blanket, or on a metallic container 60. Accordingly, when the control system 46 detects an uninked band around the metallic container, the control system 46 can determine that the ink is contaminated with particles.

If the defective ink is at an improper temperature, improperly mixed, or at an incorrect viscosity, the ink may not flow evenly through the gap 32 between the ink roller 10, 18 and an ink blade 21 or ink blade portion 24. Accordingly, the ink 26 may be unevenly distributed on at least one of the axial portion 20 of the ink roller 10, 18. For example, the sensor 50 may collect data from two targets 59A, 59B within cylindrical portion 57B of the metallic container as generally illustrated in FIG. 11. The control system 46 receives the data related to targets 59A, 59B and may determine that the ink associated with target 59A varies from the ink associated with target 59B. The sensor data may indicate that the ink at targets 59A, 59B is one or more of: different thicknesses, different densities, different colors, and not uniform.

When the control system 46 determines a defective ink 26 is the cause of the deficiency in operation 176, method 166 proceeds YES to operation 184. When defective ink is not the cause of the deficiency, method 166 proceeds NO to operation 178.

In operation 178, the control system 46 determines if the deficient decoration repeats. More specifically, a deficient decoration related to a defective printing plate 6, 14 or a defective transfer blanket 38 will repeat periodically on metallic containers. Accordingly, a defective transfer blanket or printing plate will result in the same, or similar deficient decoration in a plurality of metallic containers 60. When the deficient decoration 58 repeats periodically on metallic containers 60, and the period of the repeating deficient decoration 58 is related to the number of printing plates, the control system 46 can determine that the deficient decoration 58 is due to a defective printing plate 6, 14. The defective printing plate 6, 14 may be improperly positioned on one of the plates cylinders 4, 12. Alternatively, the defective printing plate 6, 14 may be worn or damaged. In one embodiment, the control system 46 may receive data from at least one of sensors 49B, 49C, 49D which indicates that a printing plate 6, 14 or a transfer blanket 38 is defective.

In one embodiment, the control system can determine the plate cylinder 4, 12 to which the defective printing plate 6, 14 is interconnected based on the ink 26 associated with the deficient decoration. More specifically, a defective printing plate 6 on the first plate cylinder 4 will be associated with ink 26A of the first inking assembly 8. Similarly, a defective printing plate 14 on the second plate cylinder 12 will be associated with ink 26B of the second inking assembly 16.

The control system 46 can also determine the deficient decoration is associated with a transfer blanket 38 when the deficient decoration 58 repeats at a period associated with the number of transfer blankets 38 on the blanket cylinder 36. When the deficiency is due to a defective printing plate or transfer blanket, method 166 proceeds YES to operation 184. If the deficiency is not associated with a printing plate or transfer blanket, method 166 proceeds NO to operation 180.

In one embodiment, the control system 46 may also determine in operation 180 that the decoration is improperly aligned or positioned on the metallic container 60. More specifically, the control system 46 can compare data received from sensor 50 to stored data in database 110 associated with an acceptable decoration. If the alignment or position of the decoration 58 on the metallic container is different than the acceptable decoration stored in memory, the control system can determine that the decoration is not properly aligned.

In one embodiment, the control system 46 may determine that a decoration is not properly positioned or aligned on the metallic container by comparing the positions of two portions of the decoration. More specifically, and referring again to FIG. 11, the control system 46 may receive sensor data related to the position of decoration 58A in cylindrical portion 57B and decoration 58B in cylindrical portions 57C-57F. If the positions of decorations 58A and 58B are separated by a distance different than a predetermined amount, the control system 46 may determine the decoration is deficient due to the improperly aligned or positioned decorations 58A, 58B. In one embodiment, the control system 46 may consider data from at least one of sensors 49B, 49C, 49D to determine which printing plate 6, 14 or a transfer blanket 38 is improperly aligned. When the deficiency is due to an improperly positioned or aligned decoration, method 166 proceeds YES to operation 184. If the deficiency is not associated with a printing plate or transfer blanket, method 166 proceeds NO to operation 182.

The control system 46 may not be able to classify a cause for each deficiency identified. Accordingly, in operation 182 the control system 46 may record a deficiency as being due to an undetermined cause. Method 166 then continues to operation 184.

In operation 184, the metallic container 60 with a deficient decoration is optionally removed from the conveyor 48. For example, in one embodiment, when an error value associated with the deficient decoration is at a reject level, the control system 46 can send a signal to the ejector 62 to remove the metallic container.

In operation 186, the control system 46 may send an alert. The alert may include information about the type of deficiency identified by the control system. For example, the alert may indicate that the deficient decoration is due to one of an improper amount of ink, a defective ink, a defective printing plate or transfer blanket, and improper position or alignment of the decoration. In one embodiment, the alert may include sending an image of the defective decoration collected by the sensor 50 to a display 88 of the control system 46. In another embodiment, the portion of the decoration that is defective may be highlighted and/or enlarged. Alternatively, if the control system 46 could not determine the cause of the deficient decoration such that method 166 proceeded NO in operation 180 to operation 182, the alert may indicate that the control system 46 could not determine the cause of the deficient decoration. In one embodiment, the alert may also include information about actions recommended by the control system 46 to correct the deficient decoration. Accordingly, the alert may identify one or more ink blades 21 or portions of ink key 22 that should be adjusted to correct the deficiency. In another embodiment, the alert may identify one or more of the inking assemblies, the ink rollers, the plate cylinders, the blanket cylinder, and the support element that should be adjusted to correct the deficiency.

In one embodiment, the control system 46 may automatically adjust one or more of the ink blades 21 or portions of ink key 22, the inking assemblies 8, 16, the ink rollers 10, 18, the plate cylinders 4, 12, the blanket cylinder 36, and the support element 42 to correct the deficiency. In still another embodiment, the control system 46 may sent a signal to an actuator to move a printing plate 6, 14 or a blanket 38 in a specific direction to correct the deficiency. The alert may also include recommended actions such as "change the ink in inking assembly 8". In another embodiment, the alert may indicate which one of the printing plates or transfer blankets is defective or improperly aligned. In still another embodiment, the alert may indicate that the control system cannot correct the deficiency. In one embodiment, the alert may indicate that the cause of the deficiency is undetermined. After sending the optional alert, method 166 proceeds to end operation 188.

Figure 17:
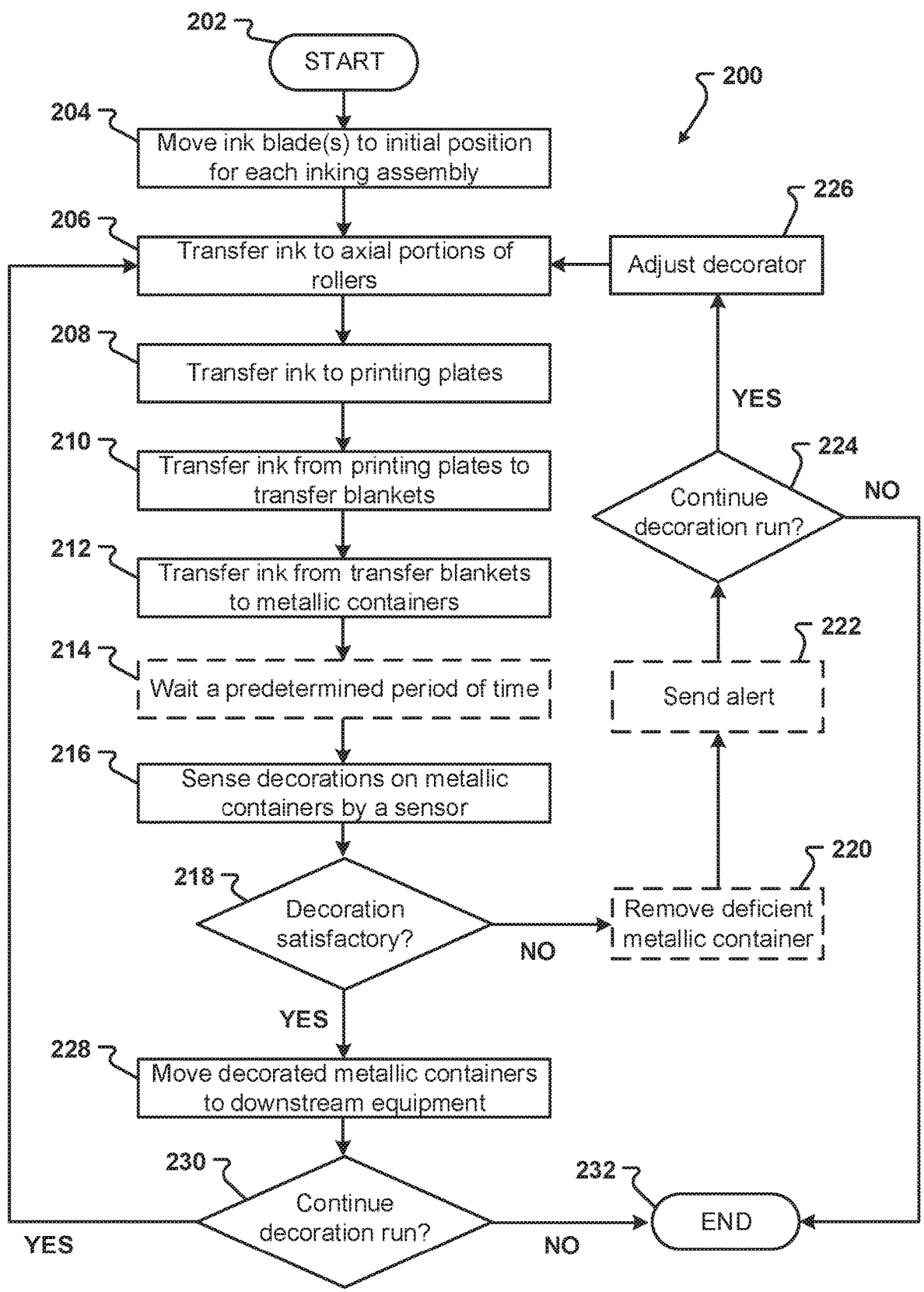
FIG. 17 is a flow diagram depicting a process of automatically adjusting a decorator to correct a deficiency in a decoration on a metallic container according to one embodiment of the present invention; and Similar components and/or features may have the same reference number. Components of the same type may be distinguished by a letter following the reference number. If only the reference number is used, the description is applicable to any one of the similar components having the same reference number. To assist in the understanding of one embodiment of the present invention the following list of components and associated numbering found in the drawings is provided herein.

Referring now to FIG. 17, one embodiment of a method 200 of automatically adjusting a decorator 2 to correct a deficient according to one embodiment of the present invention is illustrated. While a general order of the operations of method 200 are shown in FIG. 17, method 200 can include more or fewer operations, or can arrange the order of the operations differently than those shown in FIG. 17. Further, although the operations of method 200 may be described sequentially, many of the operations may in fact be performed in parallel or concurrently. Generally, method 200 starts with a start operation 202 and ends with an end operation 232. At least a portion of method 200 can be executed as a set of computer-executable instructions executed by a computer system and encoded or stored on a computer readable medium. One example of the computer system may include, for example, the control system 46. An example of the computer readable medium may include, but is not limited to, a memory of the control system 46. Hereinafter, method 200 shall be explained with reference to control system 46, decorator 2 and components described in conjunction with FIGS. 1-16.

In operation 204, the control system 46 sends a signal to actuators 30 associated with the inking assemblies 8, 16 of the decorator 2. The signal causes the actuators 30 to move the ink blades 21 or segments of ink blade 22 closer to, or away from, the ink rollers 10, 18. In one embodiment of the present invention, the actuators 30 are low voltage motors.

Optionally, the actuators 30 may include (or be associated with) potentiometers 80 that provide positional feedback to the control system 46. The control system 46 may use the information received from one or rotation or movement sensors, such as the potentiometers 80, to determine a position of the ink blades 21 or the ink blade 22 (or a blade segment) with respect to an associated ink roller 10, 18. For example, in one embodiment of the present invention, each actuator 30 includes a low voltage DC motor associated with a corresponding ink key 28 or shaft 31. Optionally, in another embodiment, the actuators 30 include a solenoid interconnected to an ink key 28. In this manner, the control system 46 adjusts the gap 32 between each ink blade 21 or segment 24 of the ink blade 22 and the ink rollers 10, 18 to an initial position. The size of the gap 32 allows a predetermined amount of ink 26 to be metered to each axial portion 20 of the ink rollers 10, 18 required to form a decoration 58. In one embodiment, the control system 46 automatically determines the initial position of each ink blade 21 or segment 24 of ink blade 22 by analyzing a decoration 58 entered by an operator into a database 110 of the control system 46. In another embodiment, the operator enters the initial position of each ink blade 21 or segment 24 of blade 22 into the control system 46.

In operation 206, ink 26 is transferred to axial portions 20 of the ink rollers 10, 18. The amount of ink 26 transferred to the axial portions 20 is determined by the gap 32 between the ink blades 21 or segments 24 of ink blade 22 and the ink rollers 10, 18 based on the initial settings of the associated ink keys 28 or shafts 31. The ink 26 is successively transferred to the printing plates 6, 14 in operation 208, to the transfer blankets 38 in operation 210, and then, in operation 212, to the exterior surface 56 of the undecorated metallic containers 52. In one embodiment, one or more of the sensors 49B, 49C collect data on at least the amount of ink 26 transferred to the printing plates 6, 14. In another embodiment, the sensor 49D collects data on the amount of ink on the exterior surface 40 of the transfer blankets 38.

The decorated metallic containers 54 are subsequently transported to the sensor 50. In one embodiment, method 200 optionally waits a predetermined period of time in operation 214 during which a metallic container 54 is transported from the support element 42 to one or more of the sensors 49E, 50. More specifically, depending on the position of the sensors 49E, 50 with respect to the support element 42, it may take several seconds or a period of minutes for a metallic container 54 decorated based on a position of the ink blades 21 and the segments of ink blade 22 to reach the sensors 49E, 50. However, the amount of time delay between the metallic container 54 leaving the support element 42 reaching each of sensors 49E, 50 is known. Accordingly, by waiting the period of time in operation 214, the control system 46 can determine the position of the ink blades 21 and the segments of ink blade 22 when the metallic container was decorated.

The decorations 58 on the metallic containers 54 are sensed by at least one of the sensors 49E, 50 in operation 216. In one embodiment, the decorated metallic containers 54 are transported by the conveyor 48 to the sensors 49E, 50. Alternatively, the sensors 49E, 50 are positioned to sense the decorated metallic containers 54 on the support element 42.

The sensors 49E, 50 are aligned to sense or image the decoration 58 on the decorated metallic containers 54. The sensor 50 and, optionally, sensor 49E, collect data about the decoration 58 required to determine one or more of: the color of the decoration; the density of the decoration; the depth (or thickness) of the decoration; the alignment of the decoration; and the consistency (or uniformity) of the decoration. In one embodiment, the sensors 49E, 50 are cameras. Optionally, the decorator 2 includes from three to six sensors 50 or sensors 49E. The three to six sensors 49E, 50 may be arranged around a longitudinal axis of the metallic container 50 to substantially simultaneously sense the entire exterior cylindrical surface 56 of the metallic container.

In operation 218, the control system 46 receives the data about the decoration 58 collected by one or more of the sensors 49E, 50. The control system 46 is operable to determine if the decoration 58 is acceptable or deficient based upon targets for one or more of color, density, depth, alignment, and consistency set by a customer. In one embodiment, the control system 46 compares the sensor data to an image of an acceptable decoration stored in memory 96, 100, 104. In one embodiment, images of a plurality of acceptable decorations are stored in the memory. Accordingly, the control system 46 may compare portions of the sensor data to corresponding portions of a plurality of images stored in memory. Optionally, the control system 46 is programmed to recognize an acceptable decoration. For example, the control system 46 may be programmed by receiving data on a plurality of decorations as generally described in method 140 illustrated in FIG. 15. The control system 46 may also determine a reason for a deficient decoration in operation 218.

In one embodiment, the control system 46 receives data for all metallic containers decorated by the decorator 2. Alternatively, the control system 46 receives data for some of the decorated metallic containers 54. If the decoration 58 is satisfactory, the method 200 continues YES to operation 228. When the decoration 58 is not satisfactory, the method 200 proceeds NO to operation 220.

Optionally, in operation 220, the control system 46 may send a signal to the ejector 62. The signal causes the ejector 62 to remove the metallic container 60 with the unsatisfactory decoration from the conveyor 48. In one embodiment, the control system 46 sends the signal to the ejector 62 when an error value associated with the unsatisfactory decoration exceeds a predetermined amount. In another embodiment, the control system 46 may send the signal to the ejector 62 for each metallic container 60 that has an unsatisfactory decoration. Alternatively, the control system 46 can determine if the unsatisfactory decoration is visible to a human eye. For example, the unsatisfactory decoration may not meet a target; however, the deficiency may be too small or otherwise not visible to the human eye. If the unsatisfactory decoration is visible to the human eye, the control system 46 can cause the ejector 62 to remove the metallic container 60. If the unsatisfactory decoration is not visible to the human eye, the control system 46 can allow the metallic container to continue to downstream equipment 66.

In operation 222, the control system 46 may optionally send an alert. The alert may be presented on an output device 88 of the control system 46, such as a display. In one embodiment, the alert is audible. Optionally, the control system 46 may sent the alert to a smart device such as a smart phone, a tablet, or a portable computer over a network connection. In one embodiment, the alert may comprise a text message.

The alert may provide information related to the type of deficiency identified in the decoration 58. In one embodiment, the information may include the error value associated with the unsatisfactory decoration. The information may also include actions taken, or planned, by the control system 46 to correct the deficiency, such as a list of ink blades 21 or segments of ink blade 22 associated with the ink rollers 10, 18 that were, or will be, adjusted. In one embodiment, the alert includes information about adjustments to positions of the inking assemblies, ink rollers, plate cylinders, printing plates, blanket cylinder, transfer blankets, or the support element required to correct the deficient decoration. Optionally, in one embodiment, the operator may use an input device 86 of the control system 46, such as a pointer, a keyboard, or a touch screen, to approve the corrective actions presented by the control system 46. In another embodiment, the operator may use the input device to make changes to the decorator 2 to correct the deficiency. In this manner, the operator can activate one or more actuators 30 to alter the position of one or more ink blades 21 or segments 24 of ink blade 22. In still another embodiment, the operator may alter adjustments planned or implemented by the control system 46 to correct the deficiency.

In operation 224, the control system 46 can determine to stop the production run. More specifically, in one embodiment, the control system 46 may determine that the production run should stop based on a rule saved in memory 96 after determining in operation 100 that a decoration 58 on a metallic container 54 is deficient. In one embodiment, the rule is associated with the error value assigned by the control system 46 to the deficient decoration. If the error value is above a certain amount, the control system 46 can send a signal to stop the decorator 2. In one embodiment, the rule is associated with the number of deficient decorations detected within a period of time. More specifically, if the control system 46 determines more than a predetermined number of metallic containers include deficient decorations, the control system can send a signal to the decorator 2 to stop the production run. In another embodiment, the rule may be related to the type of deficiency identified by the control system 46. Accordingly, if the deficiency is of a type correctable by the control system 46 by activating at least one actuator 30 to alter a position of an ink blade 21 or portion of an ink blade 22, the control system 46 may determine that the production run will continue. Similarly, when the deficiency can be corrected by the control system 46 sending a signal to an actuator to adjust a printing plate 6, 14 or a transfer blanket 38, the control system may continue the production run. Alternatively, when the deficiency is not correctable by the control system 46, the control system 46 can stop the production run. In one embodiment, the control system 46 can stop the production run in response to an input entered by an operator. If the control system 46 determines the decoration run should continue, method 200 loops YES to operation 226. Alternatively, when control system 46 determines the decoration run should stop, method 200 continues NO to end operation 232.

In operation 226, the control system 46 identifies one or more elements of the decorator 2 to adjust to correct the deficiency in the decoration 58 identified using the data received from the sensor 50 or sensor 49E. For example, the control system 48 can identify one or more ink blades 21 or segments 24 of an ink blade 22 that require adjustment to correct a deficiency in the decoration 58 using data received from one or more of sensors 49B, 49C, 49D, 49E, and 50. For example, the control system 46 can determine that one or more axial portions 20 of at least one ink roller 10, 18 should receive more (or less) ink 26. Accordingly, the control system 46 can send a signal to one or more of the actuators 30 to move an ink blade 21 or segment of ink blade 22 closer to, or away from, the ink rollers 10, 18. The movement of the actuators 30 adjusts the gap 32 between an associated ink blade 21, 22 and the ink rollers 10, 18 to meter a corrected amount of ink 26 to the associated axial portion 20 of the ink rollers 10, 18 to form a satisfactory decoration 58. Additionally, the control system 46 may send a signal to at least one actuator 30 to adjust an axial position of at least one of ink blade segments 24. In this manner, the control system may, for example, alter the alignment of the decoration.

In another embodiment, the control system 46 may determine that an improperly aligned or positioned decoration may be corrected by changing the alignment of one or more elements of the decorator 2. Accordingly, the control system 46 may send a signal to at least one actuator associated with an inking assembly 8, 16, an ink roller 10, 18, a plate cylinder 4, 12, a printing plate 6, 14, the blanket cylinder 36, a transfer blanket 38, and the support cylinder 42. The signal can activate the actuator to move in a specific direction. In this manner, the control system 46 can correct a deficiency caused by an improperly aligned or positioned decoration. In one embodiment, control system 46 determines the reason for the deficiency by performing one or more of the operations of method 166 described in conjunction with FIG. 16.

In one embodiment, the control system 46 automatically controls the actuators 30. In another embodiment, the operator must approve the activation of the actuators 30 before the control system 46 sends the signal to the actuator 30. In yet another embodiment, the control system 46 automatically sends the signal to the actuator 30 after the lapse of a predetermined period of time after sending the alert in operation 104. The operator may cancel the planned adjustment to the ink blades 21, 22 during the predetermined period of time. Accordingly, in one embodiment, the operator must approve an adjustment to the ink blades 21, 22 planned by the control system 46.

Method 200 then loops to operation 206 and ink 26 is transferred to the ink roller axial portions 20 with the adjusted settings of at least one of the ink blades 21, 22 or with an altered alignment of another element of the decorator. Method 200 again performs operations 208-218. After a decoration 58 formed with the adjusted settings is transferred to the metallic container 54 in operation 212, method 200 again senses the decoration in operation 216 and determines if the decoration is satisfactory in operation 218. In one embodiment, method 200 will optionally wait a predetermined period of time before the metallic container 54 with the decoration 58 formed by adjusted settings reaches one or more of the sensors 49E, 50. In one embodiment, the control system 46 does not send signals to the actuators 30 during the specific period of lag time of operation 214. In this manner, the control system 46 does not send signals to the actuators 30 to correct deficiencies which may conflict or cancel corrections to the ink blades 21, 22 sent by the control system 46 to correct a previously detected deficiency.

In operation 228, the decorated metallic containers 54 with satisfactory decorations 58 are transported by the conveyor 48 to the downstream equipment 66. The control system 46 determines in operation 230 if the decoration production run should continue. For example, the control system 46 may determine the production run should stop if there is an equipment malfunction, if there is a supply shortage (such as a lack of ink or shortage of undecorated metallic containers 52), upon receipt of a stop command from and operator, or when a predetermined number of metallic containers 54 have been decorated. If the control system 46 determines the production run should continue, method 200 loops YES to operation 206. If the production run should stop, method 200 continues NO to end 232.

By way of providing additional background, context, and to further satisfy the written description requirements of 35 U.S.C. § 112, the following references are incorporated by reference in their entireties: U.S. Pat. Nos. 5,724,259, 5,992, 318; 6,142,078; 6,178,254; 6,184,988; 6,543,350; 6,867, 423; 7,013,803; 7,017,492; PCT Pub WO 2013/113616; PCT Pub WO 2016/087876.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

While the exemplary aspects, embodiments, options, and/or configurations illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a private branch exchange (PBX) and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects. Further, a number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In one embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very-large-scale-integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or computer-generated imagery (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

What is claimed is:

1. An apparatus for selectively controlling an amount of ink applied by a decorator used to decorate a metallic container, comprising:
    an inking assembly including an ink roller with an outer perimeter, an ink reservoir, a plurality of ink blades configured to travel generally parallel to a longitudinal axis of the plurality of ink blades, and an actuator associated with each ink blade which is operable to adjust an amount of linear travel of the ink blade to control an amount of ink transferred from the ink reservoir to the outer perimeter of the ink roller, wherein each ink blade includes a first endwall, a second endwall and a body extending therebetween, wherein each actuator includes a first side and a shaft with a first end connected to the first side and an opposite second end that extends to the first endwall, and wherein rotating the shaft in a first direction moves the ink blade closer to the ink roller thereby decreasing the amount of ink transferred to an associated portion of the outer perimeter of the ink roller;
    a plate cylinder including a printing plate in a predetermined alignment with respect to the ink roller such that the printing plate receives at least some ink from the ink roller;
    a blanket cylinder including transfer blankets in a predetermined alignment with respect to the plate cylinder such that a transfer blanket receives at least some ink from the printing plate;
    a support element with a plurality of stations to receive metallic containers, the support element operable to receive the metallic container from a conveyor and move the metallic container into contact with the transfer blanket to transfer at least some ink from the transfer blanket to the metallic container to form a decoration on an exterior surface of the metallic container;
    at least one sensor positioned downstream from an oven to obtain data about the decoration on the exterior surface of the metallic container after the metallic container has passed through the oven; and
    a control system that receives the data from the at least one sensor and determines if the decoration includes a deficiency, wherein the control system evaluates a plurality of data points associated with multiple target areas received from the at least one sensor, wherein at least one of the target areas is associated with one of the plurality of ink blades, and wherein if the decoration includes a deficiency the control system is operable to send a signal to an actuator to alter the amount of ink transferred to a portion of the outer perimeter of the ink roller.

2. The apparatus of claim 1, wherein the control system evaluates data points associated with up to 80 different target areas, and wherein the at least one sensor comprises a camera assembly which images the decoration on the exterior surface of the metallic container.

3. The apparatus of claim 1, wherein the deficiency is associated with at least one of a color, a density, a depth, an alignment, a consistency, and a position of the decoration, and wherein the at least one sensor obtains data of one or more of a color, a density, a depth or a thickness, an alignment, a consistency, and a position of the decoration.

4. The apparatus of claim 1, wherein the second endwall of each ink blade is positioned proximate to the ink roller to define a gap for ink on the outer perimeter of the ink roller, the gap being less than approximately 0.02 inches.

5. The apparatus of claim 1, wherein the first side of each actuator faces the first endwall of an ink blade with the shaft extending linearly therebetween.

6. The apparatus of claim 1, wherein the actuator is operable to alter a linear position of an associated ink blade to alter the amount of ink transferred to an associated portion of the ink roller while the apparatus is in operation decorating the metallic containers.

7. The apparatus of claim 1, further comprising a potentiometer associated with each of the plurality of ink blades.

8. The apparatus of claim 1, wherein the control system is operable to:
    determine an initial position for each of the plurality of ink blades based on an image of the decoration stored in a database; and
    send signals to actuators associated with each of the plurality of ink blades to move each ink blade to its initial position before a production run to decorate the metallic container begins.

9. The apparatus of claim 8, wherein the control system is further operable to compare the data to the image stored in the database to determine if the decoration includes a deficiency.

10. A method of sensing and correcting an abnormality in a decoration applied to an exterior surface of a container, comprising:
    providing a container;
    providing a decorator that includes:
        an inking assembly including an ink roller having an outer perimeter surface to receive ink, an ink reservoir, a plurality of ink blades configured to travel generally parallel to a longitudinal axis of each of the plurality of ink blades, and an actuator associated with each of the plurality of ink blades which is operable to adjust an amount of linear travel of the ink blade to control an amount of ink transferred from the ink reservoir to a portion of the outer perimeter surface of the ink roller;

a plate cylinder including a printing plate in a predetermined alignment with respect to the ink roller such that the printing plate receives at least some ink from the ink roller;
a blanket cylinder including transfer blankets in a predetermined alignment with respect to the plate cylinder such that each of the transfer blankets receives at least some ink from the printing plate; and
a support element to receive the container from a conveyor and move the container into contact with a transfer blanket of the blanket cylinder to transfer at least some ink from the transfer blanket to the exterior surface of the container;
retrieving from a database, by a control system, an image of the decoration to be applied to the container;
determining, by the control system, initial positions for each of the plurality of ink blades based on the image;
sending signals, by the control system, to actuators associated with each of the plurality of ink blades to move each ink blade to its initial position;
decorating the container with the decorator;
transferring the decorated container to an oven to cure ink used to create the decoration;
obtaining data about the decoration on the exterior surface of the container by at least one sensor, wherein the at least one sensor is positioned downstream from the oven;
determining, by the control system, if the decoration includes an abnormality, wherein the control system evaluates a plurality of data points associated with multiple target areas received from the at least one sensor, wherein at least one of the multiple target areas is associated with one of the plurality of ink blades; and
sending, by the control system, a signal to the decorator to alter at least one of a color, a density, a thickness, an alignment, and a consistency of decorations formed on subsequent containers.

11. The method of claim 10, wherein the signal causes an actuator to move an ink blade in a specific direction to alter the amount of ink transferred to the ink roller, wherein the actuator has a shaft that extends from a first side of the actuator to engage a first endwall of the ink blade, the shaft extending linearly between the actuator and the ink blade.

12. The method of claim 11, wherein a distal end of the shaft is retained in a bore extending through the first endwall, and wherein the bore does not extend to an opposite second endwall of the ink blade, the second endwall defining a gap between the ink roller and the ink blade.

13. The method of claim 10, wherein the control system determines if the decoration includes an abnormality by comparing the data from the at least one sensor to the image of the decoration retrieved from the database, and wherein after sending the signal to the decorator, the control system waits a predetermined period of time for the at least one sensor to obtain data about a second decoration on an exterior surface of a second container decorated by the decorator.

14. The method of claim 10, wherein each actuator includes a first side with a shaft engaged to a first endwall of an ink blade, wherein each ink blade has a second endwall opposite to the first endwall that defines a gap between the ink roller and the ink blade.

15. The method of claim 10, wherein the signal causes an actuator to move an ink blade of the inking assembly generally linearly to a position which either increases or decreases the amount of ink transferred to a portion of the outer perimeter surface of the ink roller, wherein a threaded shaft extends continuously from the actuator into an internal bore within a body of the ink blade, wherein the internal bore extends through a first end of the body and the internal bore does not extend through an opposite second end of the body.

16. A non-transitory computer readable medium provided on a storage medium and having instructions that when executed by a processor of a control system cause the processor to perform a method of sensing and correcting an abnormality in a decoration formed on a cylindrical surface of a container by a decorator, comprising:
instructions to retrieve an image of the decoration from a database;
instructions to determine initial positions for each of a plurality of ink blades of an inking assembly of the decorator based on the image;
instructions to send a signal to an actuator associated with each of the plurality of ink blades, the signal causing each actuator to move an associated ink blade to its initial position;
instructions to receive data from a sensor related to the decoration formed on the cylindrical surface of the container after the container has passed through an oven to cure ink used to create the decoration;
instructions to evaluate a plurality of data points associated with a plurality of target areas in the data received from the sensor, wherein at least one of the plurality of target areas is associated with one of the plurality of ink blades;
instructions to determine if the decoration includes an abnormality related to at least one of a color, a density, a thickness, an alignment, and a consistency of the decoration; and
instructions to send a signal to the decorator to alter at least one of a color, a density, a thickness, an alignment, and a consistency of subsequent decorations formed by the decorator, wherein the signal causes an actuator to move an ink blade of the plurality of ink blades in a direction generally parallel to a longitudinal axis of the ink blade and generally linearly relative to an ink roller of the decorator to alter an amount of ink transferred to the ink roller, wherein the ink blade includes a body between a first endwall and a second endwall, and wherein the actuator includes a shaft with a first end extending from the actuator and a second end that extends to the first endwall.

17. The computer readable medium of claim 16, further comprising instructions to compare the data received from the sensor to data of the image retrieved from the database, wherein the instructions cause the processor to evaluate data points associated with up to 80 different target areas.

18. The computer readable medium of claim 16, further comprising:
instructions to determine if the abnormal decoration is related to one or more of an improper amount of the ink, a defective ink, a defective printing plate or a defective transfer blanket of the decorator, and an improper alignment of a component of the decorator; and
instructions to stop the decorator after determining that the abnormal decoration is related to at least one of: the defective ink, the defective printing plate, and the defective transfer blanket.

19. The computer readable medium of claim 16, wherein the shaft extends linearly between the actuator and the ink blade, and wherein the second end of the shaft is received within an internal bore extending into the first endwall, and wherein the internal bore does not intersect the second endwall.

20. The computer readable medium of claim 16, further comprising instructions to wait a predetermined period of time after sending the signal to the decorator to account for a lag time from when a second container decorated after the actuator moves the at least one ink blade until the second container has reached the sensor which is positioned downstream from the oven.

* * * * *